(12) United States Patent
McBride et al.

(10) Patent No.: US 12,538,951 B2
(45) Date of Patent: Feb. 3, 2026

(54) PERSONAL PROTECTIVE EQUIPMENT ADAPTER SYSTEM FOR USE WITH MEDICAL DEVICES AND METHODS OF MAKING AND USING SAME

(71) Applicants: Mark T. McBride, Coronado, CA (US); John Roughneen, Dennis, MA (US); Phillip Salvatori, Salem, OR (US)

(72) Inventors: Mark T. McBride, Coronado, CA (US); John Roughneen, Dennis, MA (US); Phillip Salvatori, Salem, OR (US)

(73) Assignee: Operating Room Innovations, Incorporated, Dennis, MA (US)

( * ) Notice: Subject to any disclaimer, the term of this patent is extended or adjusted under 35 U.S.C. 154(b) by 0 days.

(21) Appl. No.: 18/945,673

(22) Filed: Nov. 13, 2024

(65) Prior Publication Data

US 2025/0160453 A1    May 22, 2025

Related U.S. Application Data

(60) Provisional application No. 63/600,148, filed on Nov. 17, 2023.

(51) Int. Cl.
*H04N 23/54* (2023.01)
*A41D 13/11* (2006.01)

(52) U.S. Cl.
CPC .......... *A41D 13/1184* (2013.01); *H04N 23/54* (2023.01)

(58) Field of Classification Search
CPC .................. A41D 13/1184; H04N 23/54
See application file for complete search history.

(56) References Cited

U.S. PATENT DOCUMENTS 11,857,378 B1 *   1/2024   Bojarski ................. G06F 3/013

\* cited by examiner

*Primary Examiner* — Robert J Michaud
(74) *Attorney, Agent, or Firm* — James R. McDaniel

(57) ABSTRACT

Systems, methods, and other embodiments for a personal protective equipment ("PPE") adapter system for use with an augmented/virtual/mixed reality ("AR") devices and light devices, including an AR device having an AR viewing display and a headband operatively connected to the AR viewing display or a light device having an light module and a headband operatively connected to the light module, and a PPE hood operatively connected to the PPE adapter system, wherein the PPE hood includes a face shield, wherein the face shield is removably connected to the PPE adapter system.

16 Claims, 47 Drawing Sheets

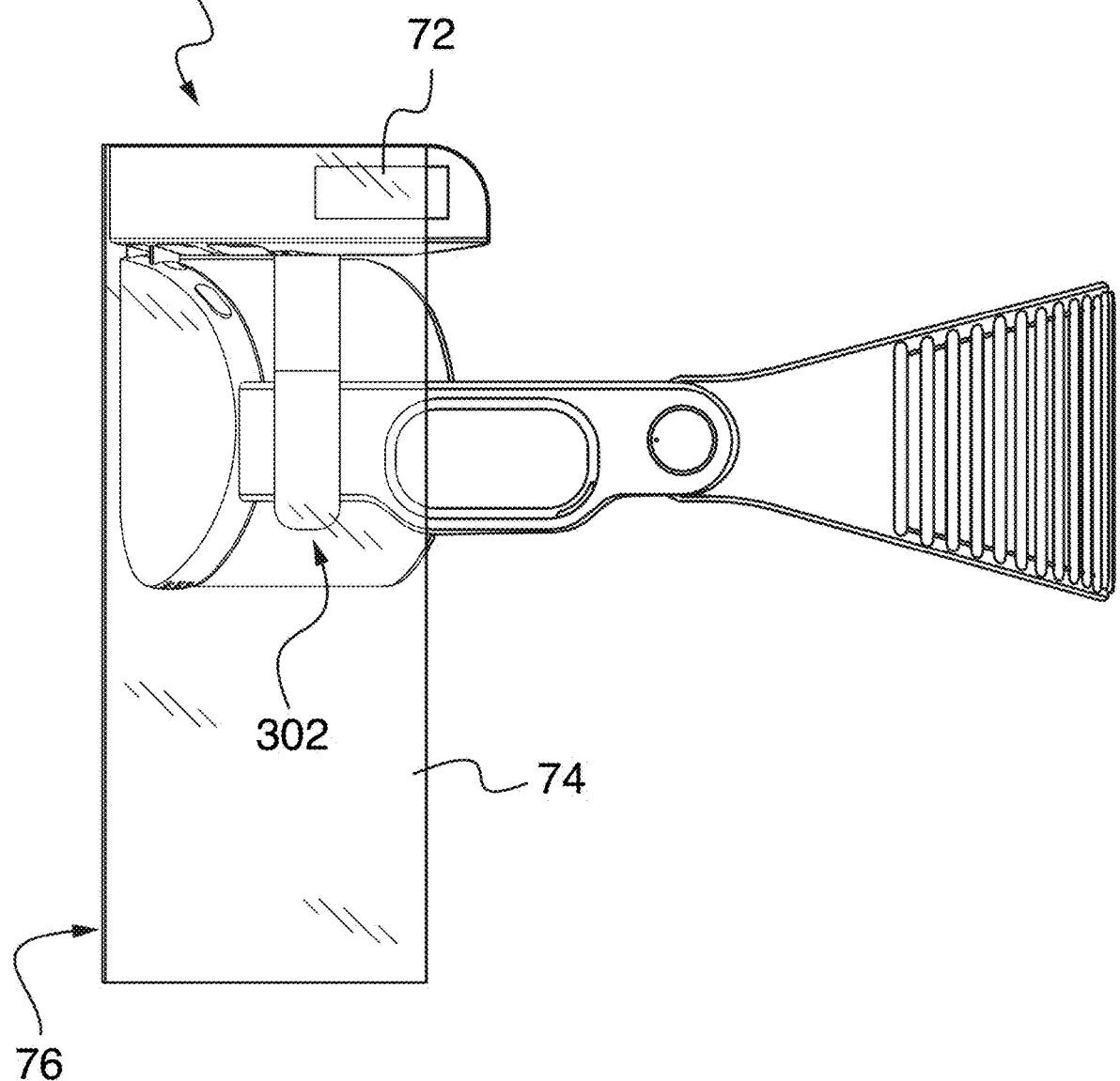

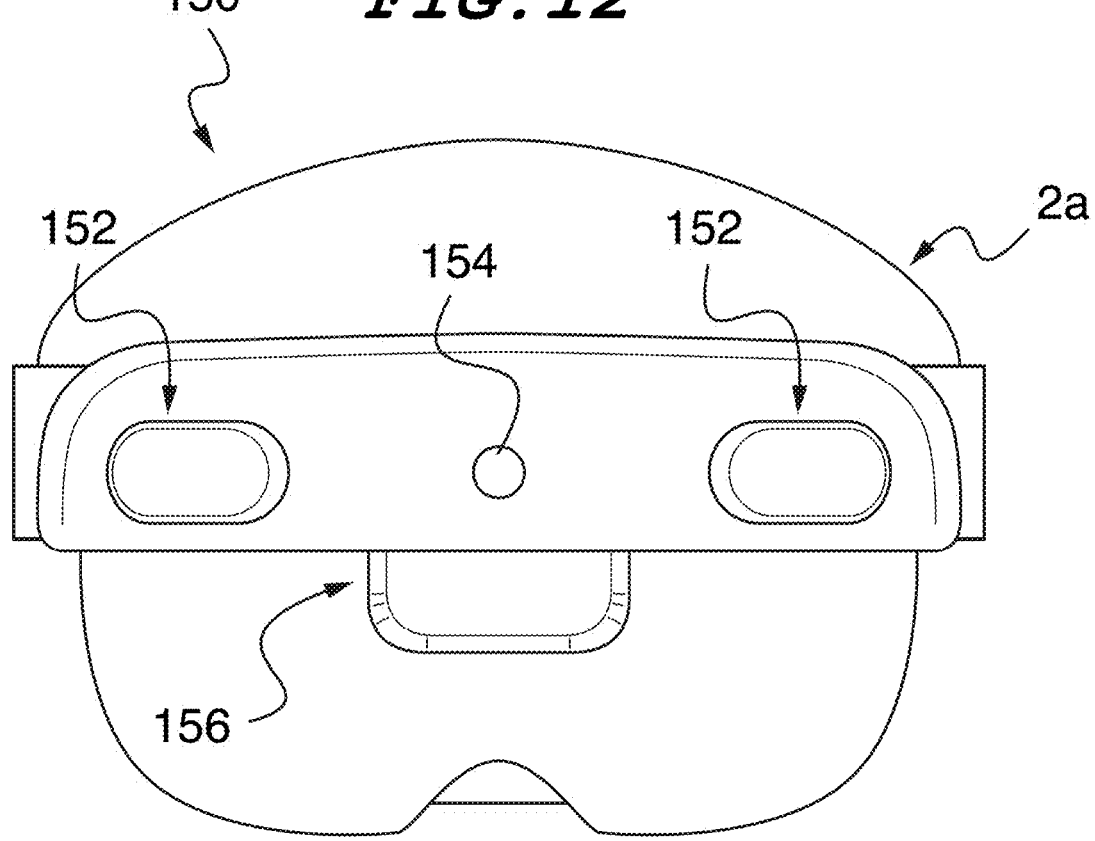

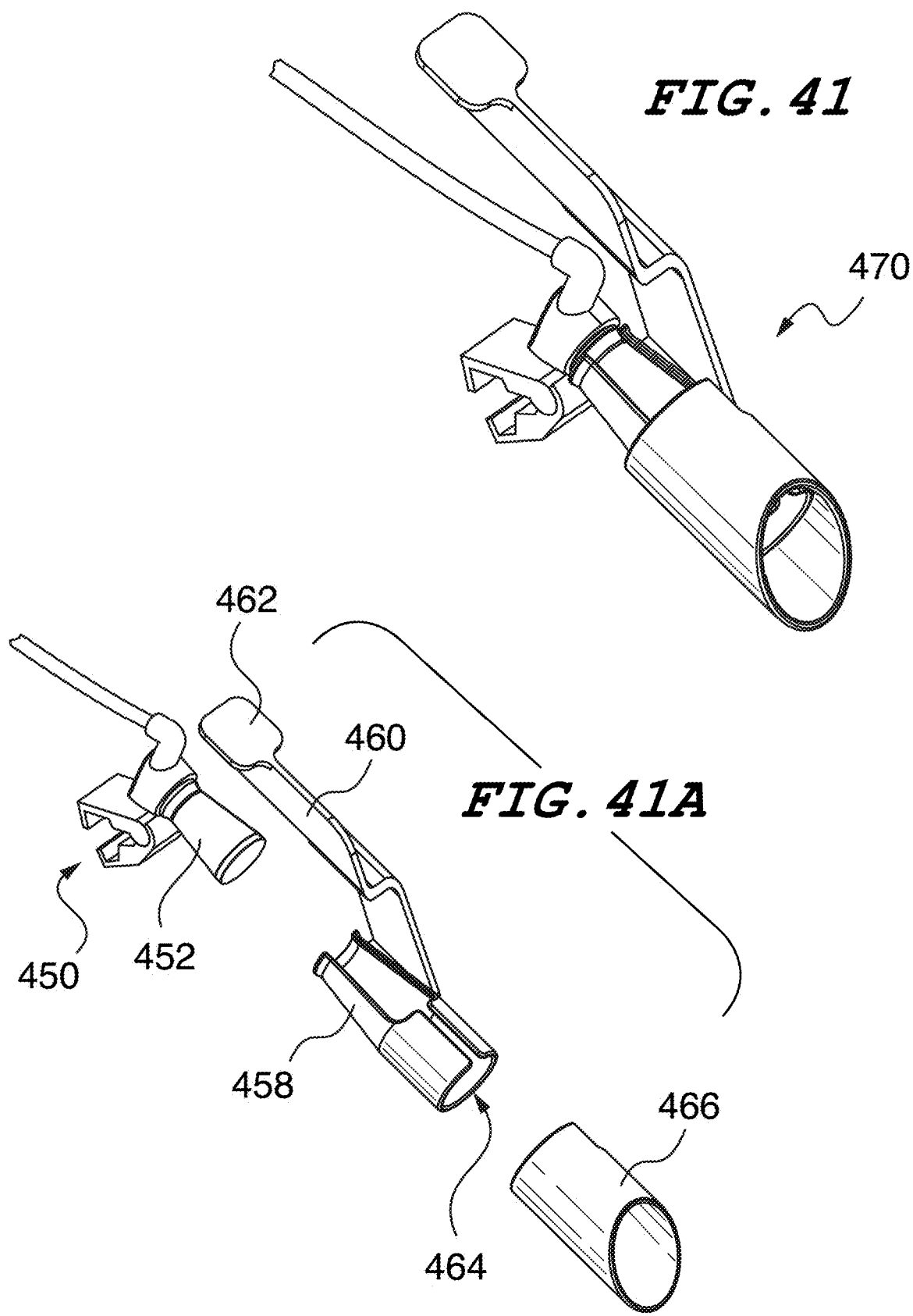

PERSONAL PROTECTIVE EQUIPMENT ADAPTER SYSTEM FOR USE WITH MEDICAL DEVICES AND METHODS OF MAKING AND USING SAME

CROSS-REFERENCE TO RELATED APPLICATION

This application claims benefit of U.S. Patent Application 63/600,148, filed on Nov. 17, 2023, the disclosure of which is hereby incorporated by reference in its entirety to provide continuity of disclosure to the extent such a disclosure is not inconsistent with the disclosure herein.

FIELD OF THE INVENTION

The present invention is generally related to a personal protective equipment ("PPE") adapter system for use with medical devices such as augmented/virtual/mixed reality ("AR") devices and light devices. The system would securely hold the PPE to existing AR/VR/MR headset and lighting solutions. The system would allow the AR devices and lighting devices to operate in surgical environments where a face shield is required.

BACKGROUND OF THE INVENTION

Prior to the present invention, as set forth in general terms above and more specifically below, it is known that AR solutions for existing industry applications do not require full PPE or even protective face shields. In the surgical environment where full face coverings are required, the ability to maintain adequate performance of the spatial imaging system has proven to be a challenge. In particular, cameras are calibrated without the requirement to be able to image through an additional substrate such as a face shield. This is a challenge specifically for the center camera of the spatial imaging system of the AR device. Therefore, it would be desired if the PPE was equipped with an adapter that did not adversely affect the spatial imaging system, specifically the center camera of the spatial imaging system, while the PPE and the spatial imaging system were being used during a medical procedure.

It is a purpose of this invention to fulfill these and other needs in the employing a spatial imaging system with PPE during a medical procedure art in a manner more apparent to the skilled artisan once given the following disclosure.

The preferred PPE adapter system for use with AR devices and lighting devices, according to various embodiments of the present invention, offers the following advantages: ease of use; lightness in weight; the ability to use the AR device and/or lighting device in conjunction with a face shield; the ability to use the adapter system on a variety of AR and/or lighting devices; portability; ease of attachment of the adapter to the AR and/or lighting device; ease of removal of the adapter from the AR and/or lighting device; and reduced cost. In fact, in many of the preferred embodiments, these advantages are optimized to an extent that is considerably higher than heretofore achieved in prior, known systems and methods for employing a spatial imaging system and a lighting system with PPE during a medical procedure.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 11 is a side view of the PPE adapter system being attached to the first AR device and the face shield attached to the PPE adapter, constructed according to an embodiment of the present invention;

FIG. 12 is a schematic illustration of one embodiment of a second AR device, according to the prior art;

FIGS. 41 and 41a are isometric illustrations of the baffle assembly being attached to the light device, constructed according to an embodiment of the present invention;

DETAILED DESCRIPTION OF THE PREFERRED EMBODIMENTS OF THE INVENTION

In order to address the shortcomings of the prior, known systems and methods for employing a spatial imaging system and lighting systems with PPE during a medical procedure, it would be desirable if the spatial imaging system, particularly the AR device, and the lighting system was equipped with an adapter that did not adversely affect the spatial imaging system and/or the lighting system, specifically the center camera of the spatial imaging system, while the PPE and the spatial imaging system and/or lighting system were being used during a medical procedure.

PPE Adapter System for Use With a First AR Device

Figure 1:
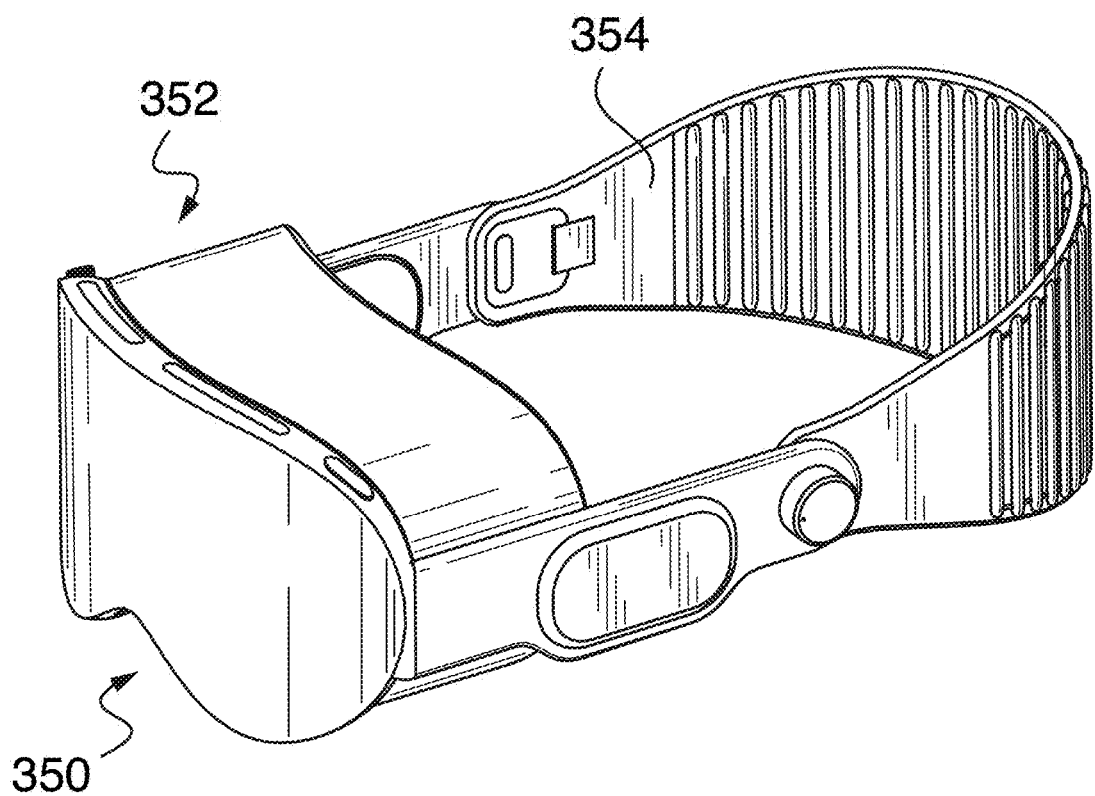
FIG. 1 is a schematic, isometric view of one embodiment of a first AR device, according to the prior art.
Figure 2:
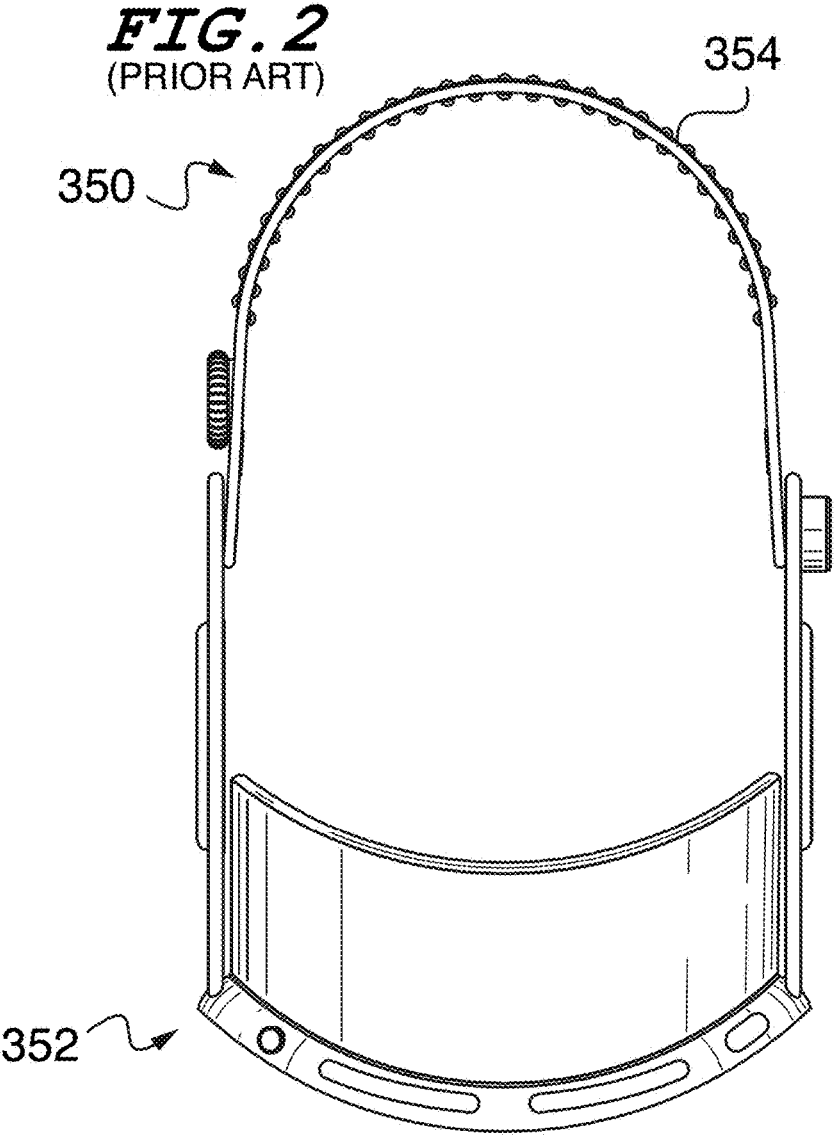
FIG. 2 is a schematic, top view of the one embodiment of a first AR device, according to the prior art.
Figure 3:
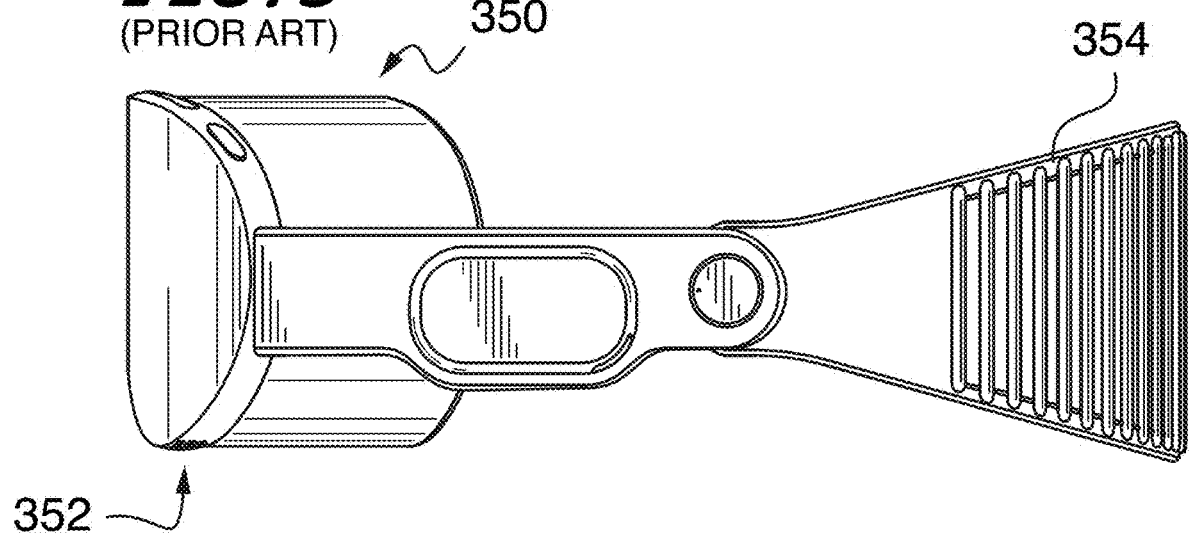
FIG. 3 is a schematic, side view of the one embodiment of a first AR device, according to the prior art.

Referring now to FIG. 1-11A, there is illustrated a personal protective equipment ("PPE") adapter system 300 for use with augmented reality ("AR") device 350. As shown in FIGS. 1-3, there is illustrated one embodiment of a conventional AR device 350. Typically, AR device 350 includes, in part, an AR viewing display 352 and headband 354.

Figure 4:
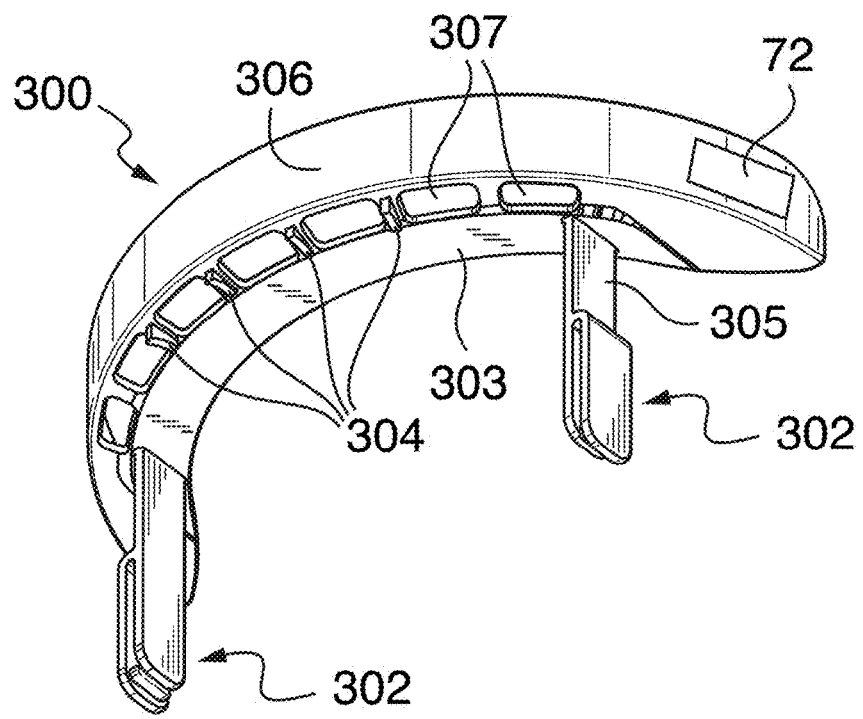
FIG. 4 is a isometric, bottom view of a PPE adapter system for use with the first AR device, constructed according to an embodiment of the present invention.
Figure 5:
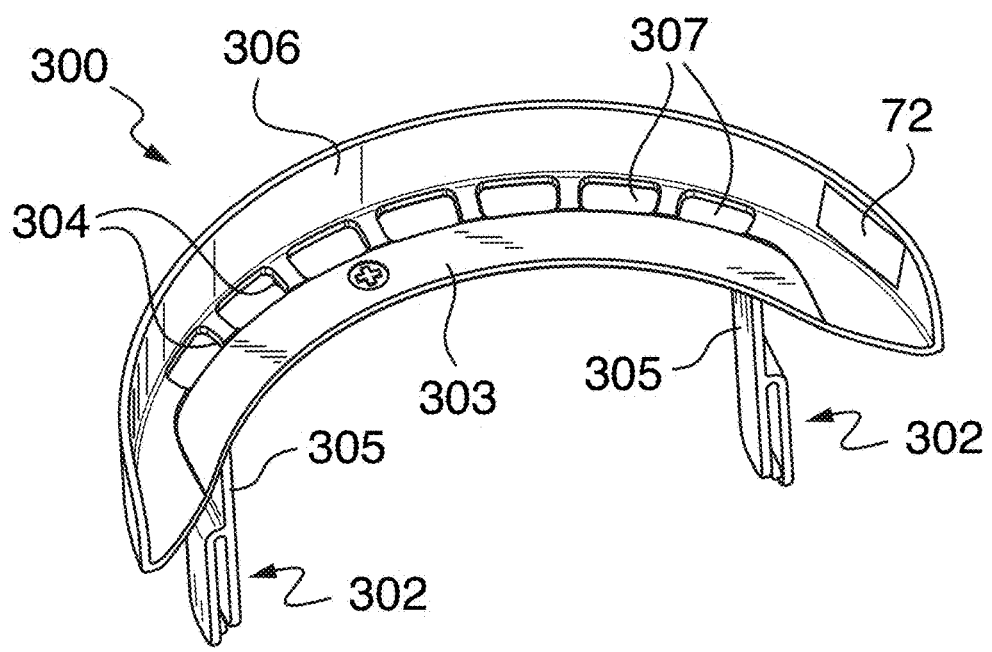
FIG. 5 is an isometric, top view of the PPE adapter system for use with the first AR device, constructed according to an embodiment of the present invention.

With respect to FIGS. 4 and 5, there is illustrated PPE adapter system 300 prior to being attached to AR device 350. As shown in FIGS. 4 and 5, PPE adapter system 300 includes, in part, hook and loop fasteners 72, snap-over mounting hooks 302, base 303, indexing posts 304, extension 305, wall 306, and openings 307. Preferably, PPE adapter system 300 is constructed of any suitable durable, UV resistant, heat resistant, lightweight, high strength polymeric material.

Figure 6:
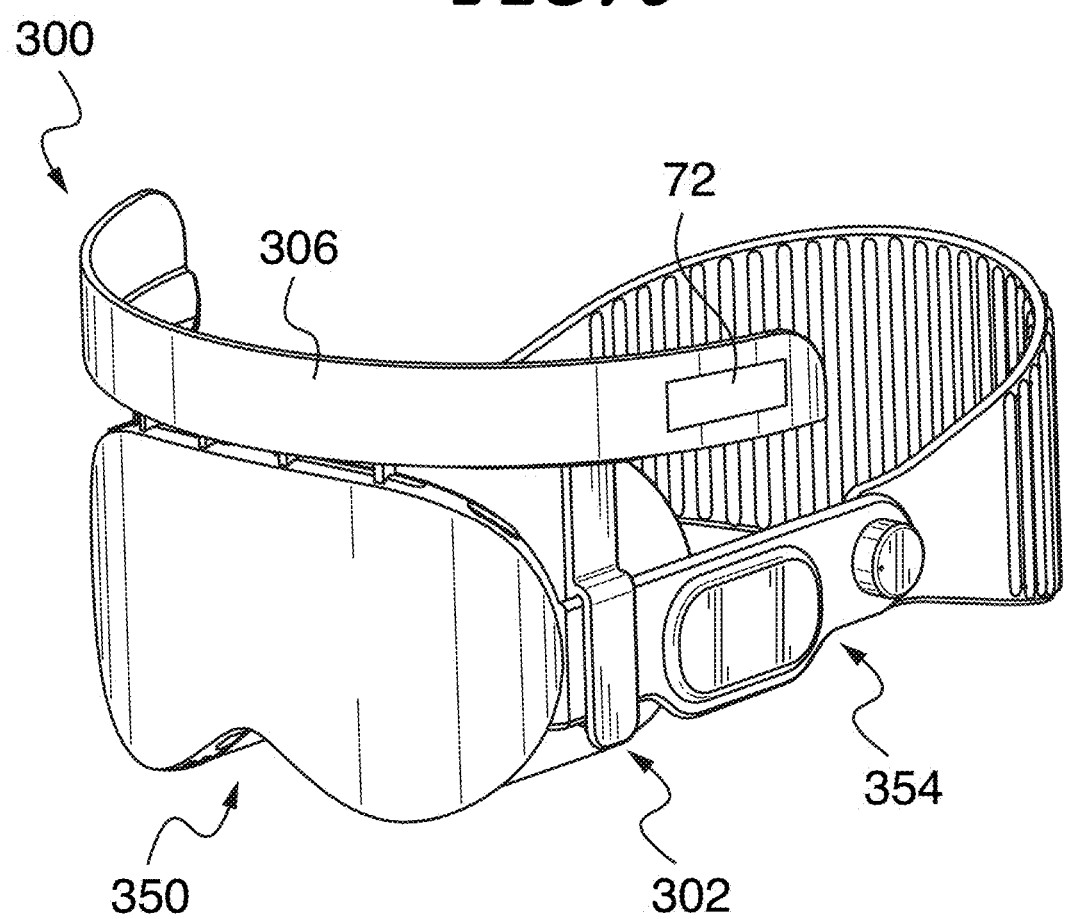
FIG. 6 is an isometric, front view of the PPE adapter system being attached to the first AR device, constructed according to an embodiment of the present invention.
Figure 7:
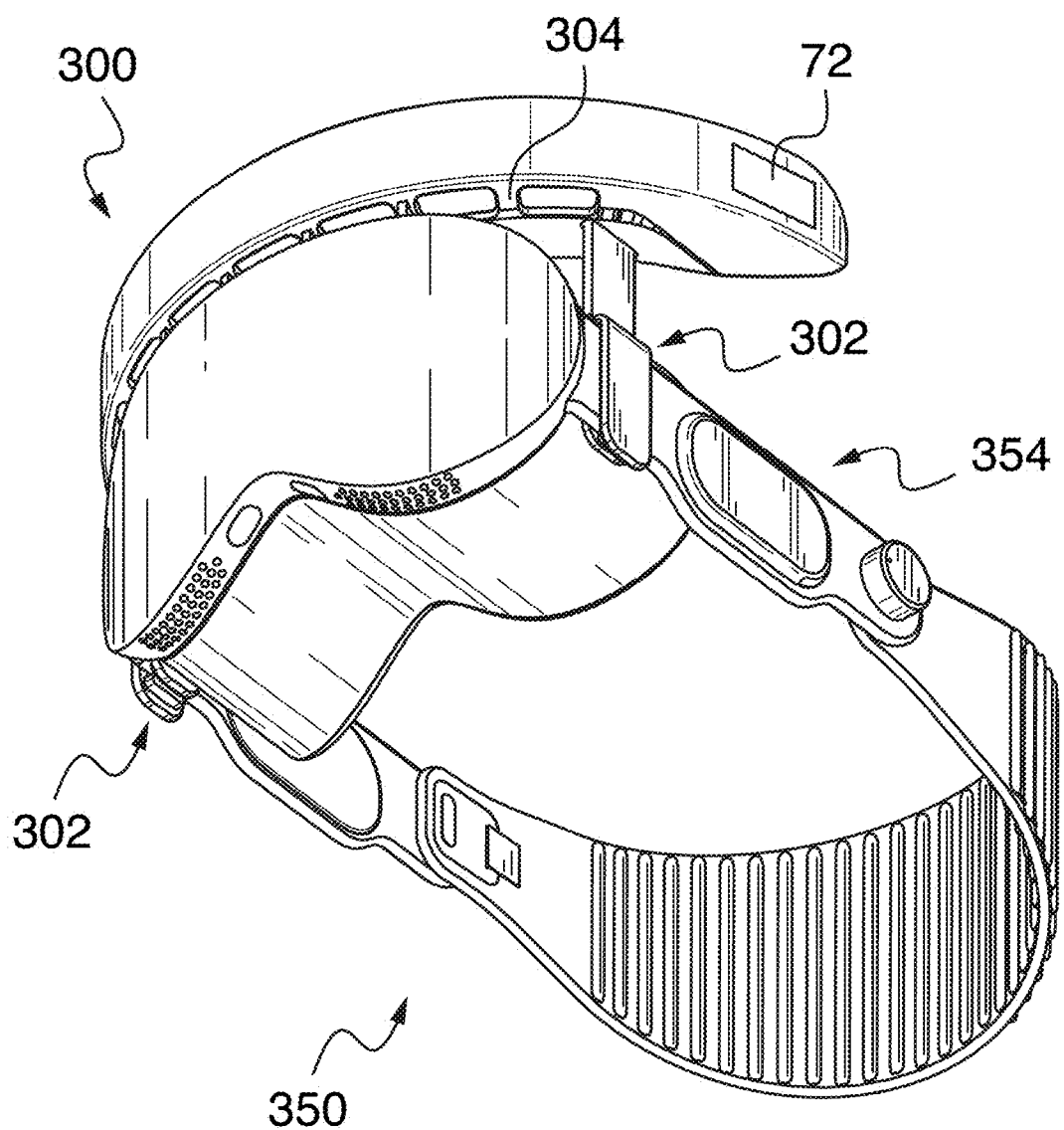
FIG. 7 is an isometric, bottom view of the PPE adapter system being attached to the first AR device, constructed according to an embodiment of the present invention.

With respect to FIGS. 6 and 7, there is illustrated PPE adapter system 300 being removably attached to AR device 350. In particular, PPE adapter system 300 is located on AR device 350 so that snap-over mounting hooks 302 are retained along portions of headband 354.

A unique aspect of the present invention is the use of indexing posts 304 that create openings 307 in PPE adapter system 300. In particular, openings 307 are open areas on the PPE adapter system 300 that allow for air to circulate within a hood 100 (FIG. 11A), reduce weight, and reduce material usage in constructing the PPE adapter system 300.

Another unique aspect of the present invention is that the PPE adapter system 300 can be easily and quickly attached to the AR device 350 and removed from the AR device 350. In particular, snap-over mounting hooks 302 can be quickly located over headband 354. The PPE adapter system 300 can then be removably attached to the AR device 350 through the use of the snap-over mounting hooks 302. Conversely, the PPE adapter system 300 can be easily and quickly removed from the AR device 350 by removing the snap-over mounting hooks 302 from the headband 354.

A yet another unique aspect of the present invention is the ability of the PPE adapter system 300 to be able to attach to a face shield 74 (FIGS. 8-11A). In particular, as shown in FIGS. 8-11A, a conventional face shield 74 can be attached to the PPE adapter system 300. It is important to understand that in many medical procedures such as surgical procedures, a face shield 74 may be required to be worn by the medical personnel performing the surgical procedure. However, the present invention could be modified to allow for the face shield 74 to be tilted at an angle 76 with respect to the AR device 350. In this manner, PPE adapter system 300 would then be designed to have a forward tilt in order to move the face shield 74 as close to the front of the AR device 350, as possible.

Figure 8:
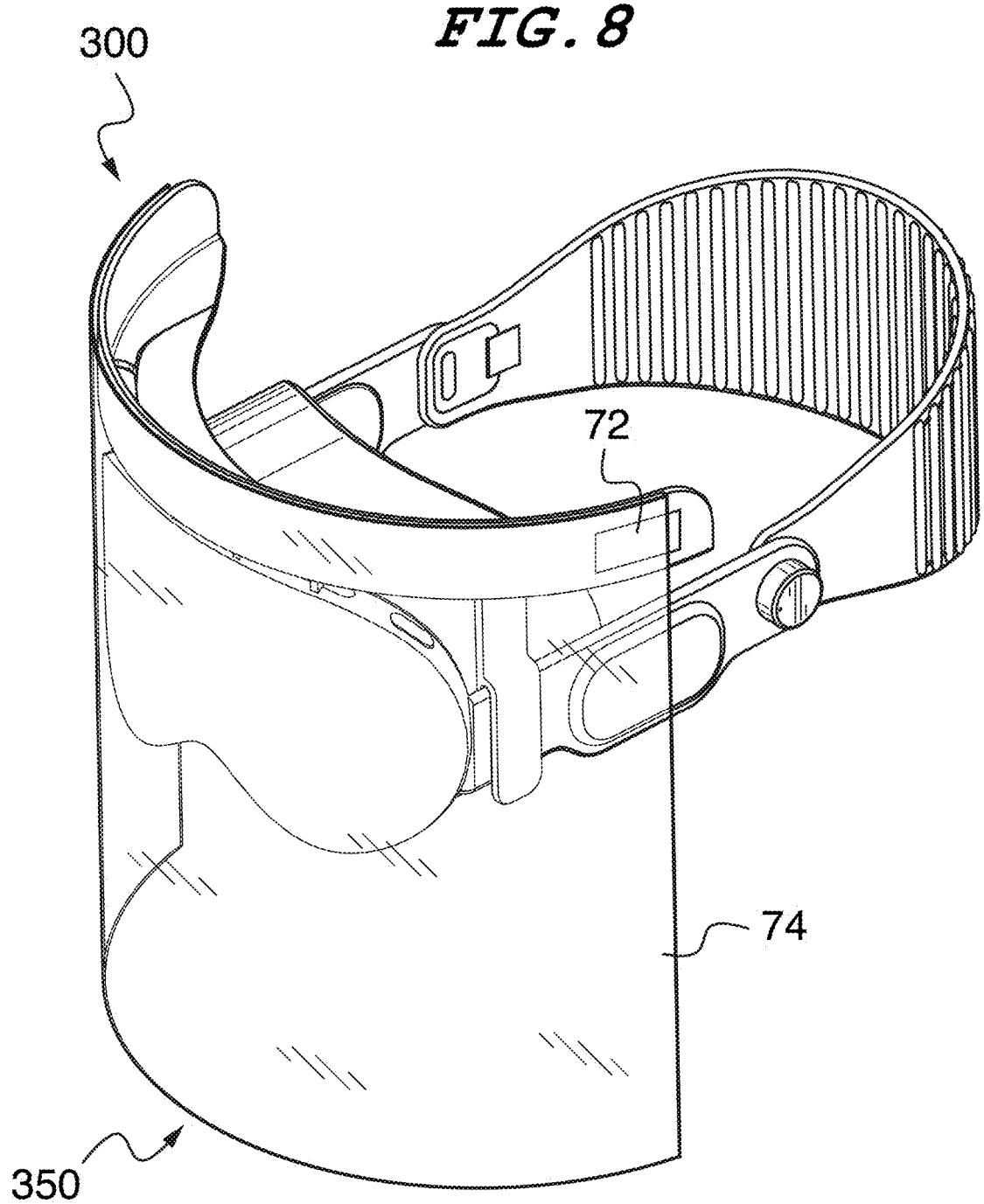
FIG. 8 is an isometric, front view of the PPE adapter system being attached to the first AR device and the face shield attached to the PPE adapter, constructed according to an embodiment of the present invention.
Figure 9:
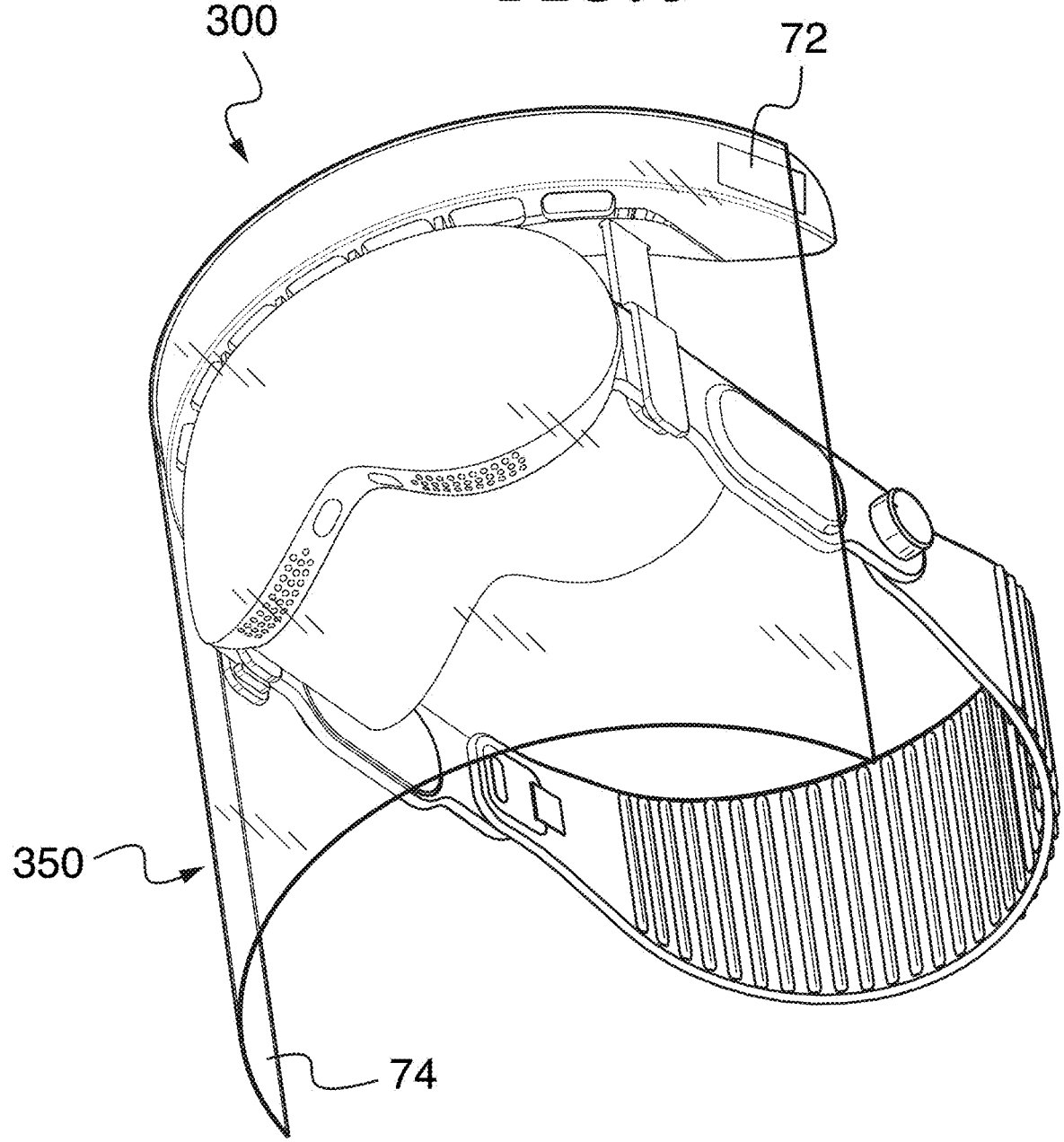
FIG. 9 is an isometric, bottom view of the PPE adapter system being attached to the first AR device and the face shield attached to the PPE adapter, constructed according to an embodiment of the present invention.
Figure 10:
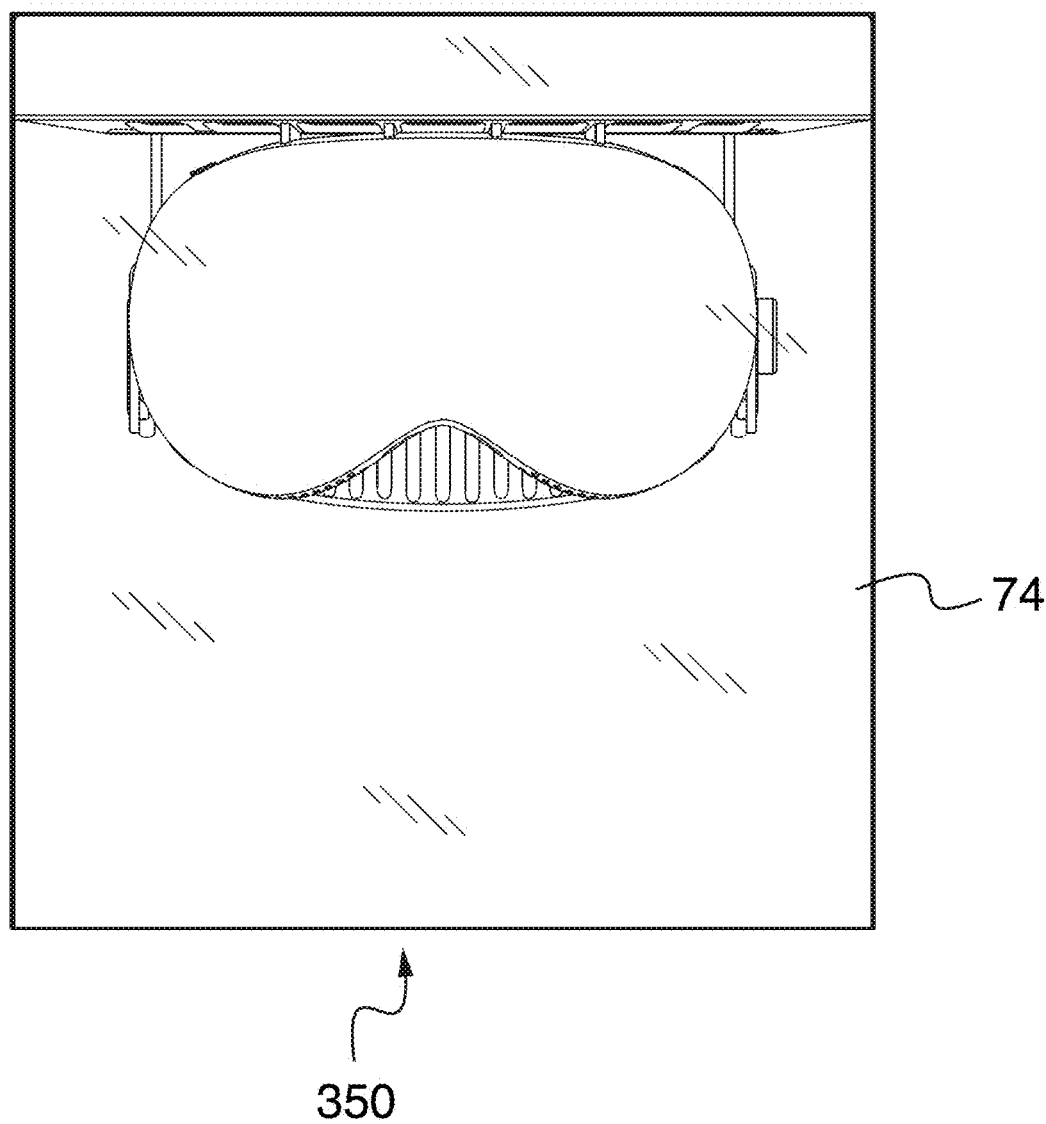
FIG. 10 is another front view of the PPE adapter system being attached to the first AR device and the face shield attached to the PPE adapter, constructed according to an embodiment of the present invention.
Figure 11A:
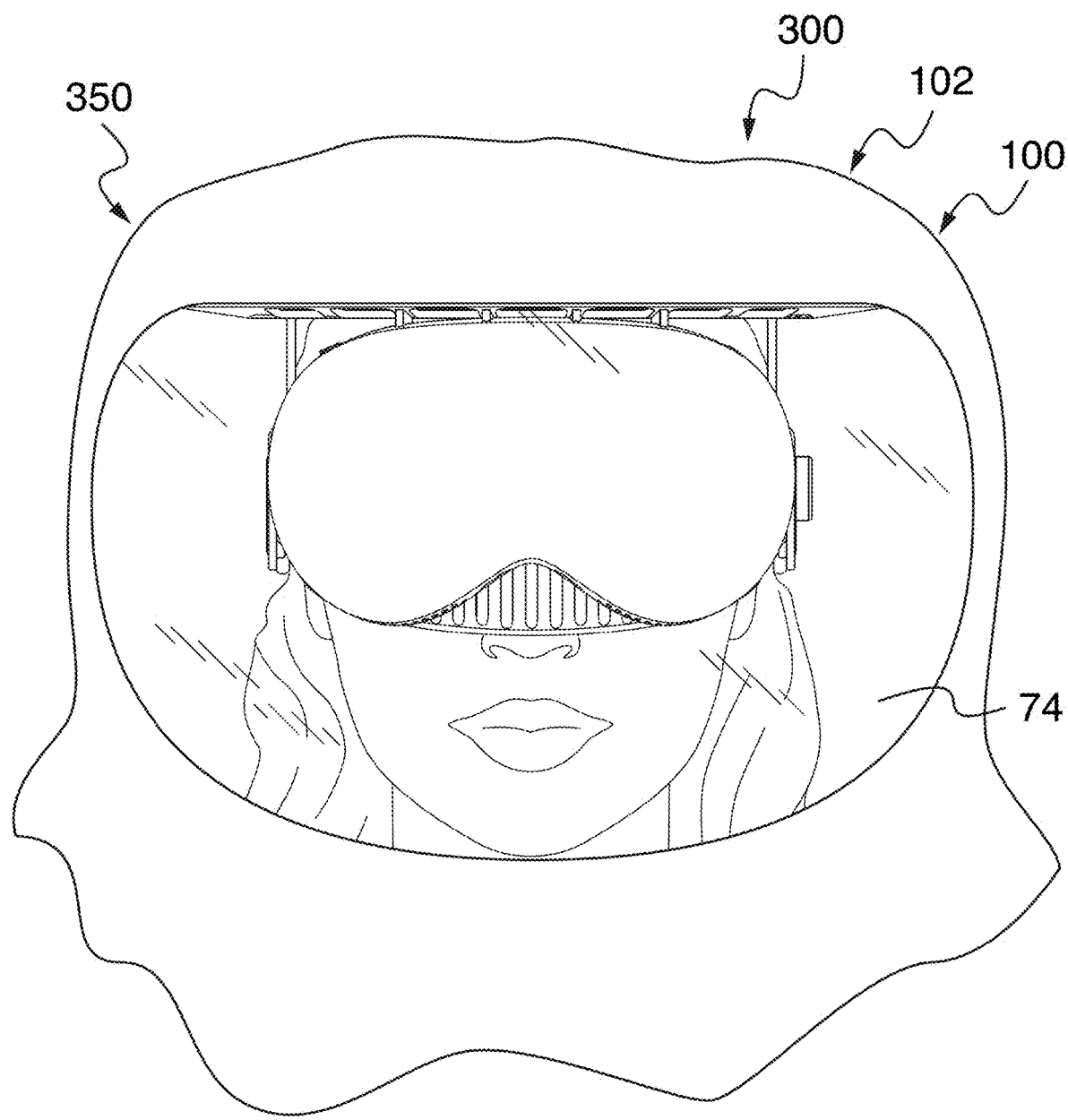
FIG. 11A is a front view of the PPE adapter system being attached to the first AR device and the PPE adapter system being worn by a user while the user is donning a PPE having a hood, constructed according to an embodiment of the present invention.

A still another unique aspect of the present invention is the use of hook and loop fasteners 72 located around a periphery of wall 306. The unique aspect of use of the hook and loop fasteners 72 is that the hook and loop fasteners 72 allow the PPE adapter system 300 to be removably attached to the hood 102 of conventional surgical gown 100 (FIG. 11A). In this manner, once the PPE adapter system 300 has been removably attached to AR device 350 and the AR device 350 has been placed on the head of the medical personnel, the surgical gown 100 can be located over the medical personnel and the hood 102 can be securely attached to the PPE adapter system 300 so that the face shield 74 and hood 102 remain in place on the medical personnel, especially during the medical procedure. As shown in FIGS. 8 and 9, the hook and loop fasteners 72 can be attached to the hood at a location along a top edge of the face shield 74.

Furthermore, with respect to FIG. 11A, there is illustrated PPE adapter system 300 being attached to the AR device 350 and the AR device 350 being worn by a user such as medical personnel. As shown in FIG. 11A, the medical personnel has donned a surgical gown 100 having a hood 102 and a face shield 74. As shown in FIG. 11A, the face shield 74 is located in close proximity to the AR device 350 so that the face shield 74 does not produce additional artifacts such as reflections when the AR device 350 is being utilized.

PPE Adapter System for Use With a Second AR Device

Figure 13:
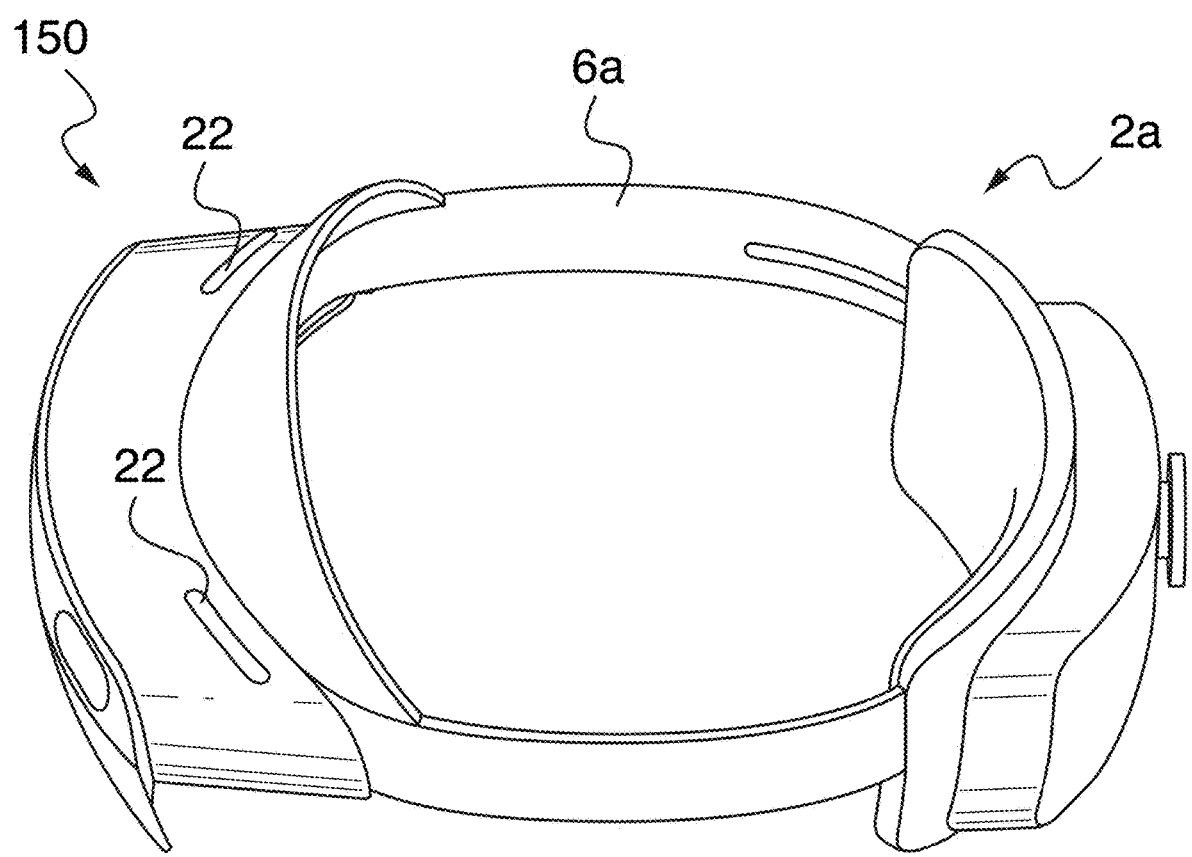
FIG. 13 is an isometric, side view of the one embodiment of the second AR device, according to the prior art.

Referring now to FIG. 12-21, there is illustrated another embodiment of a personal protective equipment ("PPE") adapter system 50a for use with another model of an augmented reality ("AR") device 2a. As shown in FIGS. 12 and 13, there are illustrated one embodiment of another conventional AR device 2a. Typically, AR device 2a includes, in part, a head gear 6a and a spatial imaging system 150 having tracking cameras 152, a red, green and blue ("RGB") camera 154, and a depth (near and far range) camera 156. Also, as shown in FIG. 14d, AR device 2a also includes a plurality of chunnels 22.

Figure 14A:
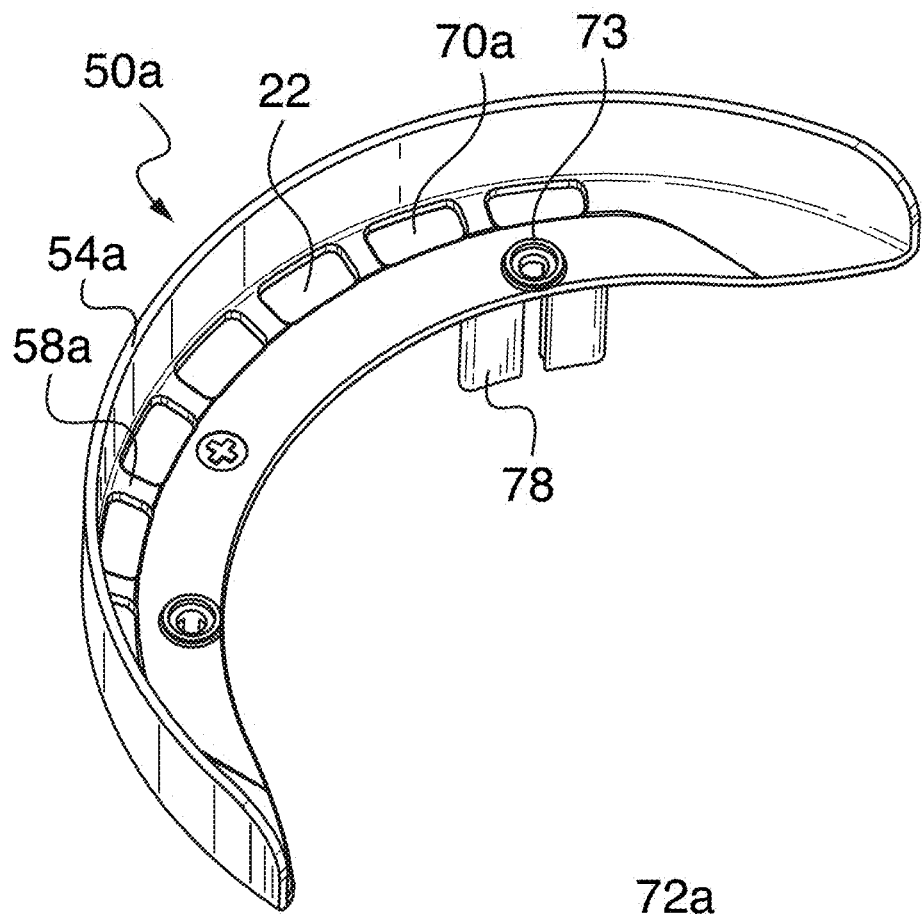
FIGS. 14A-14D are various views a PPE adapter system for use with the second AR device, constructed according to an embodiment of the present invention.
Figure 14B:
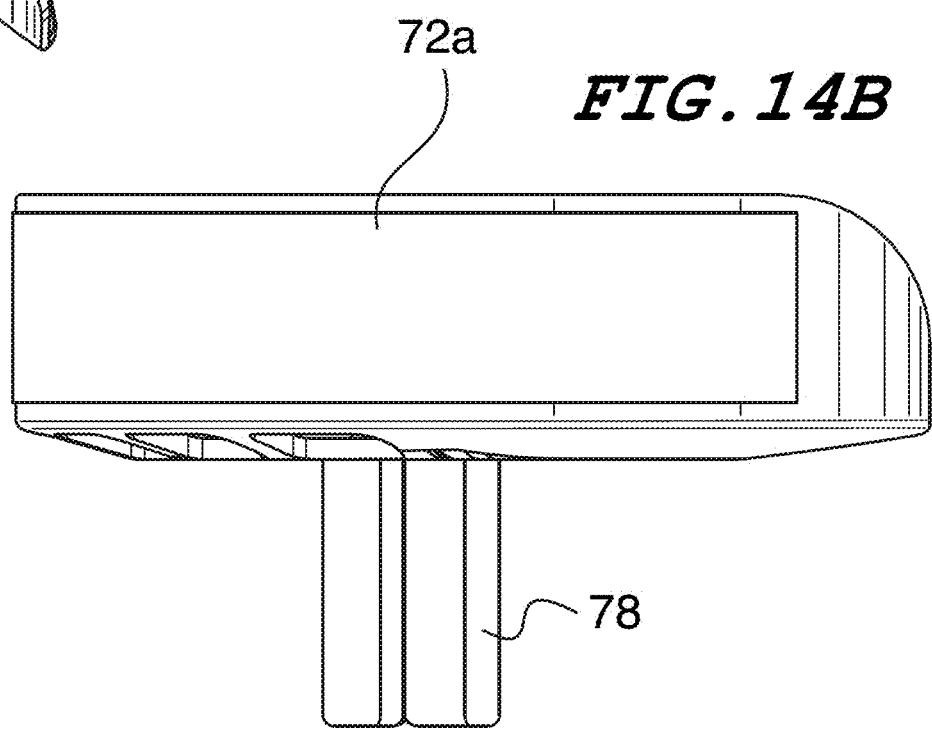
Figure 14C:
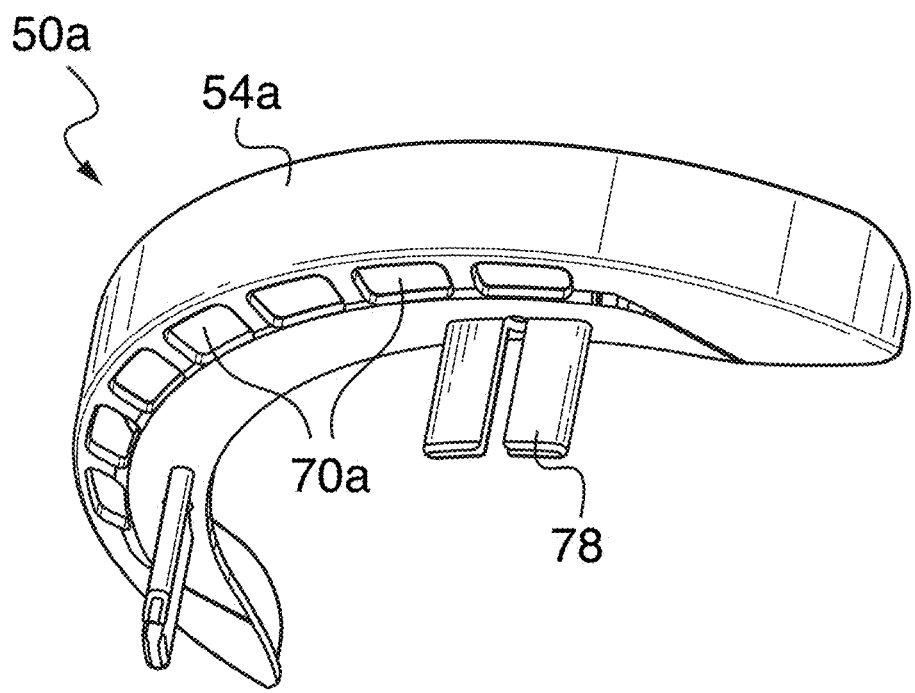
Figure 14D:
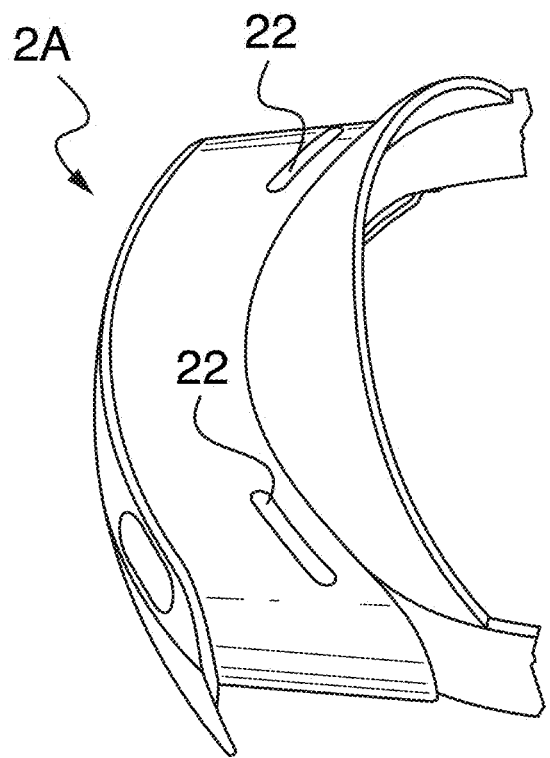

With respect to FIGS. 14a-14c, there is illustrated PPE adapter system 50a prior to being attached to AR device 2a. As shown in FIGS. 14a-14c, PPE adapter system 50a includes, in part, wall 54a, base 57, extension 58a, openings 70a, hook and loop fasteners 72a, fastener openings 73, and alignment posts 78. It is to be understood that wall 54a, extension 58a, openings 70a, and hook and loop fasteners 72a are constructed by conventional techniques such as printing, molding, forming or the like. Preferably, except for hook and loop fasteners 72a, PPE adapter system 50a is constructed of any suitable durable, UV resistant, heat resistant, lightweight, high strength polymeric material.

Figure 15:
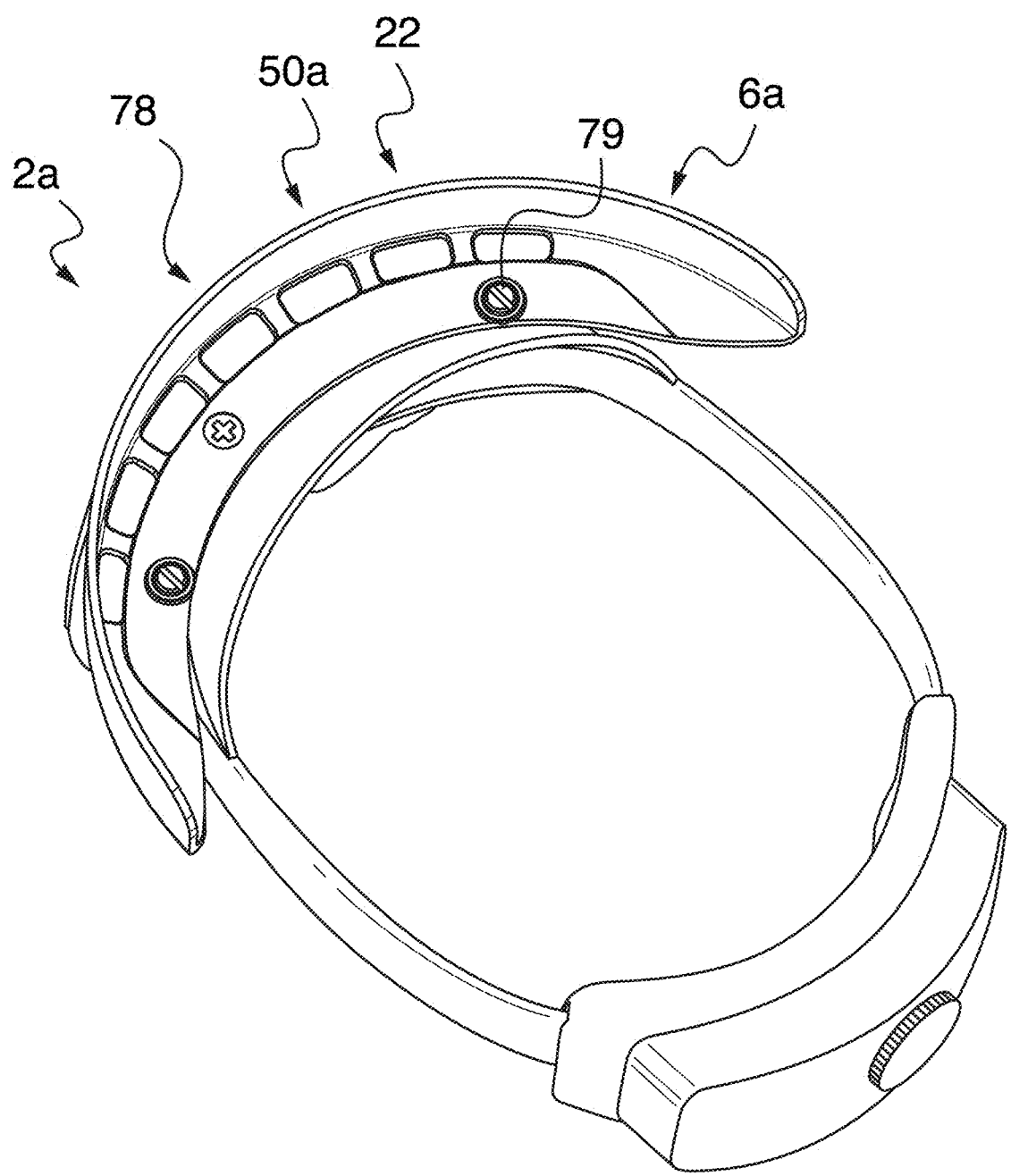
FIGS. 15-17 are schematic views of the PPE adapter system being attached to the second AR device, constructed according to an embodiment of the present invention.
Figure 16:
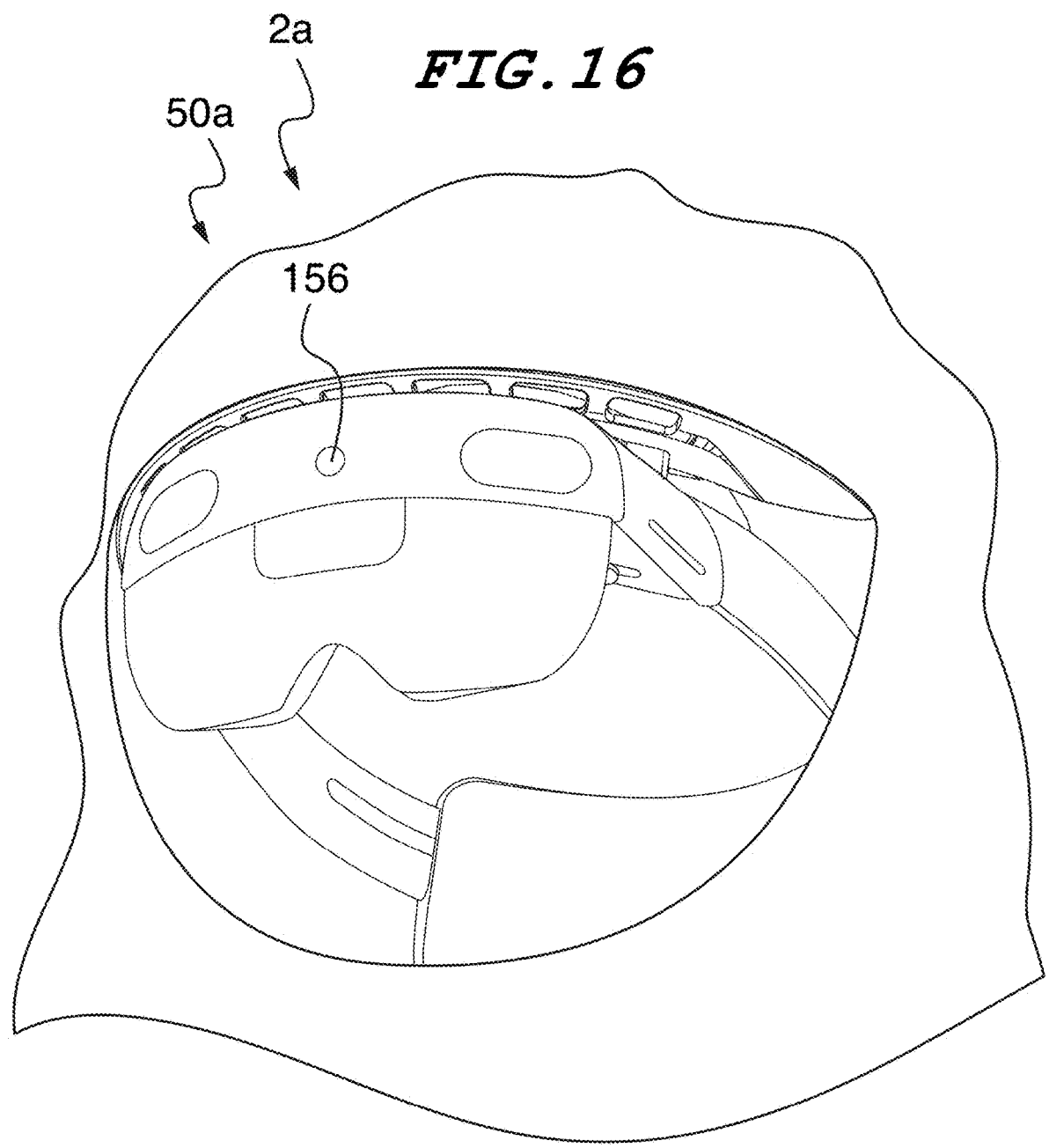
Figure 17:
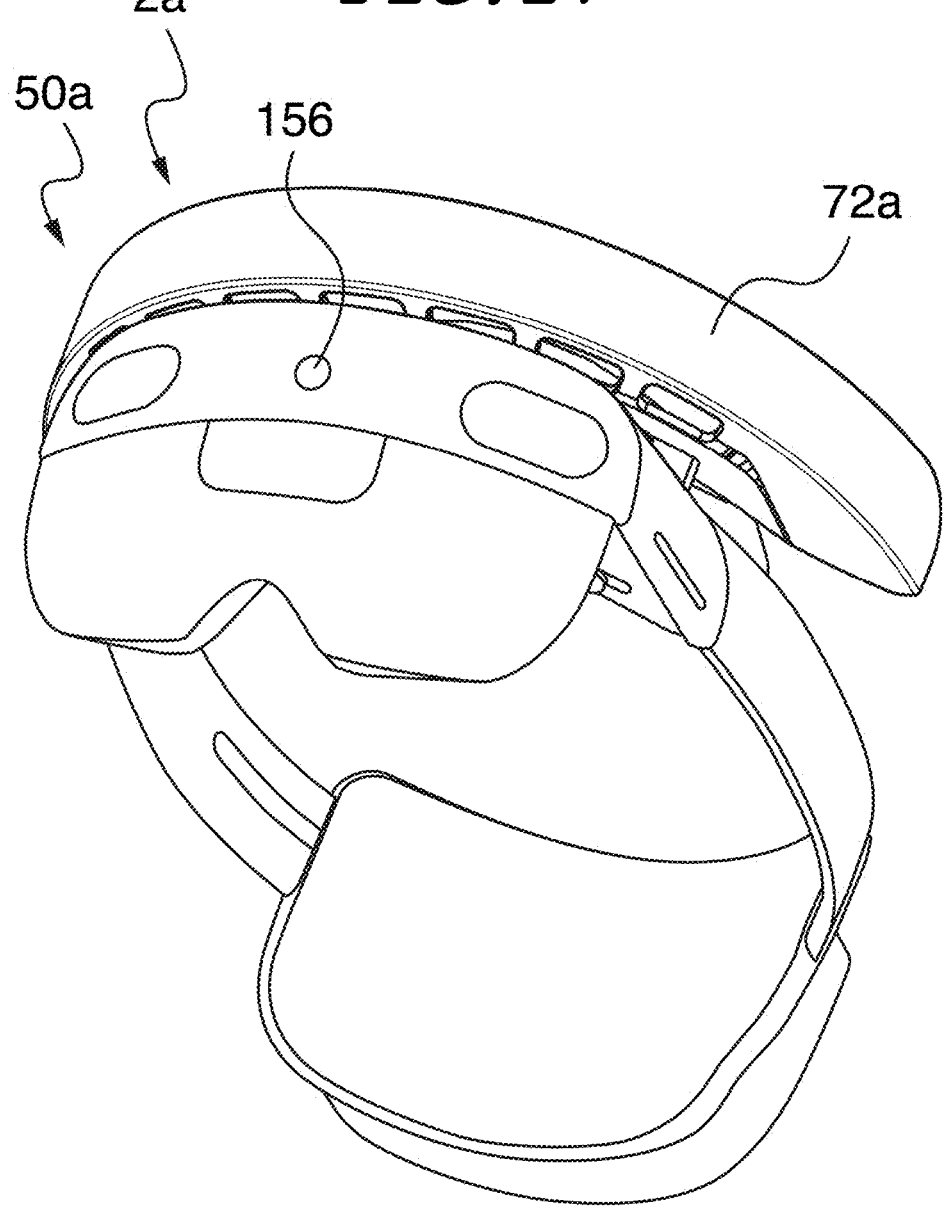

With respect to FIGS. 15-17, there is illustrated PPE adapter system 50a being removably attached to AR device 2a. In particular, PPE adapter system 50a is located on AR device 2a so that alignment posts 78 are retained in chunnels 22 and threaded fasteners 79 are used to secure PPE adapter system 50a to AR device 2A through the use of fastener openings 73.

A unique aspect of the present invention is the use of openings 70a in PPE adapter system 50a. As discussed above, openings 70a are open areas on the PPE adapter system 50a that allow for air to circulate within a hood 100 (FIGS. 19 and 21), reduce weight, and reduce material usage in constructing the PPE adapter system 50a.

Another unique aspect of the present invention is that the PPE adapter system 50a can be easily and quickly attached to the AR device 2a and removed from the AR device 2a. In particular, the alignment posts 78 can be located over chunnels 22. The PPE adapter system 50a can then be removably attached to the AR device 2a through the use of the threaded fasteners 79 and threaded fastener openings 73. The PPE adapter system 50a can be securely attached to the AR device 2a by placing alignment posts 78 in the chunnels 22 and attaching the threaded fasteners 79 to the AR device 2a through threaded fastener openings 73. Conversely, the PPE adapter system 50a can be easily and quickly removed from the AR device 2a by removing the threaded fasteners 79 from the AR device 2a and lifting the alignment posts 78 away from the chunnels 22.

Figure 18:
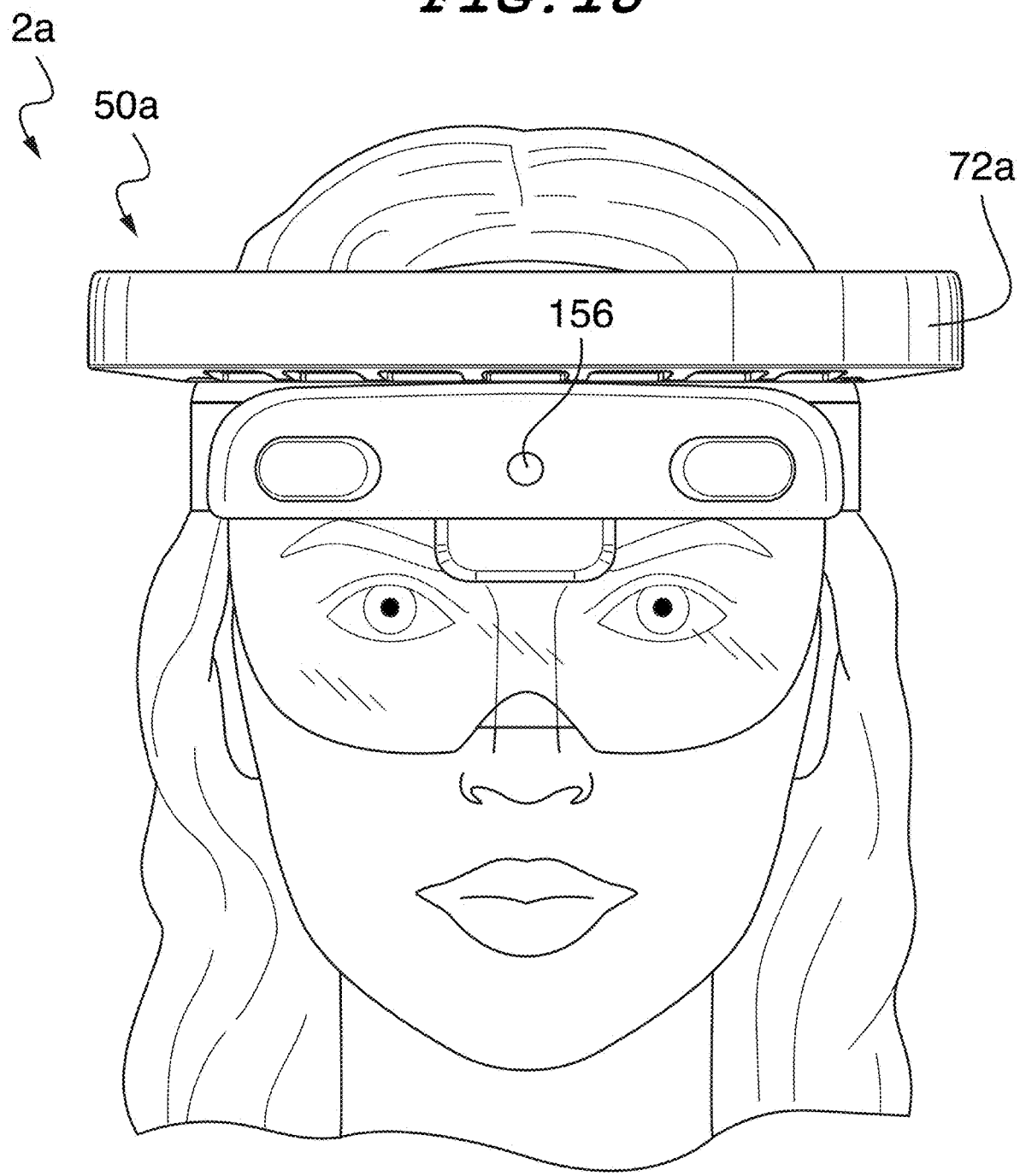
FIG. 18 is a front view of the PPE adapter system being attached to the second AR device and the PPE adapter system being worn by a user, constructed according to an embodiment of the present invention.
Figure 19:
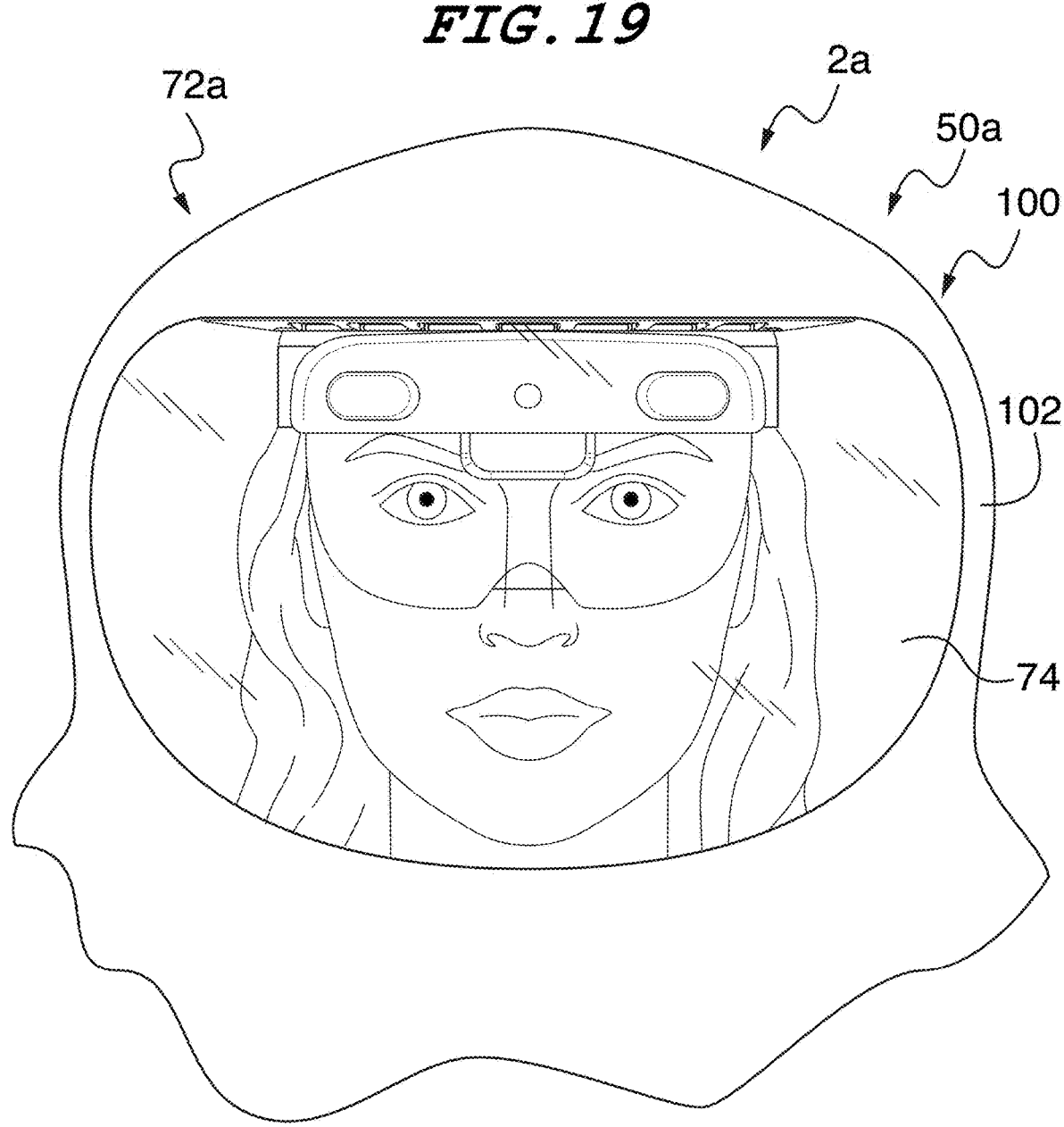
FIG. 19 is a front view of the PPE adapter system being attached to the second AR device and the PPE adapter system being worn by a user while the user is donning a PPE having a hood, constructed according to an embodiment of the present invention.
Figure 20:
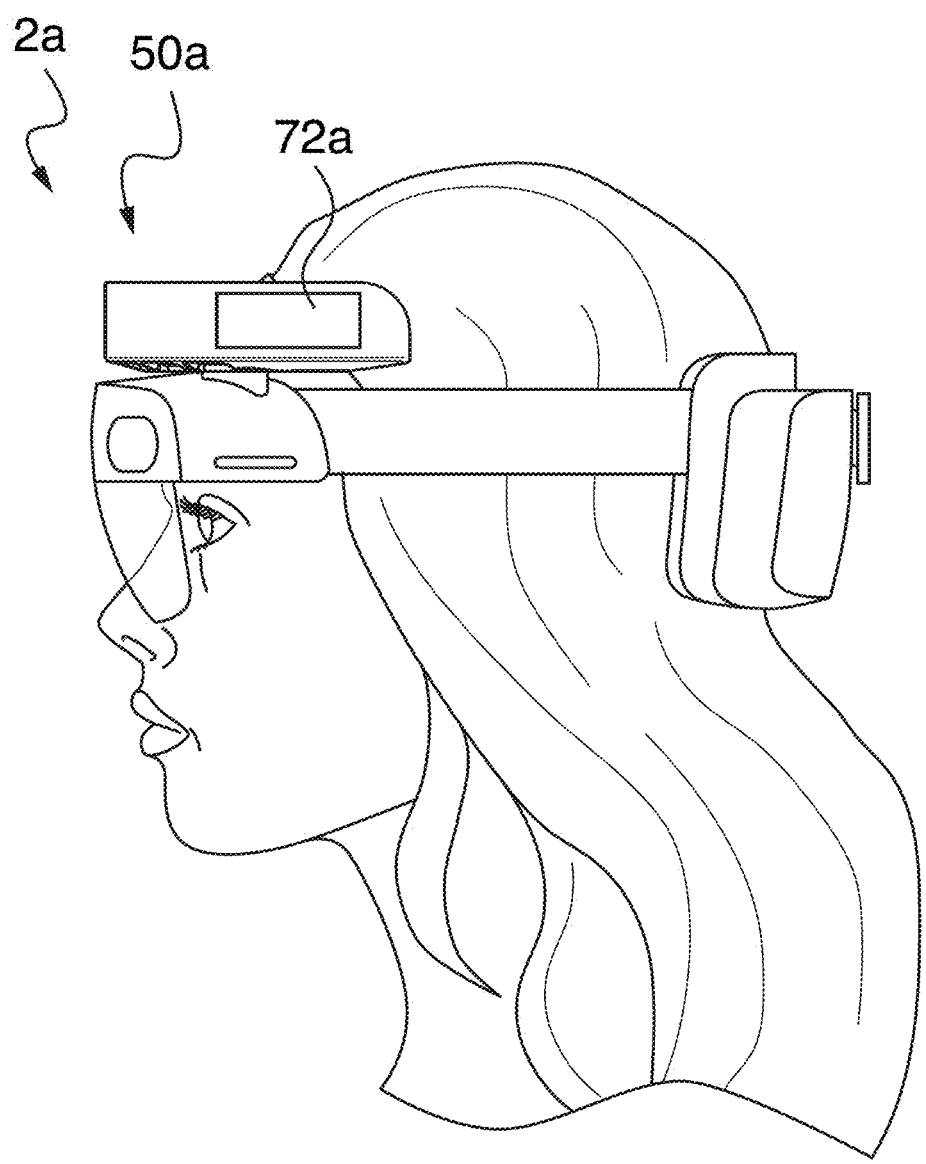
FIG. 20 is a side view of the PPE adapter system being attached to the second AR device and the PPE adapter system being worn by a user, constructed according to an embodiment of the present invention.
Figure 21:
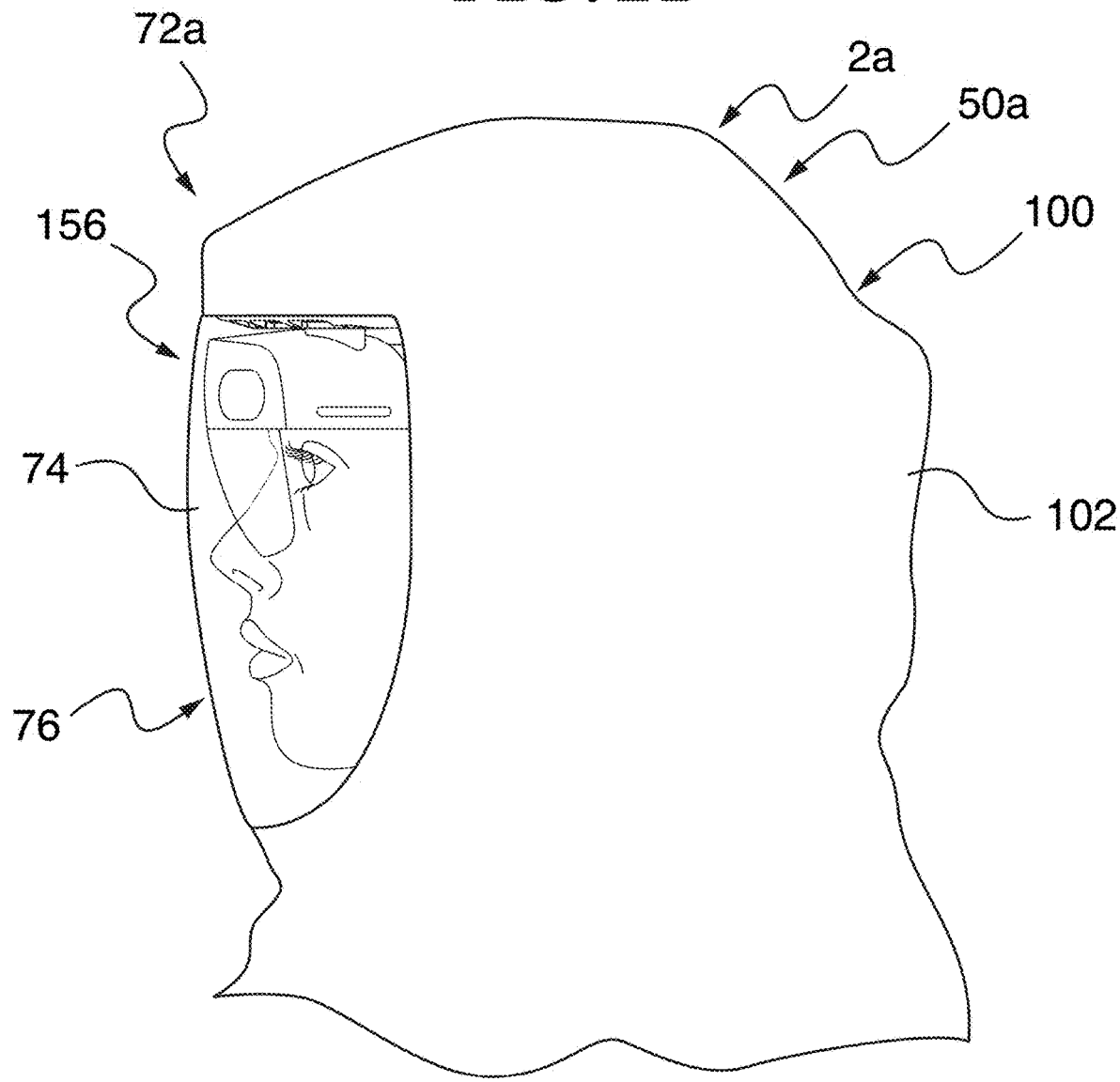
FIG. 21 is a side view of the PPE adapter system being attached to the second AR device and the PPE adapter system being worn by a user while the user is donning a PPE having a hood, constructed according to an embodiment of the present invention.

A yet another unique aspect of the present invention is the ability of the PPE adapter system 50a to be able to attach to a face shield 74 (FIGS. 18-21). In particular, as shown in FIGS. 19 and 21, a conventional face shield 74 can be attached to the PPE adapter system 50a. As discussed above, it is important to understand that in many medical procedures such as surgical procedures, a face shield 74 may be required to be worn by the medical personnel performing the surgical procedure. However, the present invention allows the face shield 74 to be tilted at an angle 76 with respect to the depth camera 156 (FIG. 21). In this manner, PPE adapter system 50*a* is designed to have a forward tilt in order to move the face shield 74 as close to the depth camera 156, as possible. This is needed so the depth camera 156 can calculate depth of objects without producing additional artifacts such as reflections. Furthermore, the tilt angle 76 should range between 5 and 15° with the preferable tilt angle being 10° in order to allow the face shield 74 to be in close proximity to the depth camera 156.

A still another unique aspect of the present invention is the use of hook and loop fasteners 72*a* located around a periphery of wall 54*a*. Preferably, hook and loop fasteners 72*a* are constructed in a similar manner as hook and loop fasteners 72. The unique aspect of use of the hook and loop fasteners 72*a* is that the hook and loop fasteners 72*a* allow the PPE adapter system 50*a* to be removably attached to the face shield 74 (FIGS. 19 and 21). In this manner, once the PPE adapter system 50*a* has been removably attached to AR device 2*a* and the AR device 2*a* has been placed on the head of the medical personnel, the surgical gown 100 can be located over the medical personnel and the hood 102 can be securely attached to the PPE adapter system 50*a* so that the face shield 74 and hood 102 remain in place on the medical personnel, especially during the medical procedure. As shown in FIG. 14*a*, the hook and loop fasteners 72*a* can be attached to the hood at a location along a top edge of the face shield 74.

Furthermore, with respect to FIGS. 18-21, there are illustrated several different views of the PPE adapter system 50*a* being attached to the AR device 2*a* and the AR device 2*a* being worn by a user such as medical personnel. As shown in FIGS. 18 and 20, the PPE adapter system 50*a* has been attached to the AR device 2*a* and the AR device 2*a* is being worn by a user such as medical personnel. As shown in FIGS. 19 and 21, the medical personnel has donned a surgical gown 100 having a hood 102 and a face shield 74. As best shown in FIG. 21, the face shield 74 is located in close proximity to the depth camera 156 so that the face shield 74 does not produce additional artifacts such as reflections when the depth camera 156 is being utilized.

PPE Adapter System for Use With a Third AR Device

Figure 22:
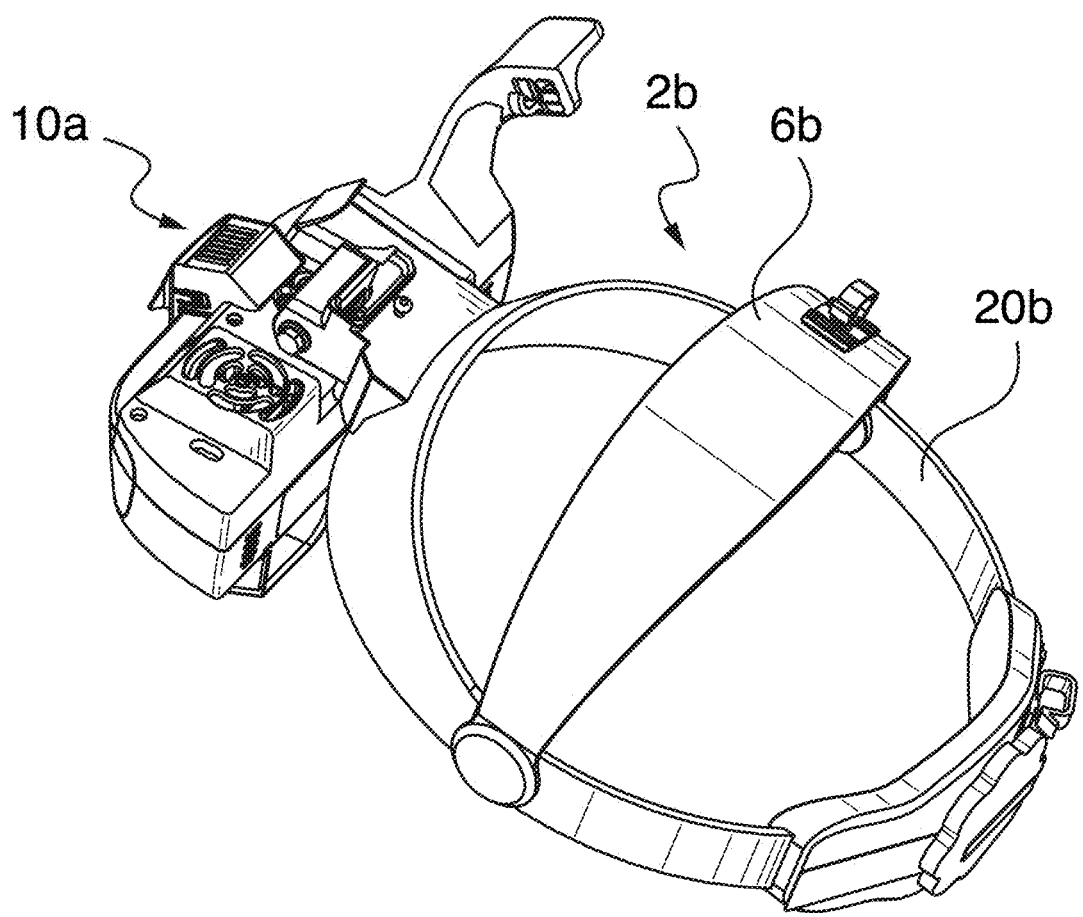
FIG. 22 is an isometric, top view of one embodiment of a third AR device, according to the prior art.
Figure 23:
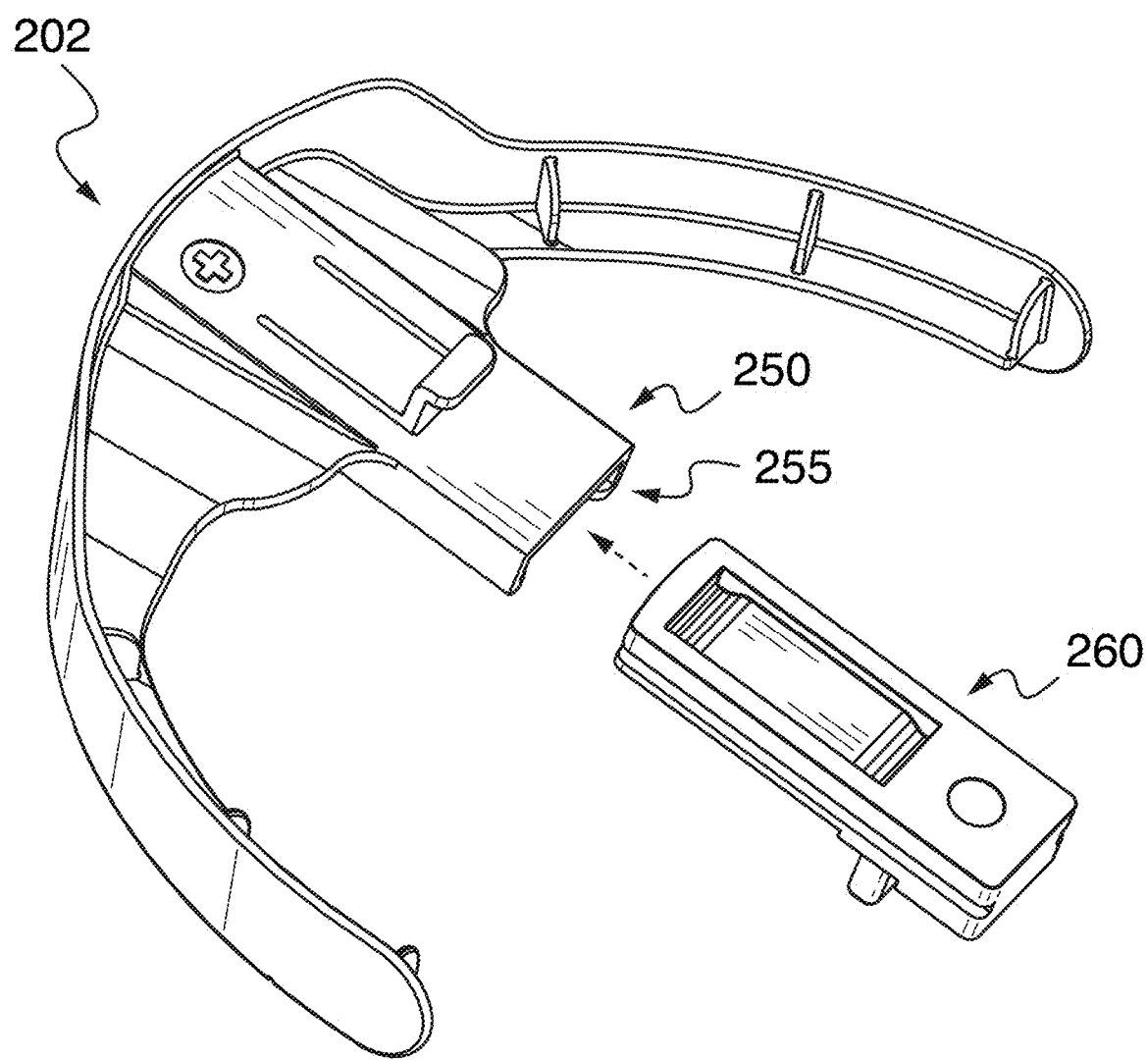
FIG. 23 is an isometric, top view of a PPE adapter system for use with the third AR device, constructed according to an embodiment of the present invention.

Referring now to FIGS. 22-29, there is illustrated another embodiment of a personal protective equipment ("PPE") adapter system 50*b* for use with another model of an augmented reality ("AR") device 2*b*. As shown in FIG. 22, there is illustrated one embodiment of another conventional AR device 2*b*, according to the prior art. Typically, this another AR device 2*b* includes, in part, most of the components as discussed above with respect to AR device 2*a*. However, AR device 2*b* also includes head gear 6*b*, front camera 10*a*, headband 20*b* (FIG. 22), and adapter 202 (FIG. 23).

Figure 24:
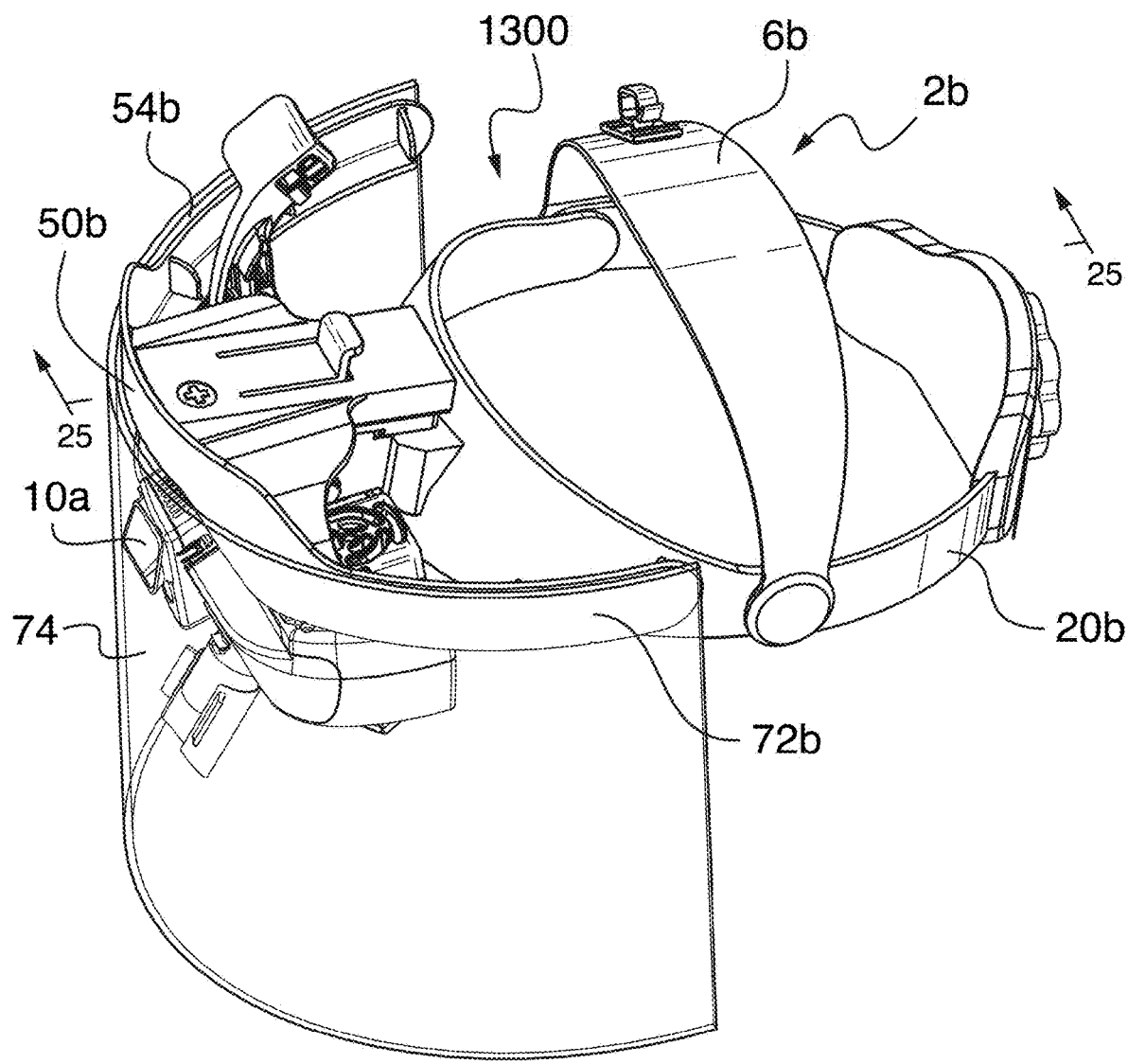
FIG. 24 is a schematic, side view of the face shield being attached to the PPE adapter system for use with the third AR device, constructed according to an embodiment of the present invention.
Figure 25:
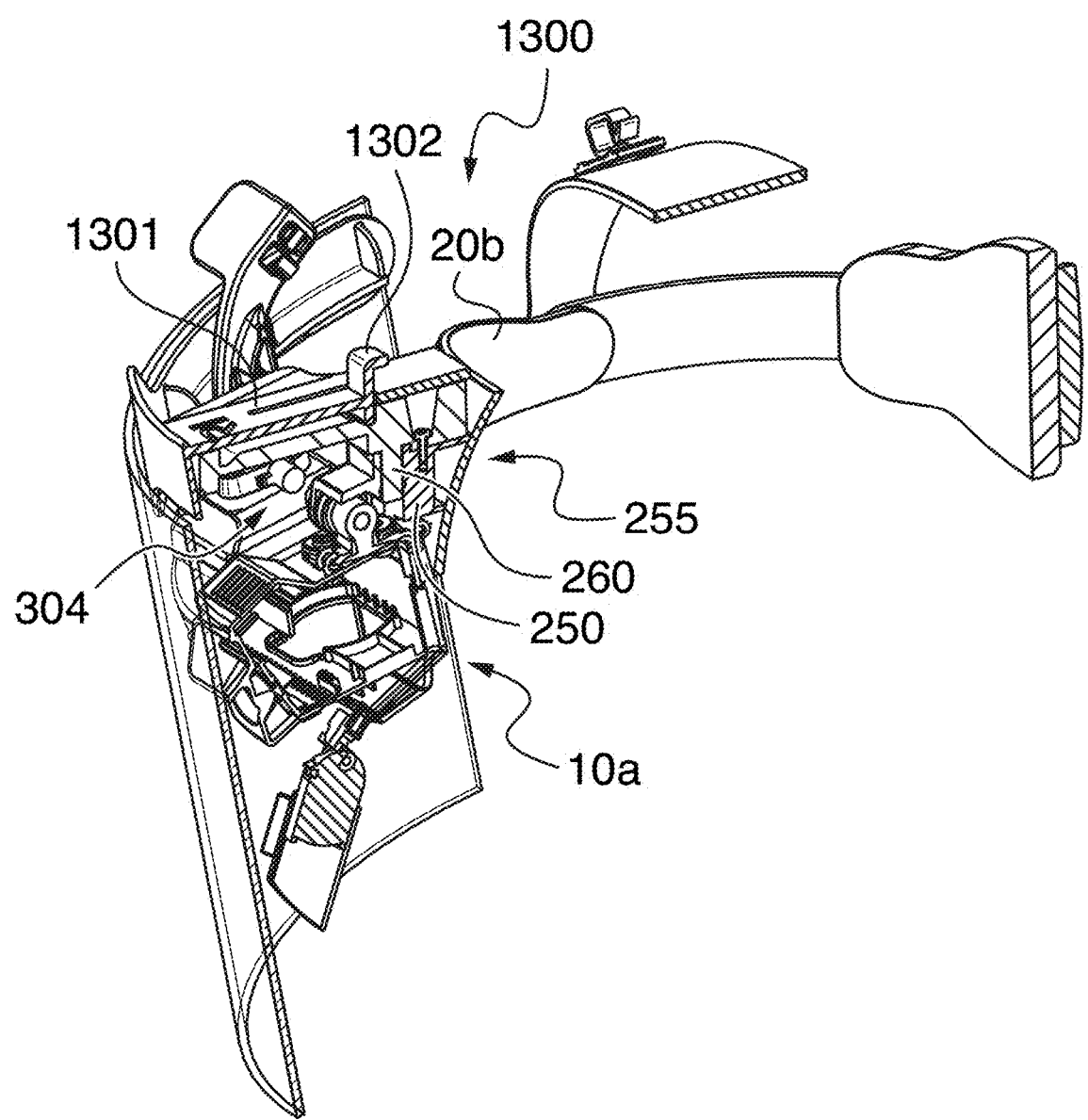
FIG. 25 is a schematic cut-away view of the face shield being attached to the PPE adapter system for use with the third AR device taken along lines 25-25 in FIG. 24, constructed according to an embodiment of the present invention.

With respect to FIGS. 24 and 25, there are illustrated a sliding adapter mount 250 that will allow PPE adapter system 50*b* to be removably attached to AR device 2*b*. In particular, sliding adapter mount 250 includes, in part, extension 255. Preferably, sliding adapter mount 250 is constructed of any suitable durable, UV resistant, heat resistant, lightweight, high strength polymeric material.

Figure 26:
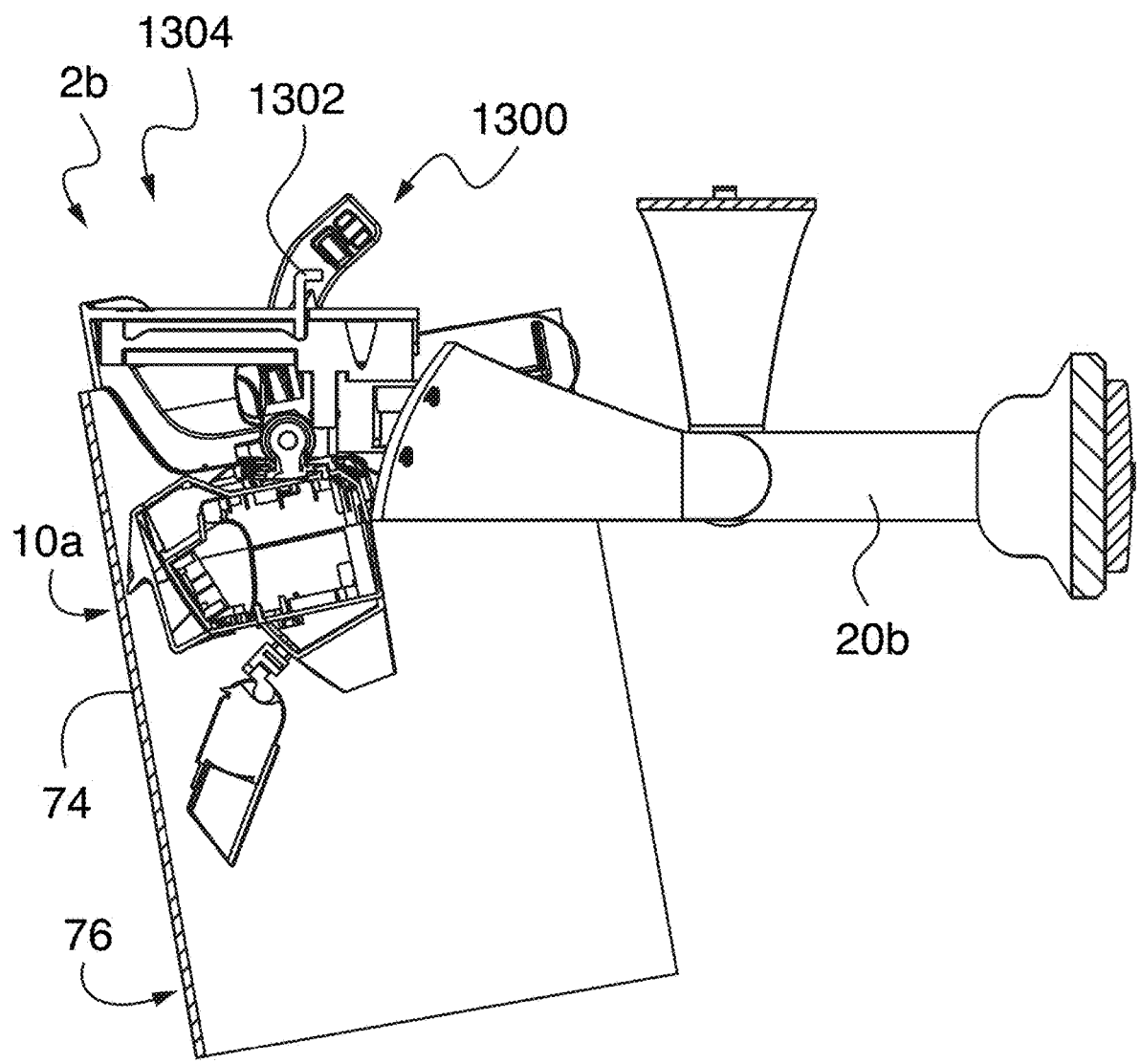
FIG. 26 is a schematic, side, cut-away view of the face shield being attached to the PPE adapter system for use with the third AR device with the AR device being rotated down, constructed according to an embodiment of the present invention.
Figure 27:
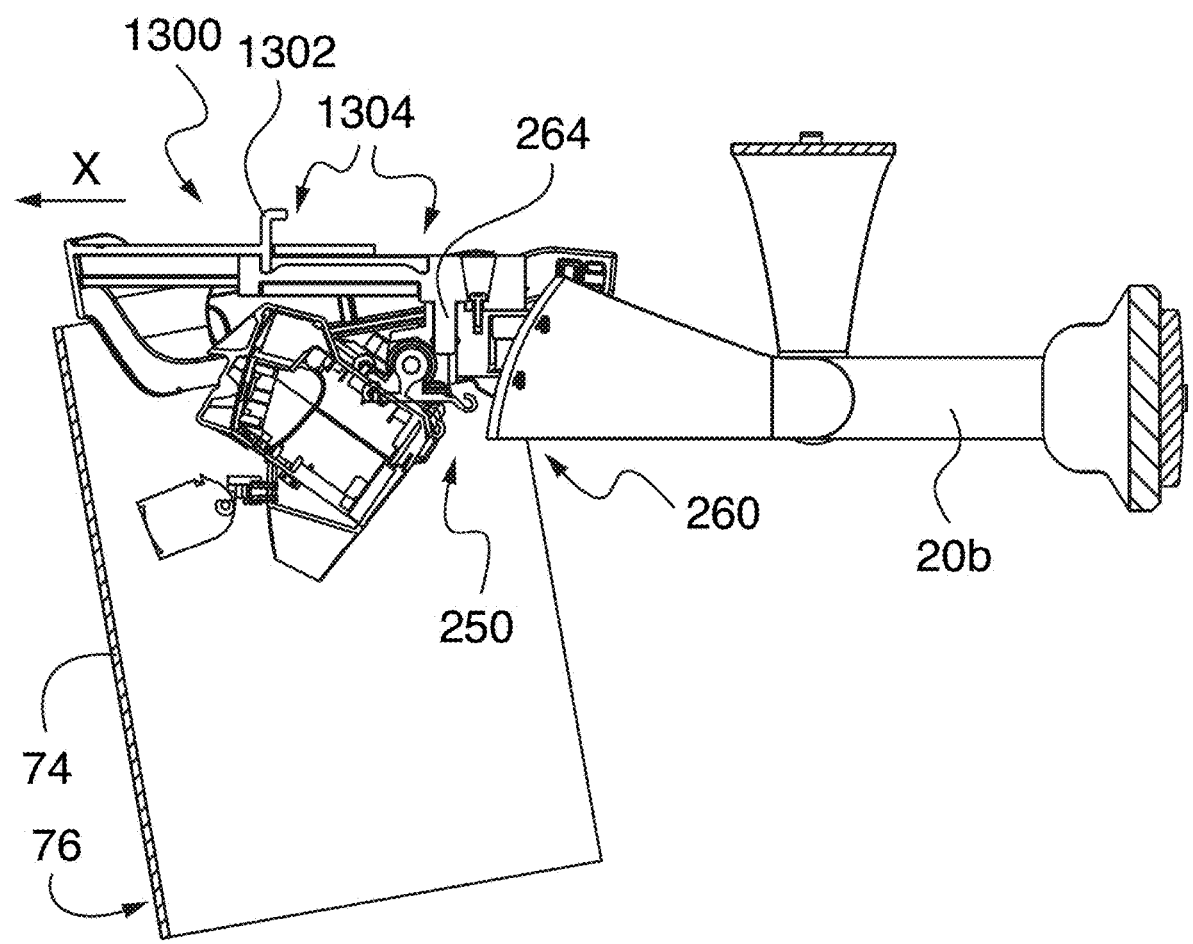
FIG. 27 is a schematic, side, cut-away view of the face shield being attached to the PPE adapter system for use with the third AR device with the AR device being rotated up, constructed according to an embodiment of the present invention.

With respect to FIGS. 25 and 27, there are illustrated sliding adapter carrier 260. In particular, sliding adapter carrier 260 includes, in part, extension 264. In one embodiment, sliding adapter carrier 260 is constructed so that extension 264 will be placed within an opening in extension 255 of sliding adapter mount 250. The sliding adapter carrier 260 will then be attached to a sliding adapter 1300 (FIGS. 24-27), as will be discussed in greater detail later. Preferably, sliding adapter carrier 260 is constructed of any suitable durable, UV resistant, heat resistant, lightweight, high strength polymeric material.

With respect to FIGS. 24-27, there is illustrated PPE adapter system 50*b* being attached to AR device 2*b*. As shown in FIGS. 24-27, PPE adapter system 50*b* includes, in part, wall 54*b*, hook and loop fasteners 72*b*, and sliding adapter 1300. It is to be understood that wall 54*b* and hook and loop fasteners 72*b* are constructed using conventional techniques such as printing, forming, molding or the like. Preferably, PPE adapter system 50*b* is constructed of any suitable durable, UV resistant, heat resistant, lightweight, high strength polymeric material.

With respect to FIGS. 23-27, there is illustrated PPE adapter system 50*b* being removably attached to AR device 2*b* through the use of sliding adapter 1300. In particular, PPE adapter system 50*b* is located on AR device 2*b* so that sliding adapter 1300 can be used to rotate AR device 2*b* towards and away from face shield 74.

A unique aspect of the present invention is the use of sliding adapter 1300. As shown in FIGS. 23-27, sliding adapter 1300 includes, in part, sliding adapter lever holder 1301, release lever 1302, a plurality of lever stops 1304, sliding adapter mount 250, and sliding adapter carrier 260. As discussed above, sliding adapter mount 250 is attached to AR device 2*b* through the use of a conventional fastener (not shown). The extension 264 is located within an opening (not shown) in extension 255. The extension 255 is then removably attached to head band 20*b*.

A unique aspect of the present invention is the ability of the PPE adapter system 50*b* to be able to attach to a face shield 74 (FIGS. 24-27) and allow the AR device 2*b* to be rotated towards face shield 74. In particular, as shown in FIGS. 24-27, a conventional face shield 74 can be attached to the PPE adapter system 50*b*. As discussed above, it is important to understand that in many medical procedures such as surgical procedures, a face shield 74 may be required to be worn by the medical personnel performing the surgical procedure. However, the present invention allows the AR device 2*b* to be tilted at an angle 76 with respect to the face shield 74. In this manner, PPE adapter system 50*b* is designed to rotate the AR device 2*b* in order to move the AR device 2*b* as close to the face shield 74, as possible. This is needed so the front camera 10*a* can calculate depth of objects without producing additional artifacts such as reflections. Furthermore, the tilt angle of face shield 74 with respect to front camera 10*a* should range between 5 and 15° with the preferable tilt angle being 10° in order to allow the face shield 74 to be in close proximity to the front camera 10*a*.

Figure 29:
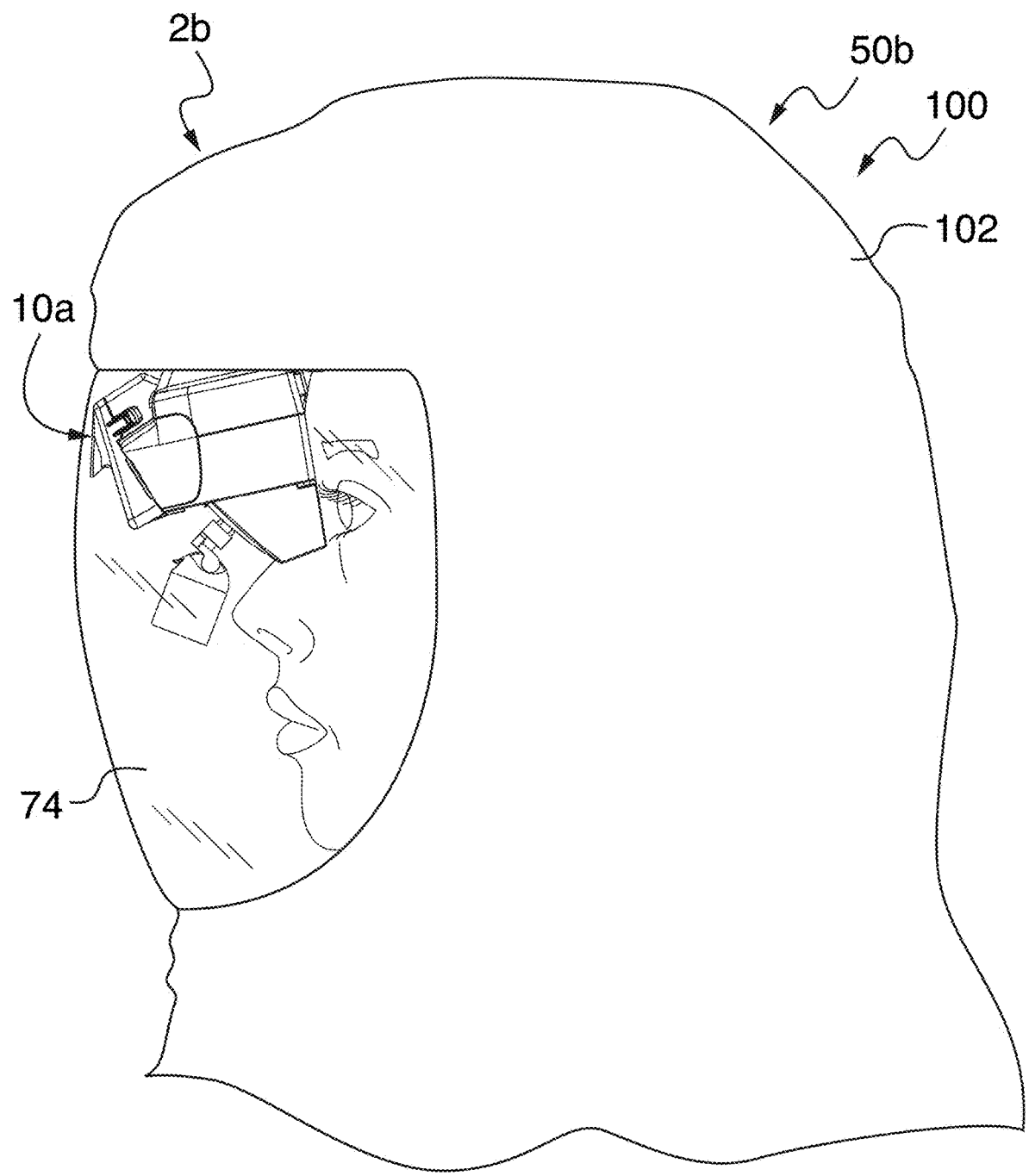
FIG. 29 is a side view of the PPE adapter system being attached to the third AR device and the PPE adapter system being worn by a user while the user is donning a PPE having a hood, constructed according to an embodiment of the present invention.

Another unique aspect of the present invention is the use of sliding adapter 1300. In particular, as shown in FIGS. 24-27 the AR device 2*b* is rotated down for viewing and the sliding adapter 1300 is slid back towards the head band 20*b* so that the face shield 74 is located in close proximity to the front camera 10*a* (FIG. 26). In order to rotate the AR device 2*b* upwardly, as shown in FIG. 27, the release lever 1302 is lifted up and away from the plurality of stops 1304 and moved in the direction of arrow X. The release lever 1302 is then located within one of the desired plurality of stops 1304. The release lever 1302 allows the sliding adapter 1300 to move forward which then creates the clearance needed for the AR device 2*b* to be rotated upwardly and away from the user's face in order to allow the medical personnel to view the surgical field without the AR device 2*b* being in the visual field of the medical personnel (FIG. 29). Preferably, the total travel length of the release lever 1302 is approximately 50 mm.

A still another unique aspect of the present invention is the use of hook and loop fasteners 72b located around a periphery of wall 54b. Preferably, hook and loop fasteners 72b are constructed in a similar manner as hook and loop fasteners 72. The unique aspect of use of the hook and loop fasteners 72b is that the hook and loop fasteners 72b allow the PPE adapter system 50b to be removably attached to the face shield 74 (FIG. 24). In this manner, the once the PPE adapter system 50b has been removably attached to AR device 2b and the AR device 2b has been placed on the head of the medical personnel, the surgical gown 100 can be located over the medical personnel and the hood 102 can be securely attached to the PPE adapter system 50b so that the face shield 74 and hood 102 remain in place on the medical personnel, especially during the medical procedure. As shown in FIG. 24, the hook and loop fasteners 72b can be attached to the hood at a location along a top edge of the face shield 74.

Figure 28:
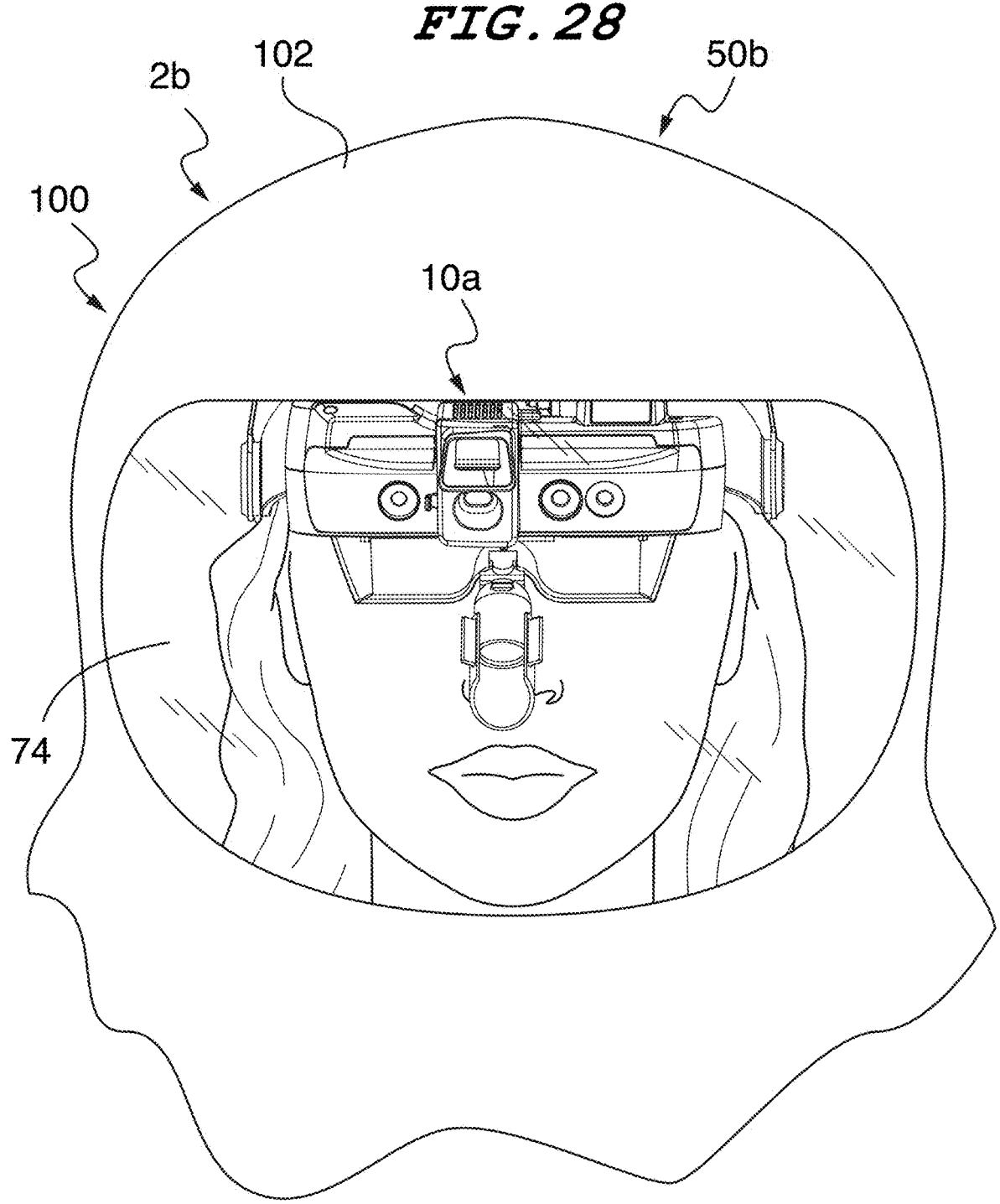
FIG. 28 is a front view of the PPE adapter system being attached to the third AR device and the PPE adapter system being worn by a user while the user is donning a PPE having a hood, constructed according to an embodiment of the present invention.

Furthermore, with respect to FIGS. 28 and 29, there are illustrated several different views of the PPE adapter system 50b being attached to the AR device 2b and the AR device 2b being worn by a user such as medical personnel. As shown in FIGS. 28 and 29, the PPE adapter system 50b has been attached to the AR device 2b and the AR device 2b is being worn by a user such as medical personnel. As shown in FIGS. 28 and 29, the medical personnel has donned a surgical gown 100 having a hood 102 and a face shield 74. As best shown in FIG. 29, the face shield 74 is located in close proximity to the front camera 10 so that the face shield 74 does not produce additional artifacts such as reflections when the front camera 10a is being utilized. As shown in FIG. 29, the AR device 2b has been rotated up so that the medical personnel can see the visual field without having to look through the AR device 2b.

PPE Adapter System for Use With a Fourth AR Device

Figure 30:
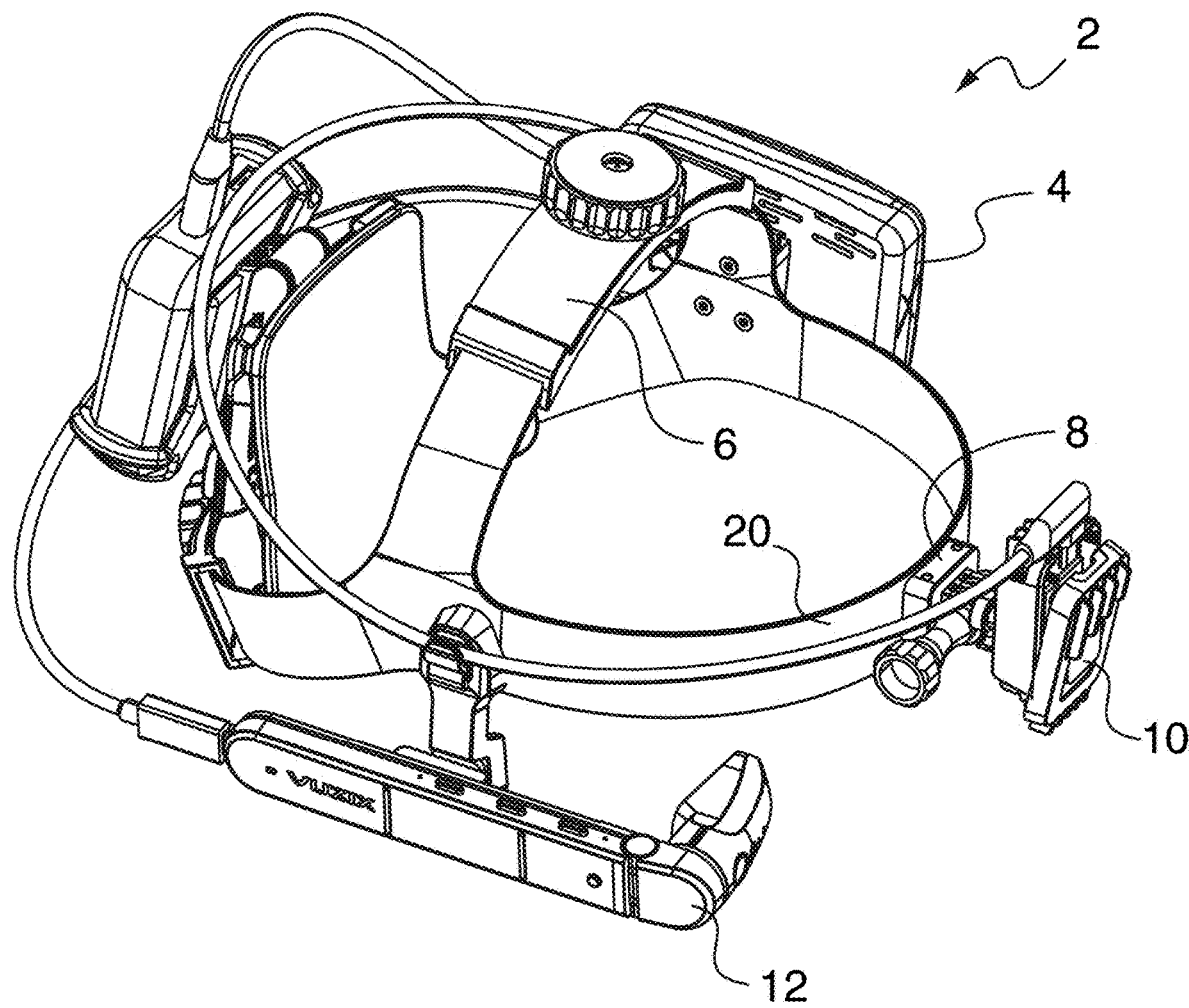
FIG. 30 is a schematic, isometric view of one embodiment of a fourth AR device, according to the prior art.
Figure 31:
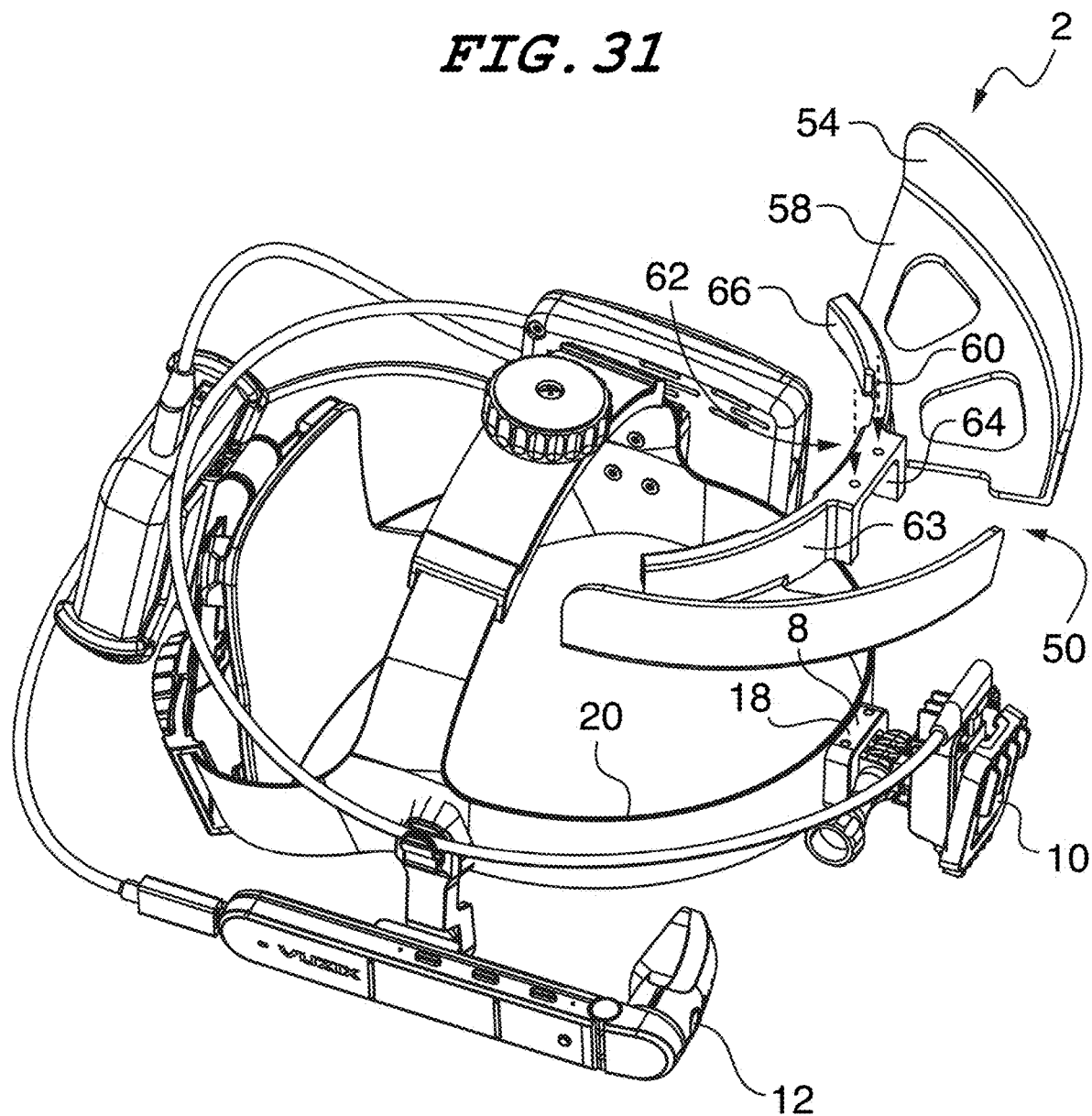
FIG. 31 is a top, isometric view of the PPE adapter system prior to being attached to the fourth AR device, constructed according to an embodiment of the present invention.

Referring now to FIG. 30-39, there is illustrated a personal protective equipment ("PPE") adapter system 50 for use with another augmented reality ("AR") device 2. As shown in FIGS. 30 and 31, there is illustrated one embodiment of a conventional AR device 2. Typically, AR device 2 includes, in part, a computer module 4, head gear 6, a mount 8 for assisting in mounting the front camera 10 and the PPE adapter system 50, and AR viewing display 12, threaded openings 18, and headband 20.

Figure 32:
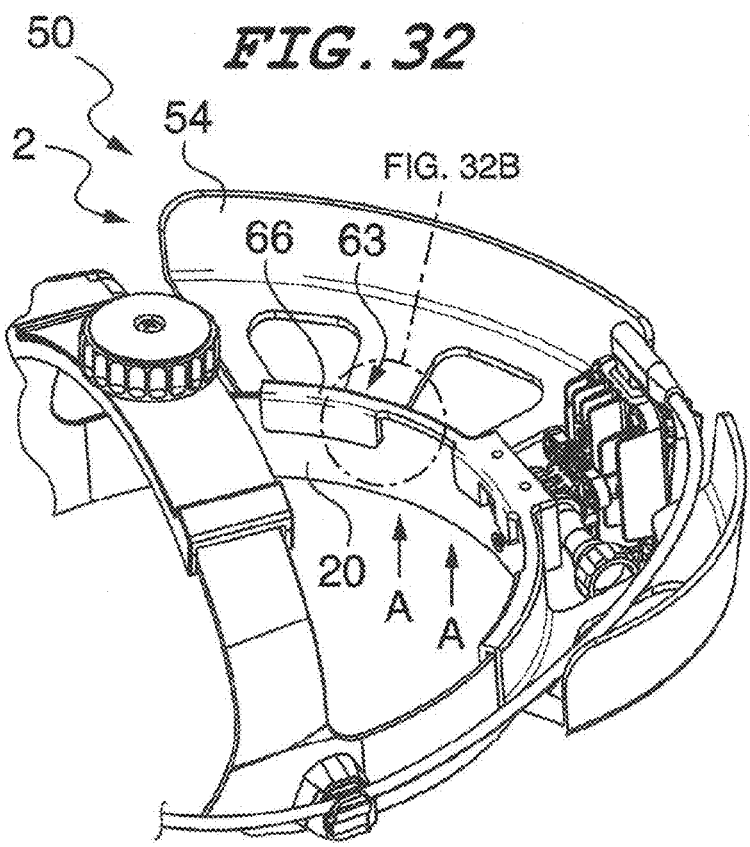
FIG. 32 is a schematic, top view of the PPE adapter system being attached to the fourth AR device, constructed according to an embodiment of the present invention.
Figure 32A:
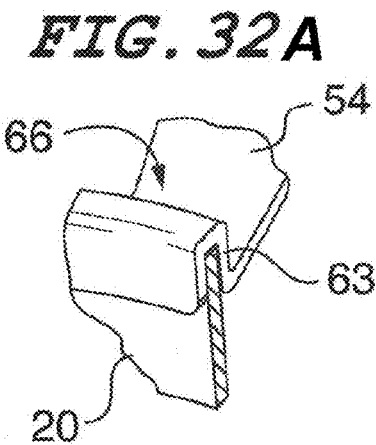
FIG. 32A is a schematic, close-up view of the PPE adapter system being attached to the fourth AR device, constructed according to an embodiment of the present invention.
Figure 33:
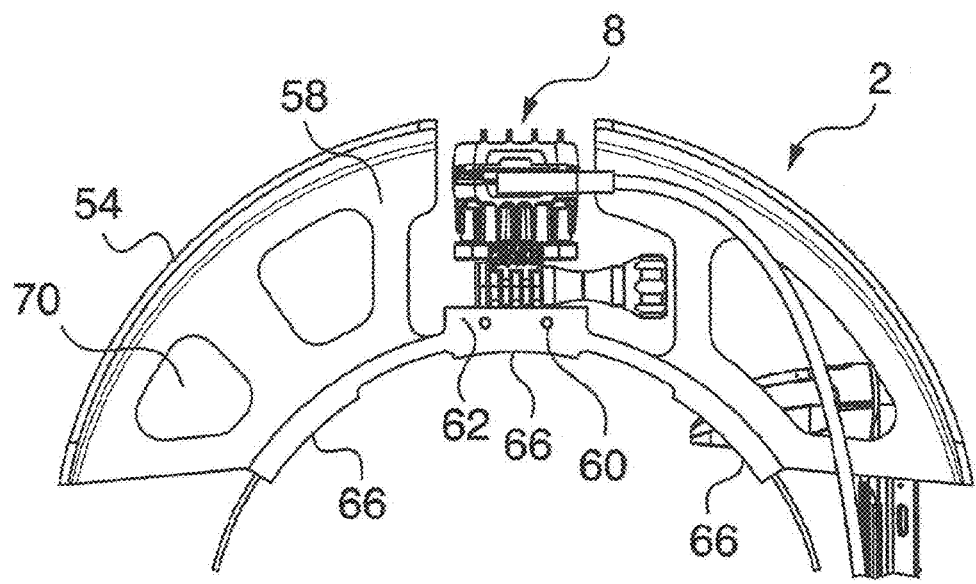
FIG. 33 is a top view of the PPE adapter system being attached to the fourth AR device, constructed according to an embodiment of the present invention.

With respect to FIGS. 32 and 33, there are illustrated PPE adapter system 50 prior to being attached to AR device 2. As shown in FIGS. 31 and 32, PPE adapter system 50 includes, in part, wall 54, extension 58, threaded fasteners 60, bracket 62, wall 63, bracket opening 64 (FIG. 31), and channels 66. Preferably, except for threaded fasteners 60, PPE adapter system 50 is constructed of any suitable durable, UV resistant, heat resistant, lightweight, high strength polymeric material.

With respect to FIGS. 32 and 33, there is illustrated PPE adapter system 50 being removably attached to AR device 2. In particular, PPE adapter system 50 is located on AR device 2 so that channels 66 are retained along portions of headband 20. Also, bracket 62 is removably retained on mount 8 through the use of threaded fasteners 60 and threaded fastener openings 18 (FIG. 31).

A unique aspect of the present invention is the use of openings 70 in PPE adapter system 50. In particular, openings 70 are open areas on the PPE adapter system 50 that allow for air to circulate within a hood 100 (FIGS. 37 and 39), reduce weight, and reduce material usage in constructing the PPE adapter system 50.

Another unique aspect of the present invention is that the PPE adapter system 50 can be easily and quickly attached to the AR device 2 and removed from the AR device 2. In particular, bracket 62 can be quickly located over mount 8. The channels 66 can also be located over headband 20. The PPE adapter system 50 can then be removably attached to the AR device 2 through the use of the threaded fasteners 60 and threaded fastener openings 18. The PPE adapter system 50 can be securely attached to the AR device 2 by placing the channels 66 over the headband 20 and attaching the threaded fasteners 60 to the threaded fastener openings 18. Conversely, the PPE adapter system 50 can be easily and quickly removed from the AR device 2 by removing the threaded fasteners 60 from the threaded fastener openings 18 and lifting the channels 66 off of the headband 20 in the direction of arrows A (FIG. 32).

Figure 34:
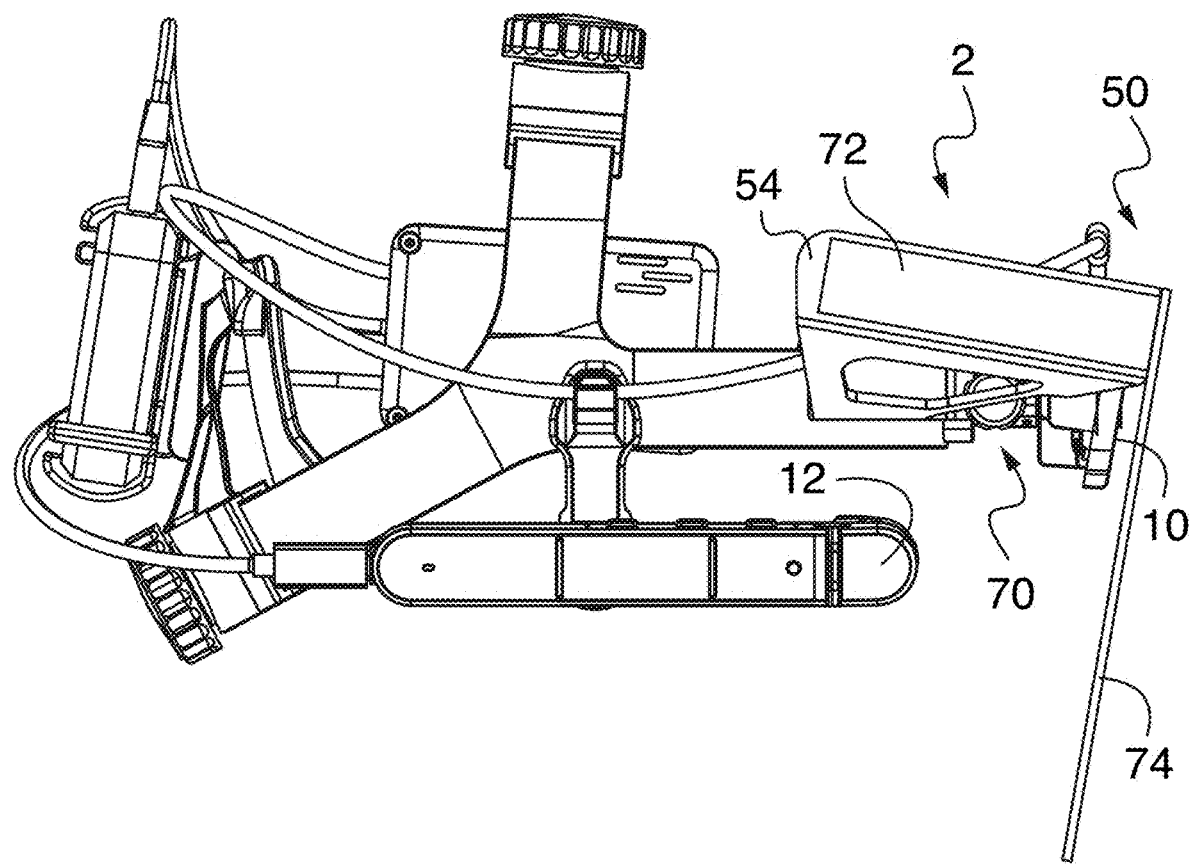
FIG. 34 is a schematic, side view of the face shield being attached to the PPE adapter system for use with the fourth AR device, constructed according to an embodiment of the present invention.
Figure 35:
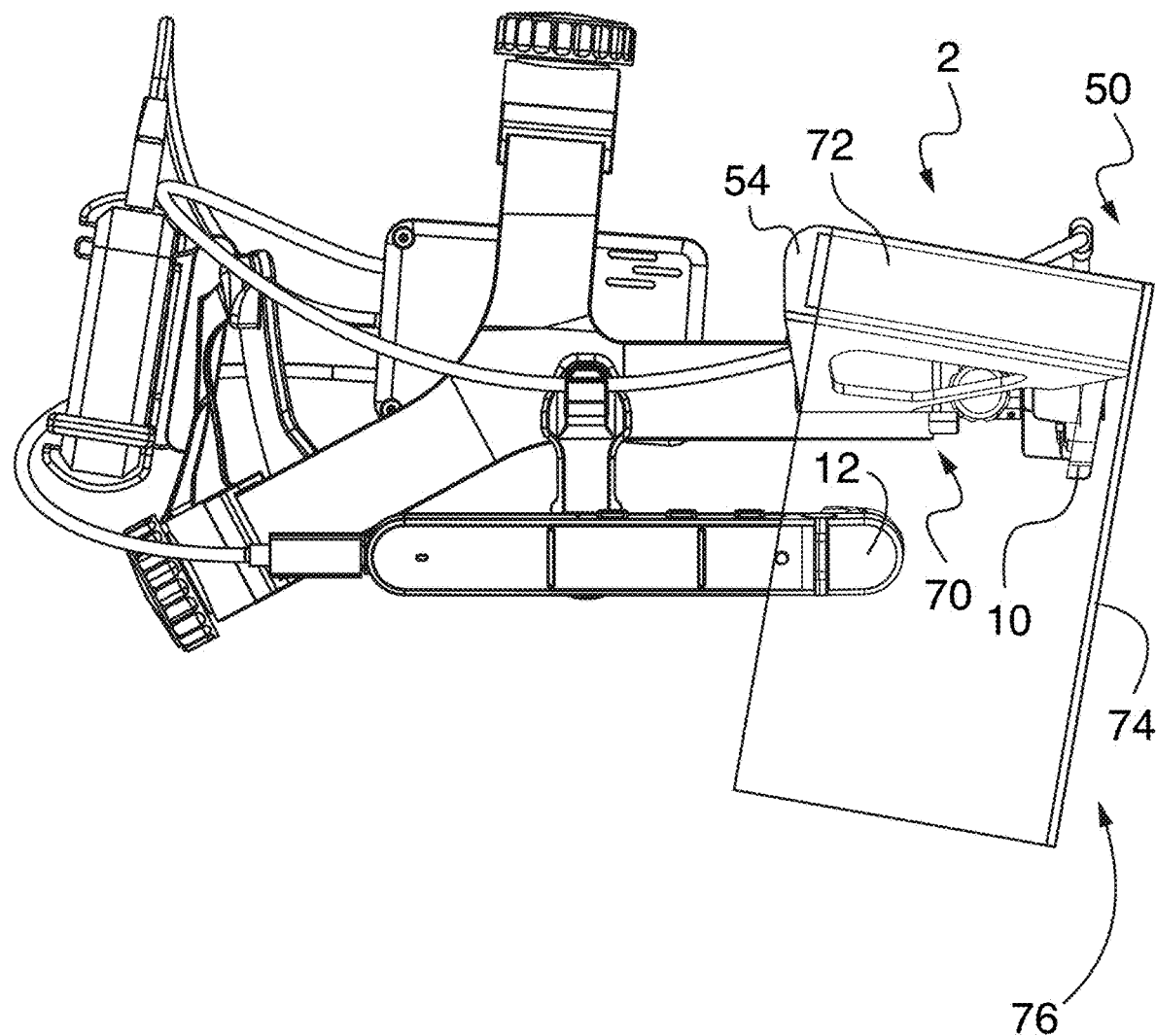
FIG. 35 is another schematic, side view of the face shield being attached to the PPE adapter system for use with the fourth AR device, constructed according to an embodiment of the present invention.

A yet another unique aspect of the present invention is the ability of the PPE adapter system 50 to be able to attach to a face shield 74 (FIGS. 34 and 35). In particular, as shown in FIGS. 34 and 35, a conventional face shield 74 can be attached to the PPE adapter system 50. It is important to understand that in many medical procedures such as surgical procedures, a face shield 74 may be required to be worn by the medical personnel performing the surgical procedure. However, the present invention allows the face shield 74 to be tilted at an angle 76 with respect to the front camera 10 of the AR device 2. In this manner, PPE adapter system 50 is designed to have a forward tilt in order to move the face shield 74 as close to the front camera 10, as possible. This is needed so the front camera 10 can calculate depth of objects without producing additional artifacts such as reflections. Furthermore, the tilt angle 76 should range between 5 and 15° with the preferable tilt angle being 10° in order to allow the face shield 74 to be in close proximity to the front camera 10.

A still another unique aspect of the present invention is the use of hook and loop fasteners 72 located around a periphery of wall 54 (FIGS. 34 and 35). Preferably, hook and loop fasteners 72 are constructed of Velcro® or any other similar hook and loop material. The unique aspect of use of the hook and loop fasteners 72 is that the hook and loop fasteners 72 allow the PPE adapter system 50 to be removably attached to the face shield 74. In this manner, once the PPE adapter system 50 has been removably attached to AR device 2 and the AR device 2 has been placed on the head of the medical personnel, the surgical gown 100 (FIG. 37) can be located over the medical personnel and the hood 102 can be securely attached to the PPE adapter system 50 so that the face shield 74 and hood 102 remain in place on the medical personnel, especially during the medical procedure. As shown in FIGS. 34 and 35, the hook and loop fasteners 72 can be attached to the hood at a location along a top edge of the face shield 74.

Figure 36:
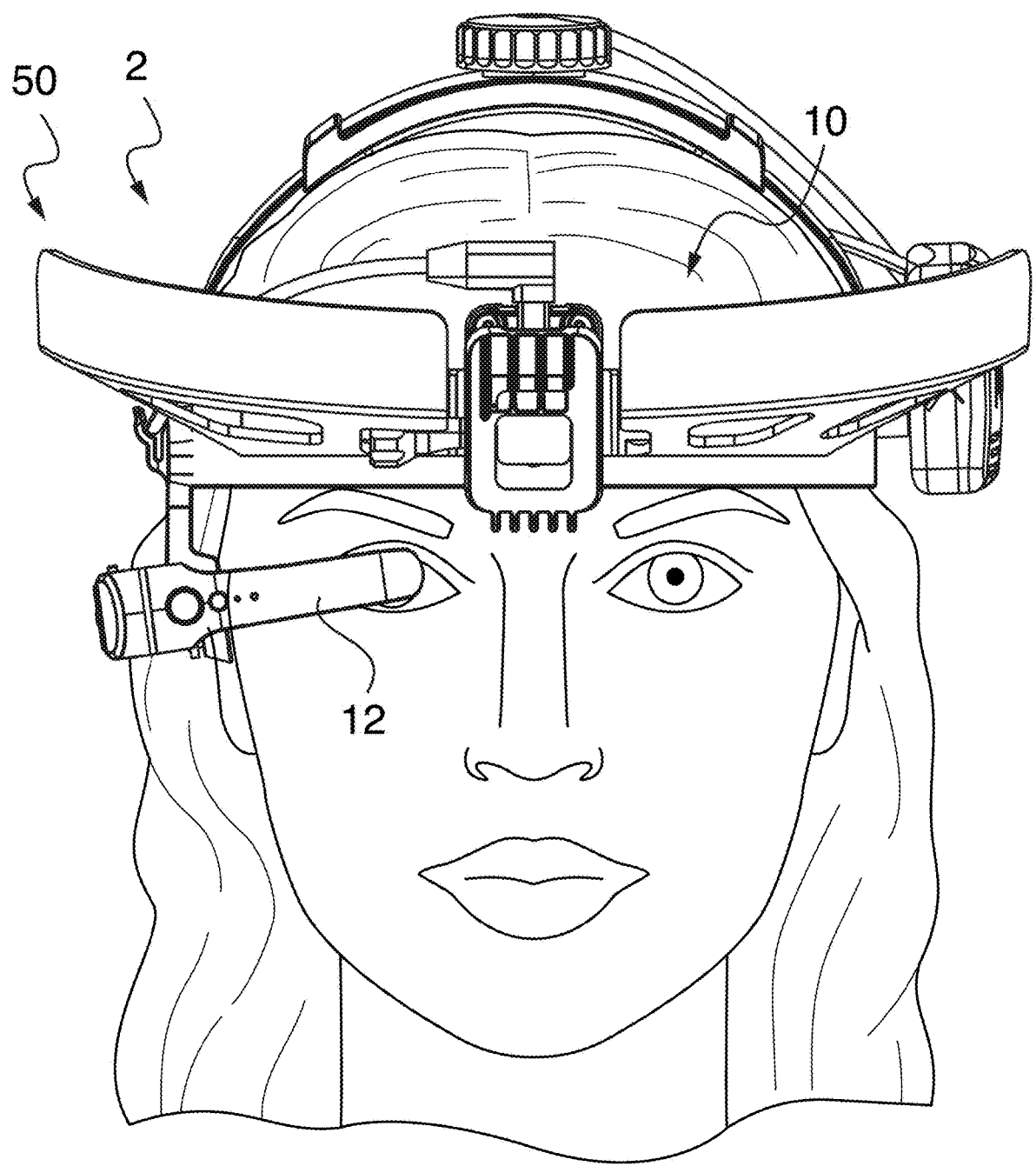
FIG. 36 is a front view of the PPE adapter system being attached to the fourth AR device and the PPE adapter system being worn by a user, constructed according to an embodiment of the present invention.
Figure 37:
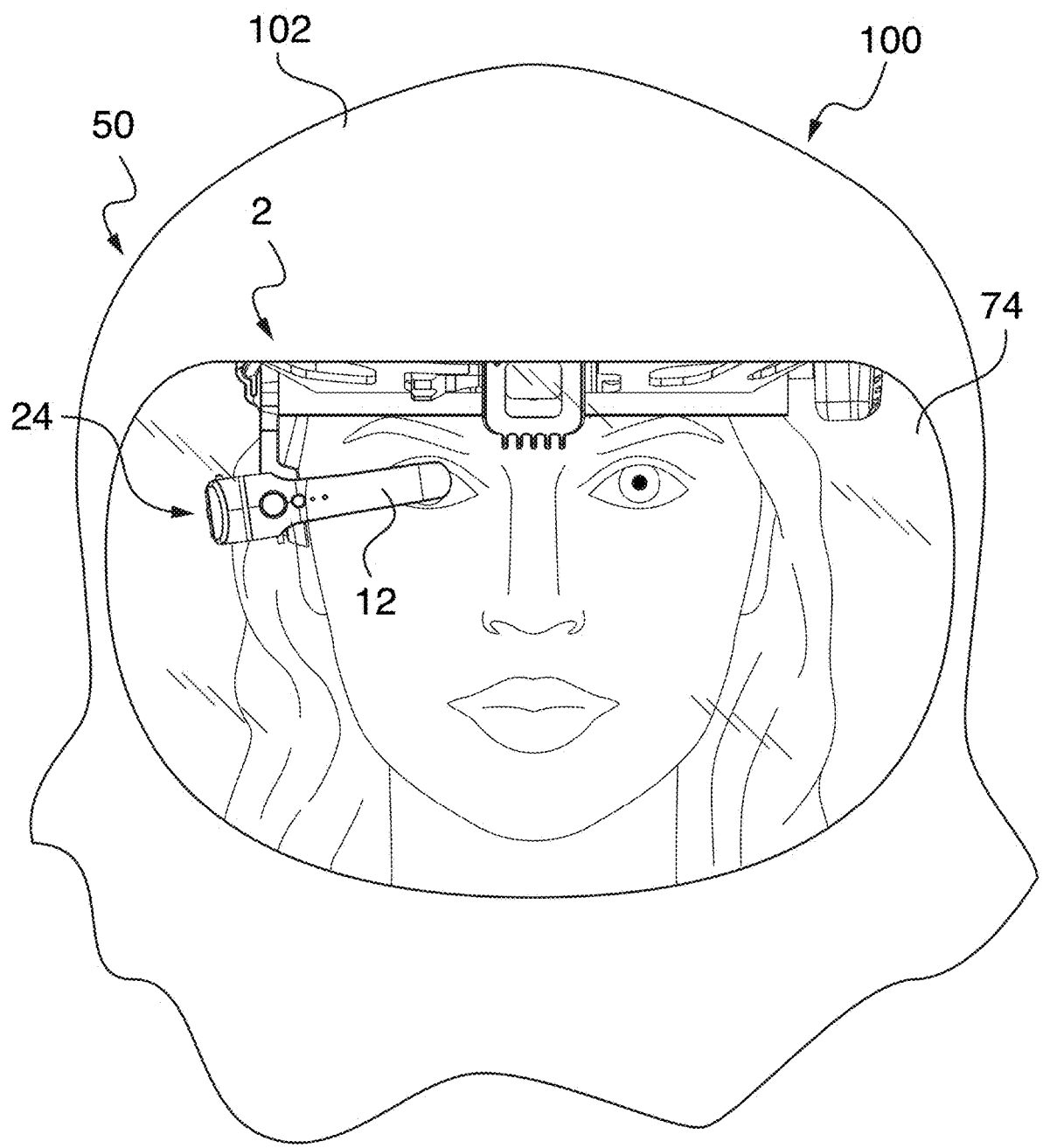
FIG. 37 is a front view of the PPE adapter system being attached to the fourth AR device and the PPE adapter system being worn by a user while the user is donning a PPE having a hood, constructed according to an embodiment of the present invention.
Figure 38:
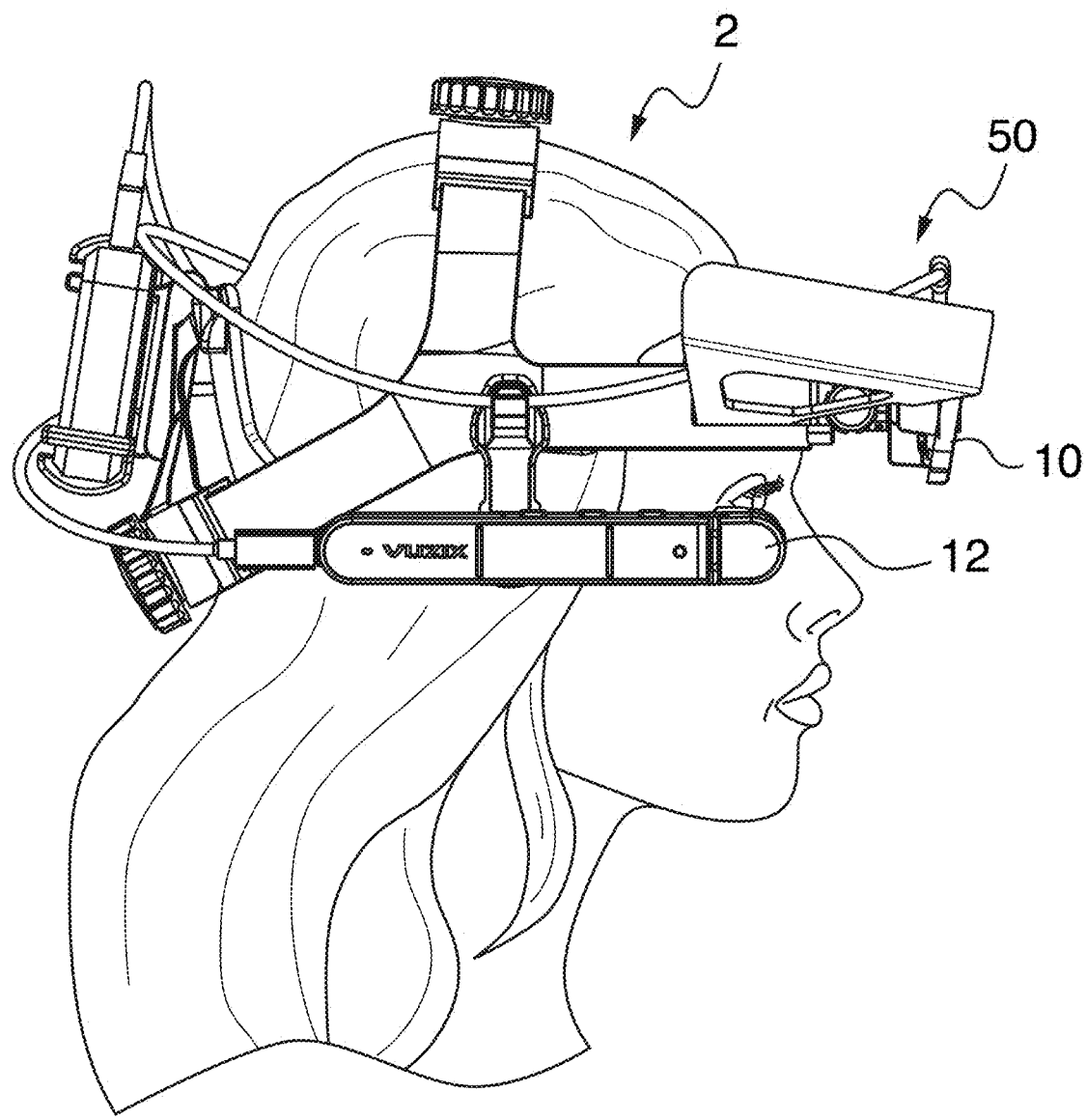
FIG. 38 is a side view of the PPE adapter system being attached to the fourth AR device and the PPE adapter system being worn by a user, constructed according to an embodiment of the present invention.
Figure 39:
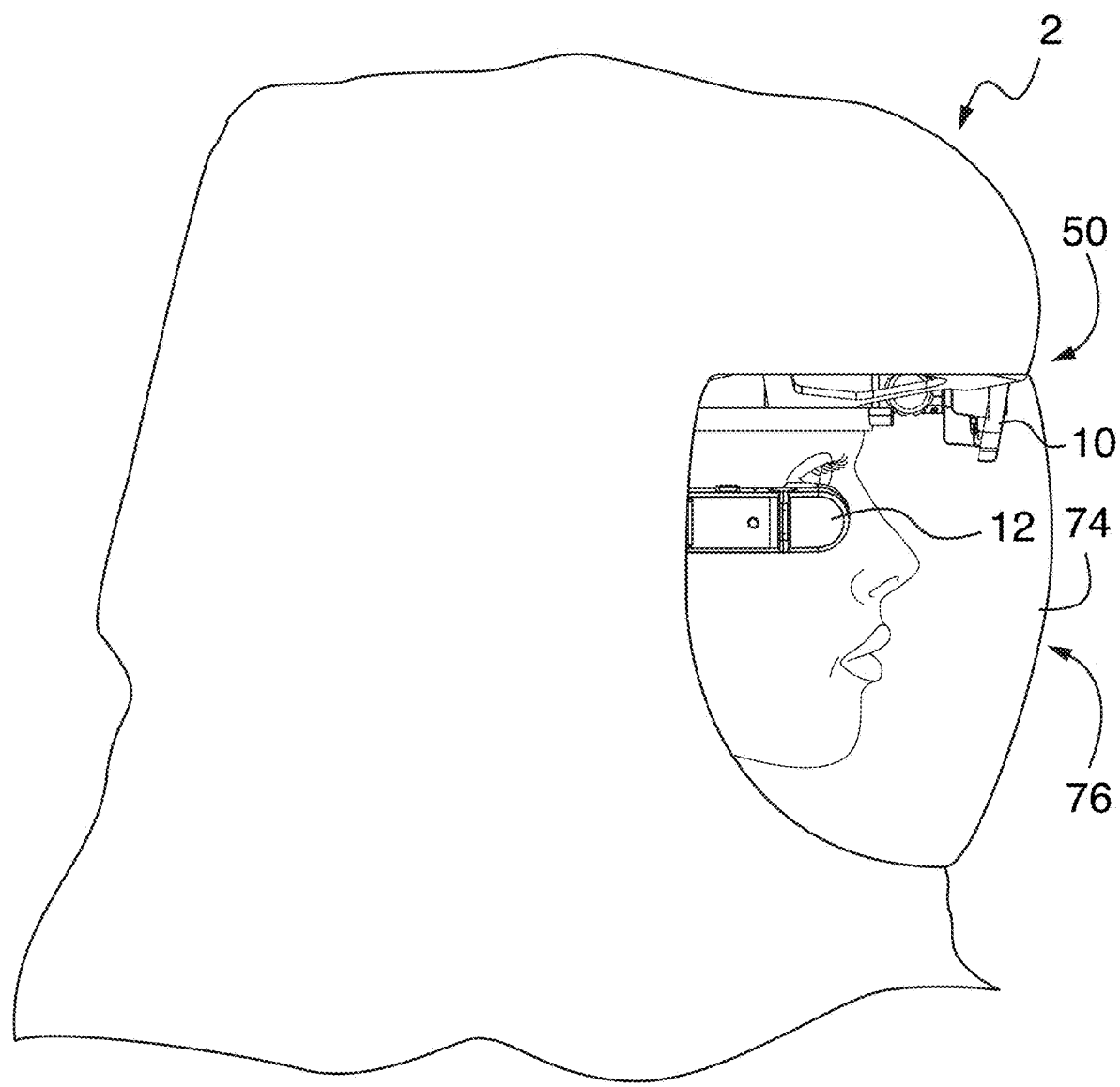
FIG. 39 is a side view of the PPE adapter system being attached to the fourth AR device and the PPE adapter system being worn by a user while the user is donning a PPE having a hood, constructed according to an embodiment of the present invention.

With respect to FIGS. 36-39, there are illustrated several different views of the PPE adapter system 50 being attached to the AR device 2 and the AR device 2 is being worn by a user such as medical personnel. As shown in FIGS. 36 and 38, the PPE adapter system 50 has been attached to the AR device 2 and the AR device 2 is being worn by a user such as medical personnel. As shown in FIGS. 37 and 39, the medical personnel has donned a surgical gown 100 having a hood 102 and a face shield 74. As best shown in FIG. 39, the face shield 74 is located in close proximity to the center camera 10 of the AR device 2 so that the face shield 74 does not produce additional artifacts such as reflections when the center camera 10 is being utilized.

PPE Adapter System for Use With a Light Device

Figure 40:
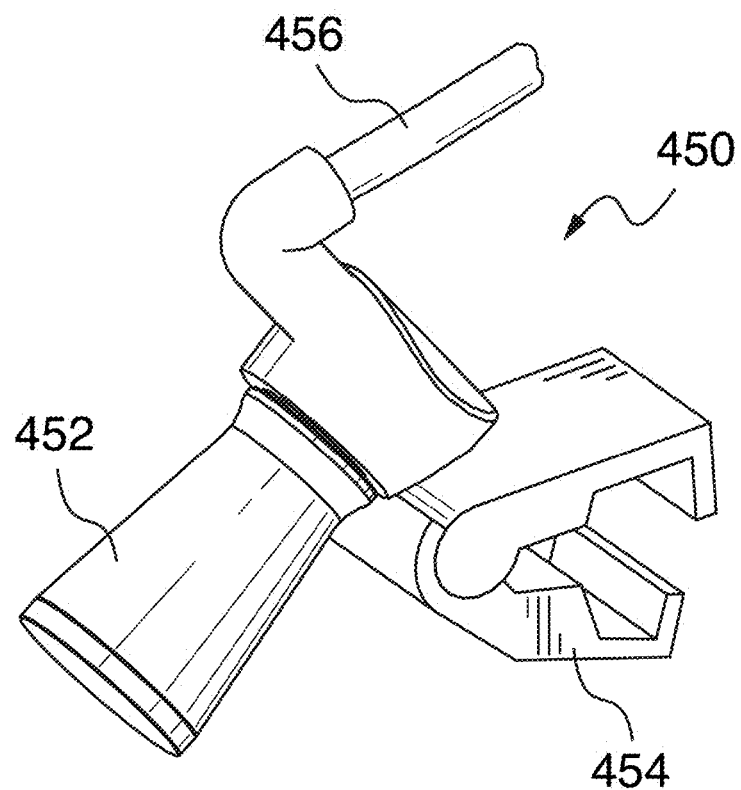
FIG. 40 is an isometric, side view of a light device, constructed according to an embodiment of the present invention.

Referring now to FIG. 40-49, there is illustrated a personal protective equipment ("PPE") adapter system 400 for use with a light device 450. As shown in FIG. 40, there is illustrated one embodiment of a light device 450. In one embodiment, light device 450 includes, in part, a LED light module 452, an alligator jaw mounting clip 454 rotatably connected to the light module 452, and a power cord 456 operatively connected to a power source (not shown).

With respect to FIGS. 41 and 41a, there are illustrated a light device assembly 470. As shown in FIGS. 41 and 42, in one embodiment, light device assembly 470 includes, in part, light module 450, snap-on baffle 458 having actuator 460 and handle 462, and baffle slot 464, and telescoping shroud extension 466. Preferably, snap-on baffle 458 and telescoping shroud extension 466 are constructed of any suitable durable, UV resistant, heat resistant, lightweight, high strength polymeric material.

A unique aspect of the light device assembly 470 is the baffle slot 464. In particular, as shown in FIG. 41, the construction of baffle slot 464 allows the baffle slot 464 to deflect and snap around the light module 452 as well as provide the ability to compress to provide retention for the telescoping shroud 466.

Figure 42A:
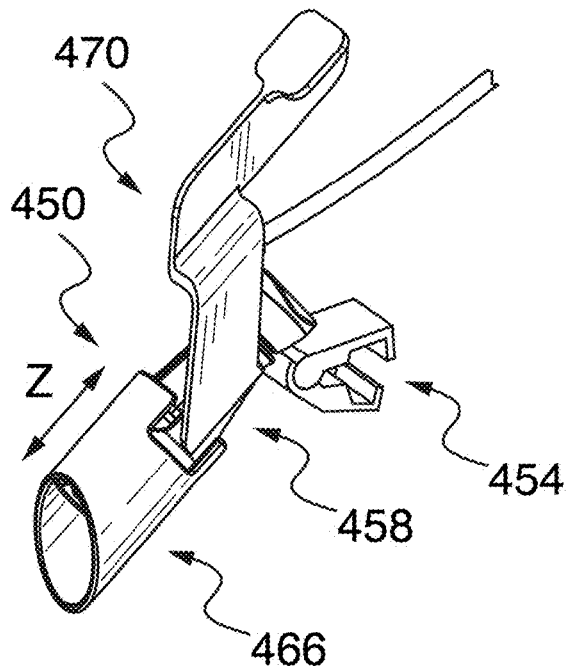
FIGS. 42A-42C are isometric illustrations of the shroud extension being adjusted, constructed according to an embodiment of the present invention.
Figure 42B:
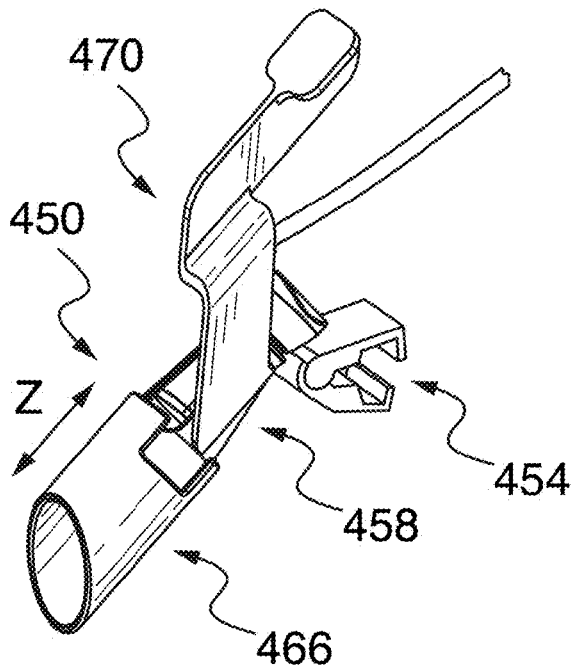
Figure 42C:
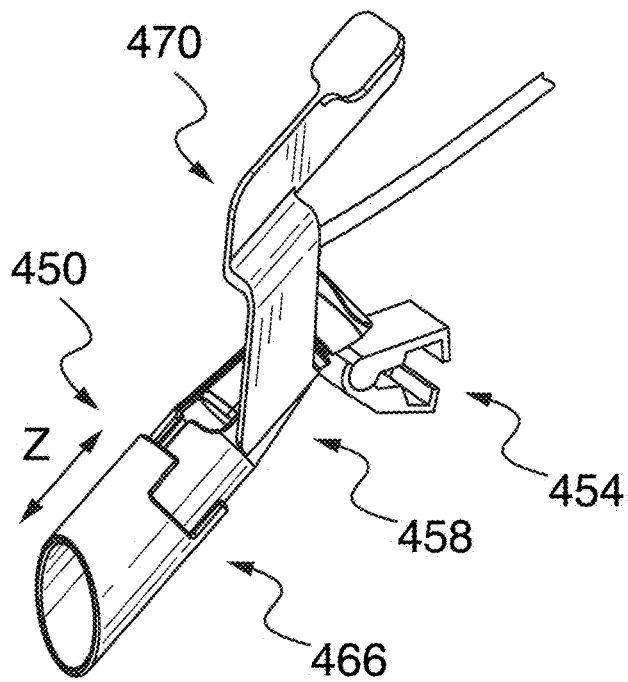

Another unique aspect of the light device assembly 470 is the telescoping shroud extension 466. In particular, as shown in FIGS. 42a-42c, telescoping shroud extension 466 can be slid along snap-on baffle 458 in the directions of arrows Z. In this manner, as the light beam 472 (FIG. 45) is produced by the light module 450 and transmitted through the face shield 74, the amount of light that is reflected from the light beam 472 by the face shield 74 is substantially eliminated, as will be discussed in greater detail later.

Figure 43:
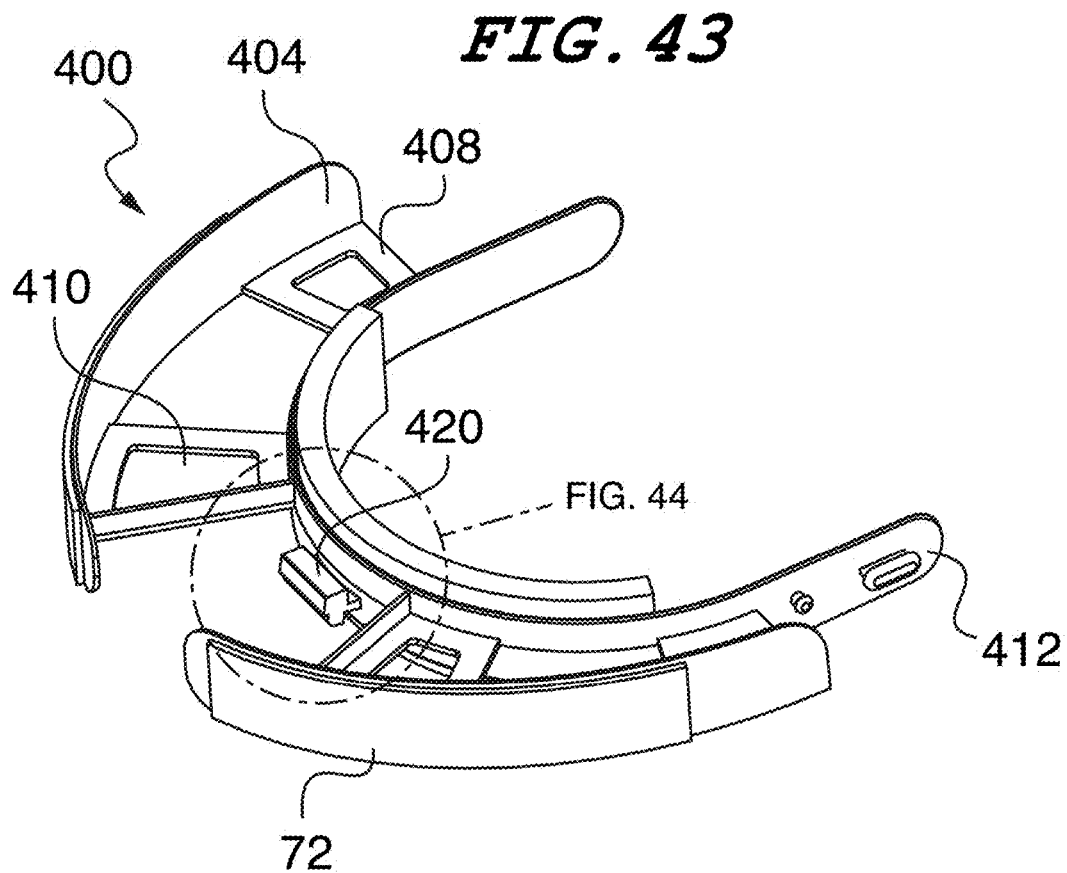
FIG. 43 is a top, isometric illustration of PPE adapter system for use with the light device, constructed according to an embodiment of the present invention.
Figure 44:
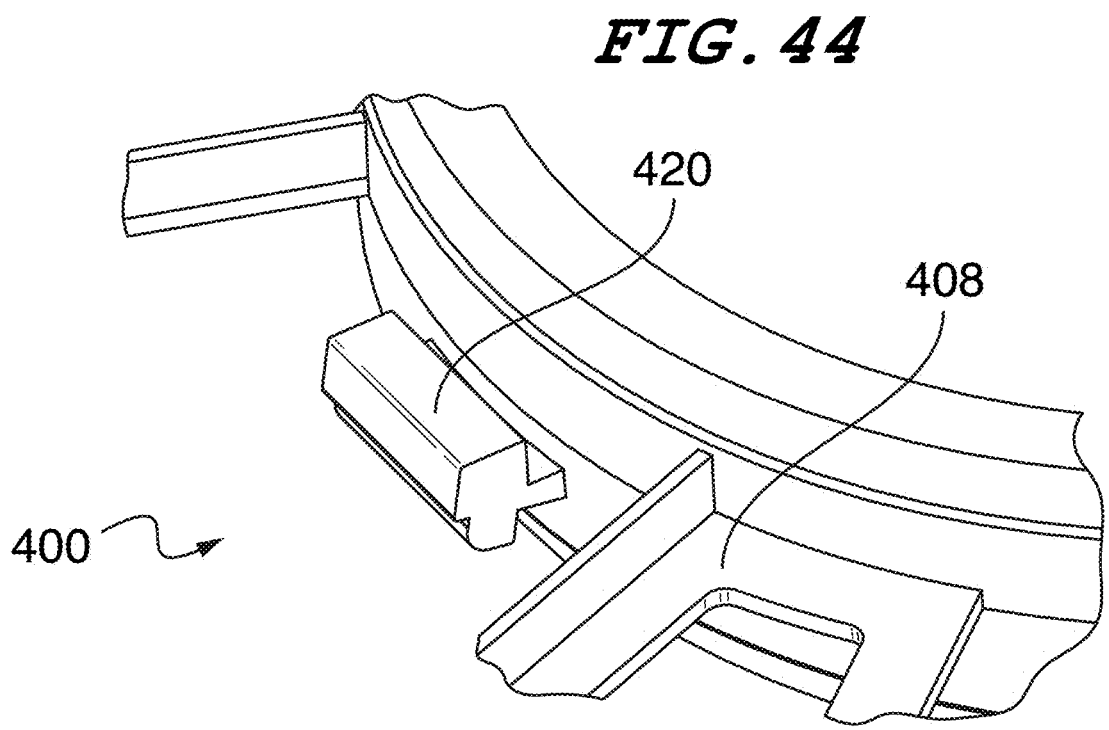
FIG. 44 is a close-up view of the mounting rail on the PPE adapter system for use with a light device, constructed according to an embodiment of the present invention.

With respect to FIGS. 43 and 44, there are illustrated PPE adapter system 400 prior to being attached to light assembly 470. As shown in FIG. 43, PPE adapter system 400 includes, in part, wall 404, extension 408, openings 410, wall 412, and mounting rail 420. Preferably, PPE adapter system 400 is constructed of any suitable durable, UV resistant, heat resistant, lightweight, high strength polymeric material.

Figure 45:
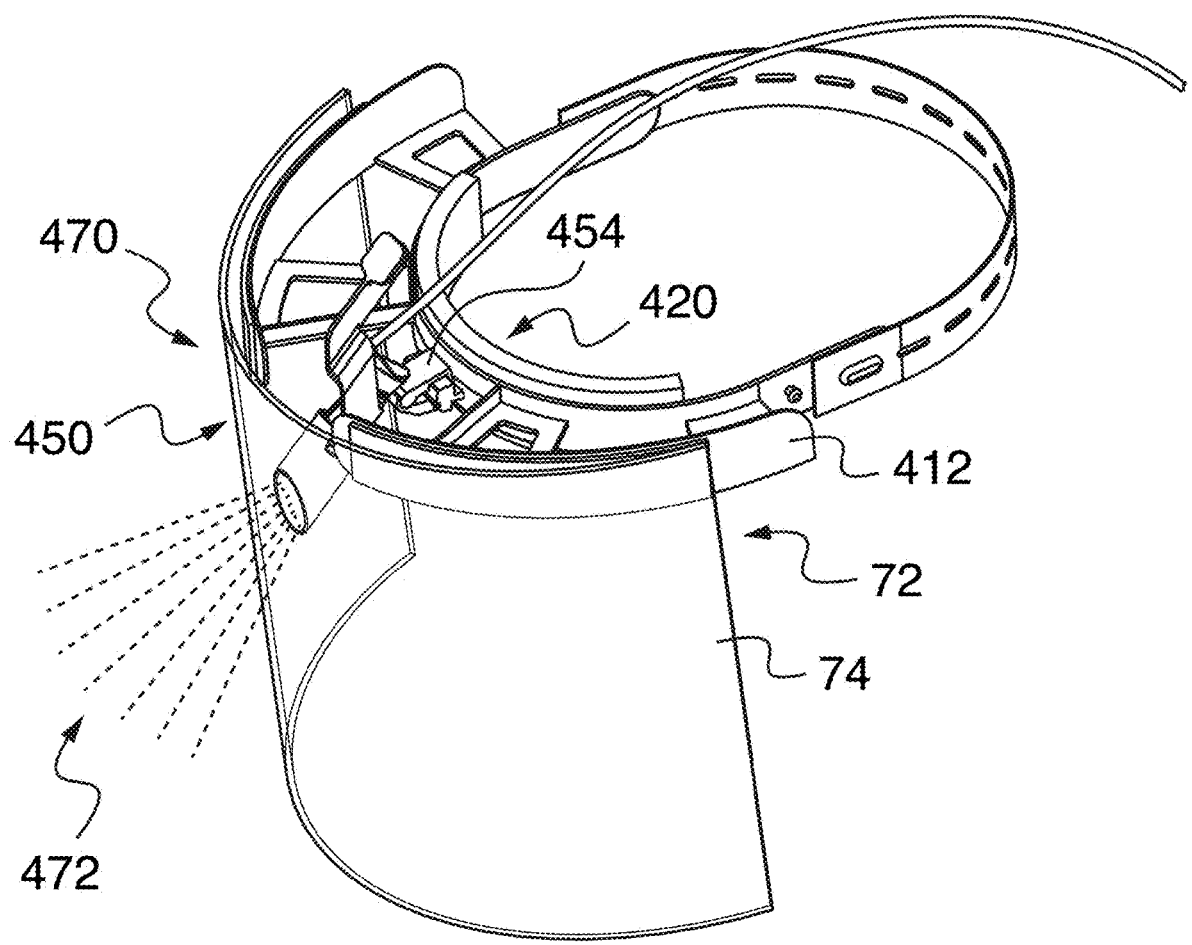
FIG. 45 is a top, isometric view of the PPE adapter system for use with a light device with the light device being attached and a face shield being attached, constructed according to an embodiment of the present invention.
Figure 46:
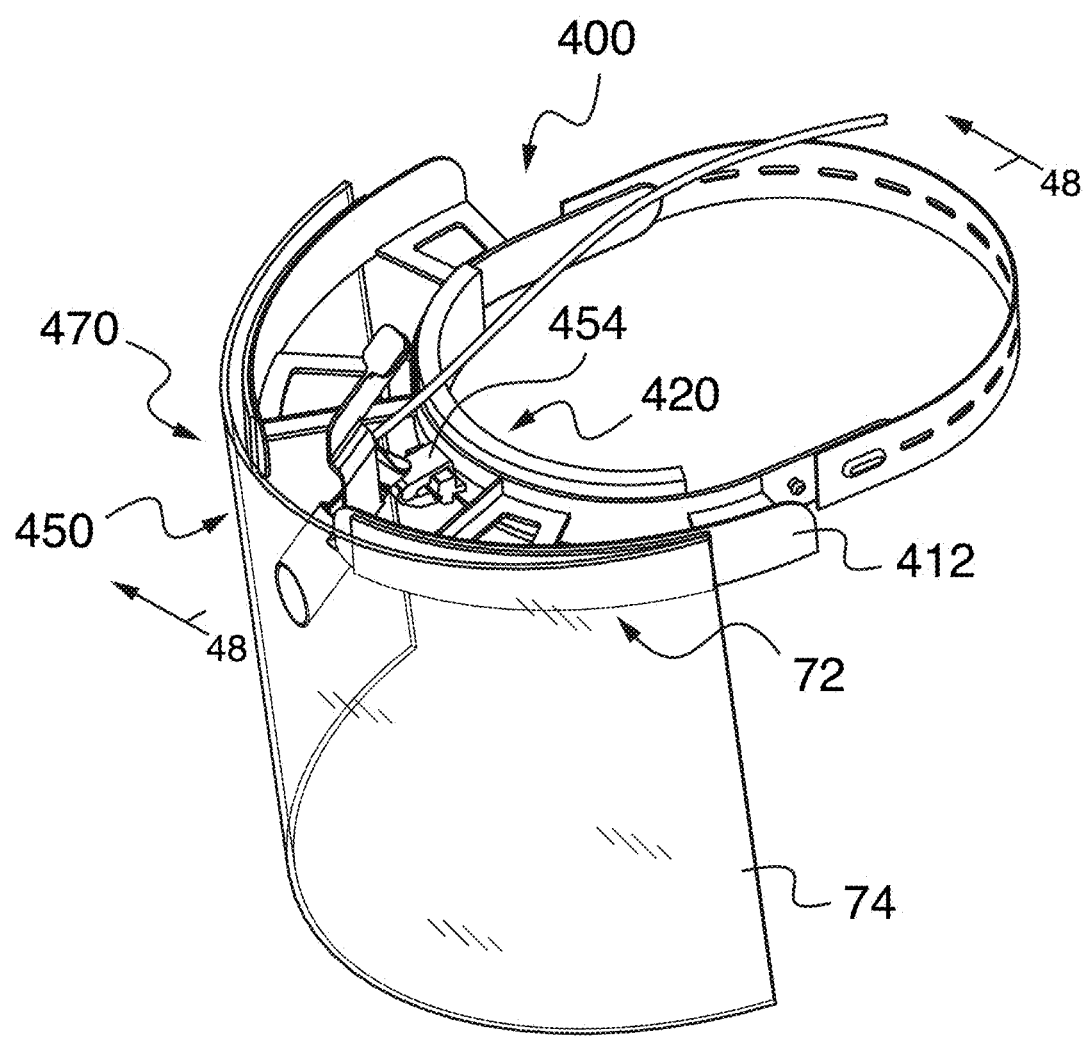
FIG. 46 is a top, isometric view of the PPE adapter system for use with a light device with the light device being attached and a face shield being attached, according to one embodiment of the present invention.
Figure 47:
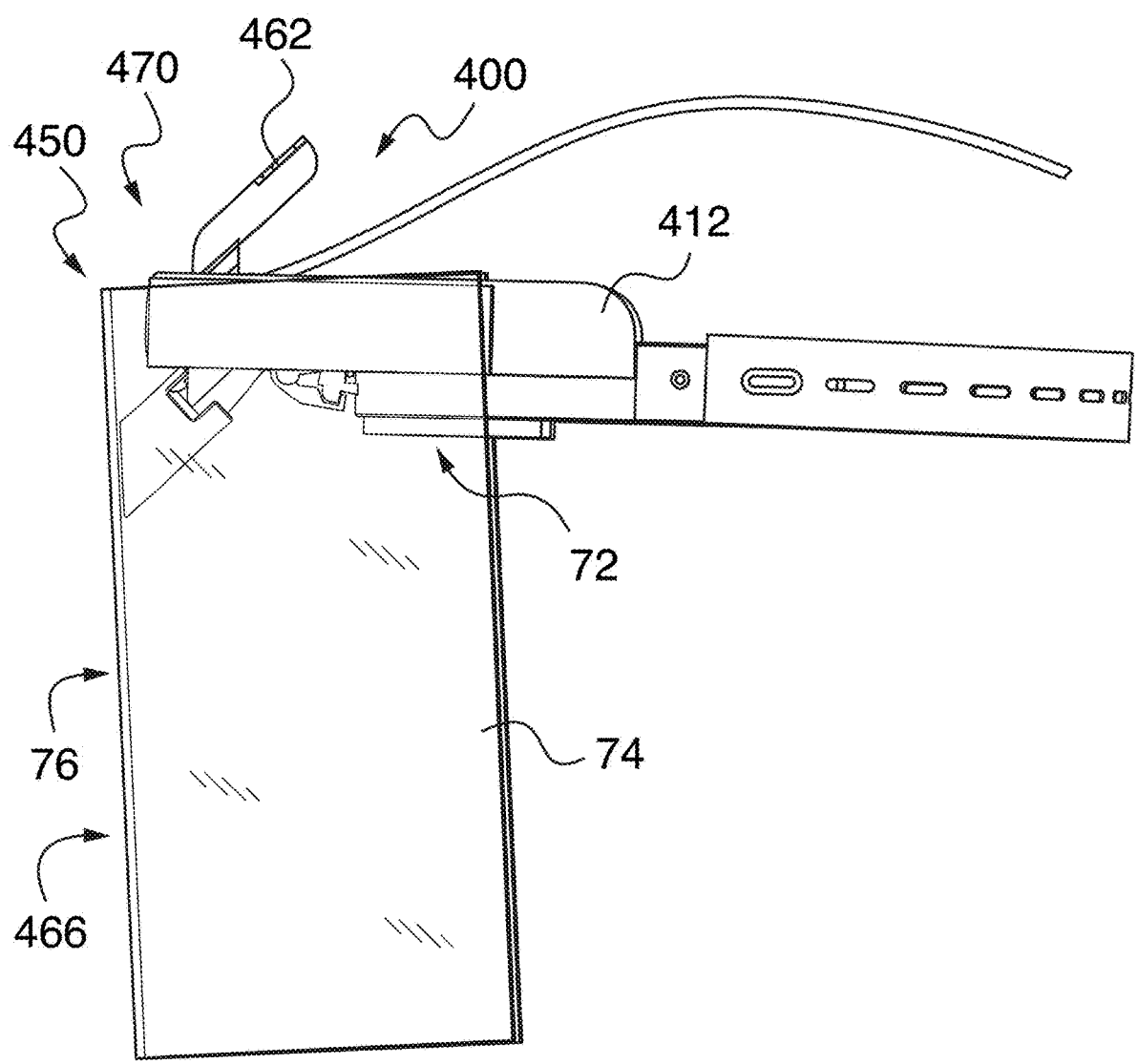
FIG. 47 is a side view of the PPE adapter system for use with a light device with the light device being attached and a face shield being attached, constructed according to an embodiment of the present invention.

With respect to FIGS. 45-47, there is illustrated PPE adapter system 400 being removably attached to light assembly 470. In particular, light assembly 470 is removably attached to PPE adapter system 400 through the use of alligator jaw mounting clip 454 and mounting rail 420. In this manner, alligator jaw mounting clip 454 is actuated so that it encircles and removably attaches itself to mounting rail 420.

Figure 48:
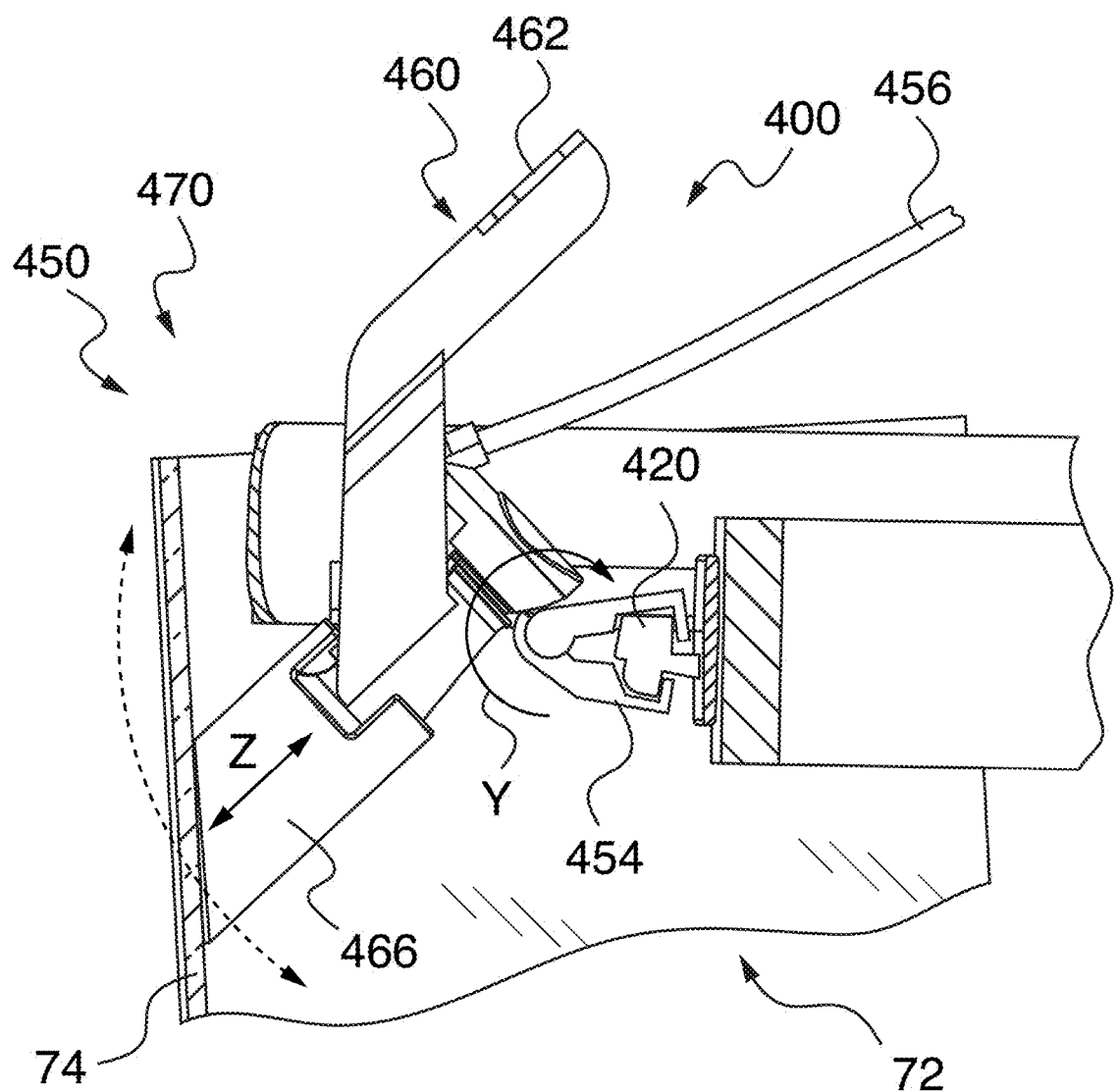
FIG. 48 is a schematic, cut-away view of the PPE adapter system for use with a light device with the light device being attached and a face shield being attached, taken along lines 48-48 in FIG. 47, constructed according to an embodiment of the present invention.

A still another unique aspect of the present invention is the use of light assembly 470. In particular, as shown in FIG. 48, a user can grab onto or otherwise interact with handle 462 on actuator 460 in order to rotate the light module 450 around the direction of arrow Y. This will allow the light assembly 470 (in particular, the telescoping shroud 466) to make contact with face shield 74. Furthermore, the telescoping shroud 466 can be adjusted along the directions of arrows Z in order to ensure that telescoping shroud 466 contacts the face shield 74. In this manner, substantially no light from the light beam 472 that is being emitted from the light module 450 is reflected back towards the user's face.

Another unique aspect of the present invention is that the PPE adapter system 400 can be easily and quickly attached to the light assembly 470 and removed from the light assembly 470. In particular, alligator jaw mounting clip 454 can be located over mounting rail 420. The alligator jaw mounting clip 454 can be operated such that alligator jaw mounting clip 454 is removably connected to mounting rail 420. Conversely, the PPE adapter system 400 can be easily and quickly removed from the light assembly 470 by operating alligator jaw mounting clip 454 so that the alligator jaw mounting clip 454 is no longer removably attached to mounting rail 420.

A yet another unique aspect of the present invention is the ability of the PPE adapter system 400 to be able to attach to a face shield 74 (FIGS. 45-48). In particular, as shown in FIGS. 45-48, a conventional face shield 74 can be attached to the PPE adapter system 400 through the use of hook and loop fasteners 72. It is important to understand that in many medical procedures such as surgical procedures, a face shield 74 may be required to be worn by the medical personnel performing the surgical procedure. However, the present invention allows the face shield 74 to be tilted at an angle 76 (FIG. 47) with respect to the light assembly 470 (in particular the telescoping shroud 466). In this manner, PPE adapter system 400 is designed to have a forward tilt in order to move the face shield 74 as close to the light assembly 470, as possible. This is needed so that substantially no light from the light beam 472 (FIG. 45) that is being emitted from the light module 450 is reflected back towards the user's face. Furthermore, the tilt angle 76 should range between 5 and 15° with the preferable tilt angle being 10° in order to allow the face shield 74 to be in close proximity to the light assembly 470.

A still another unique aspect of the present invention is the use of hook and loop fasteners 72 located around a periphery of wall 412 (FIGS. 43 and 45-47). Preferably, hook and loop fasteners 72 are constructed of Velcro® or any other similar hook and loop material. The unique aspect of use of the hook and loop fasteners 412 is that the hook and loop fasteners 72 allow the PPE adapter system 400 to be removably attached to the face shield 74 (FIG. 46). In this manner, once the PPE adapter system 400 has been removably attached to the light assembly 470 and the light assembly 470 has been placed on the head of the medical personnel, the surgical gown 100 (FIG. 49) can be located over the medical personnel and the hood 102 can be securely attached to the PPE adapter system 400 so that the face shield 74 and hood 102 remain in place on the medical personnel, especially during the medical procedure. As shown in FIGS. 45-47, the hook and loop fasteners 72 can be attached to the hood at a location along a top edge of the face shield 74.

Figure 49:
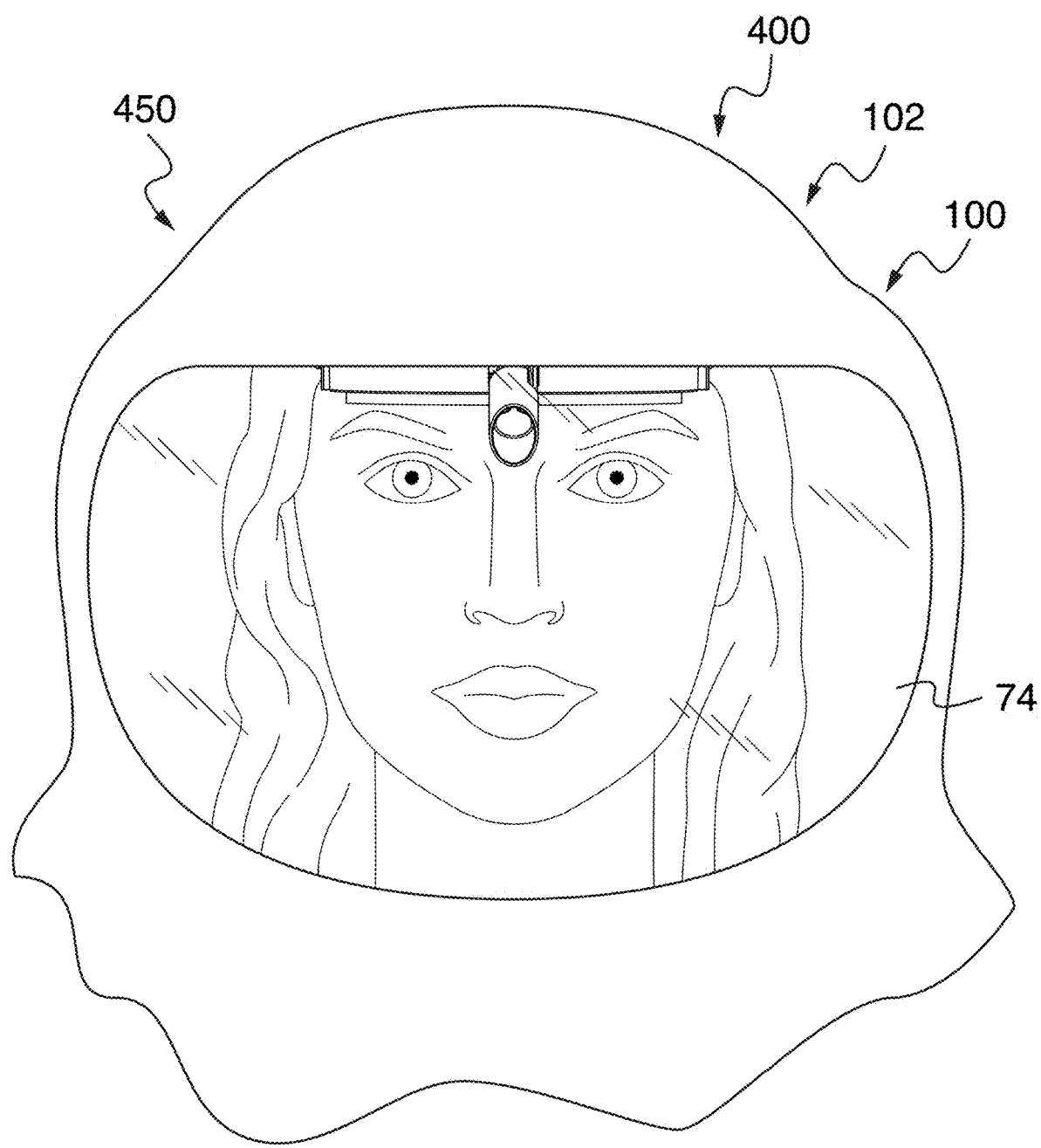
FIG. 49 is a front view of the PPE adapter system being attached to the light device and the PPE adapter system being worn by a user while the user is donning a PPE having a hood, constructed according to an embodiment of the present invention.

With respect to FIG. 49, there is illustrated PPE adapter system 400 being attached to the light assembly 470 and the light assembly 470 is being worn by a user such as medical personnel. As shown in FIG. 49, the PPE adapter system 400 has been attached to the light assembly 470 and the light assembly 470 is being worn by a user such as medical personnel. As shown in FIGS. 49, the medical personnel has donned a surgical gown 100 having a hood 102 and a face shield 74. As best shown in FIG. 49, the face shield 74 is located in close proximity to the light assembly 470 so that the face shield 74 does not produce additional artifacts such as reflections when the light assembly 470 is being utilized.

Setting-Up the Various PPE Adapter Systems

In order to set-up each of the various PPE adapter systems 50, 50a, 50b, 300, and 400 for use during surgical procedures, attention is directed to FIGS. 1-49. With respect to PPE adapter system 300, attention is directed to FIGS. 1-11A. In order to set up PPE adapter system 300, as shown in FIGS. 6 and 7, snap-over mounting hooks 302 can be quickly located over headband 354. The PPE adapter system 300 can then be removably attached to the AR device 350 through the use of the snap-over mounting hooks 302. Conversely, the PPE adapter system 300 can be easily and quickly removed from the AR device 350 by removing the snap-over mounting hooks 302 from the headband 354.

Once the PPE adapter system 300 has been attached to AR device 350, the user (such as a medical personnel) can then place the AR device 350/PPE adapter system 300 on the user's head as shown in FIG. 11A.

After the user has placed the AR device 350/PPE adapter system 300 on the user's head, the user can then don the surgical gown 100. The surgical gown 100 can then be removably attached to the hood 102 at the face shield 74, as shown in FIG. 11A.

With respect to PPE adapter system 50a, attention is directed to FIGS. 13-21. In order to set up PPE adapter system 50a, as shown in FIGS. 14a-17, the alignment posts 78 can be located over chunnels 22. The PPE adapter system 50a can then be removably attached to the AR device 2a through the use of the threaded fasteners 79 and threaded fastener openings 73. In particular, the PPE adapter system 50a can be securely attached to the AR device 2a by placing alignment posts 78 in the chunnels 22 and attaching the threaded fasteners 79 to the AR device 2a through threaded fastener openings 73. Conversely, the PPE adapter system 50a can be easily and quickly removed from the AR device 2a by removing the threaded fasteners 79 from the AR device 2a and lifting the alignment posts 78 away from the chunnels 22.

Once the PPE adapter system 50a has been attached to AR device 2a, the user (such as a medical personnel) can then place the AR device 2a/PPE adapter system 50a on the user's head as shown in FIGS. 18 and 20.

After the user has placed the AR device 2a/PPE adapter system 50a on the user's head, the user can then don the surgical gown 100. The surgical gown 100 can then be removably attached to the hood 102 at the face shield 74, as shown in FIGS. 19 and 21.

With respect to PPE adapter system 50b, attention is directed to FIGS. 22-29. In order to set up PPE adapter system 50b, as shown in FIGS. 24-27, sliding adapter mount 250 is attached to AR device 2b through the use of extension 264 and extension 255. The extension 264 is located within extension 255. The extension 255 is then removably attached to head band 20b.

A unique aspect of the present invention is the ability of the PPE adapter system 50b to be able to attach to a face shield 74 (FIGS. 24-27) and allow the AR device 2b to be rotated towards and away from face shield 74. In particular, as shown in FIGS. 24-27, a conventional face shield 74 can be attached to the PPE adapter system 50b. As discussed above, it is important to understand that in many medical procedures such as surgical procedures, a face shield 74 may be required to be worn by the medical personnel performing the surgical procedure. However, the present invention allows the AR device 2b to be tilted at an angle with respect to the face shield 74. In this manner, PPE adapter system 50b is designed to rotate the AR device 2b in order to move the AR device 2b as close to the face shield 74, as possible. This is needed so the front camera 10a can calculate depth of objects without producing additional artifacts such as reflections. Furthermore, the tilt angle 76 of the face shield 74 should range between 5 and 15° with the preferable tilt angle 76 being 10° in order to allow the face shield 74 to be in close proximity to the front camera 10a.

Another unique aspect of the present invention is the use of sliding adapter 1300. In particular, as shown in FIGS. 25-27, the AR device 2b is rotated down for viewing and the sliding adapter 1300 is slid back towards the head band 20b so that the face shield 74 is located in close proximity to the front camera 10a (FIG. 27). In order to rotate the AR device 2b upwardly, as shown in FIG. 26, the release lever 1302 is lifted up and away from the plurality of stops 1304 and moved in the direction of arrow X. The release lever 1302 is then located within one of the desired plurality of stops 1304. The release lever 1302 allows the sliding adapter 1300 to move forward which then creates the clearance needed for the AR device 2b to be rotated upwardly and away from the user's face in order to allow the medical personnel to view the surgical field without the AR device 2b being in the visual field of the medical personnel.

Once the PPE adapter system 50b has been attached to AR device 2b, the user (such as a medical personnel) can then place the AR device 2b/PPE adapter system 50b on the user's head.

After the user has placed the AR device 2b/PPE adapter system 50b on the user's head, the user can then don the surgical gown 100. The surgical gown 100 can then be removably attached to the hood 102 at the face shield 74, as shown in FIGS. 28 and 29.

With respect to PPE adapter system 50, attention is directed to FIGS. 30-39. In order to set up PPE adapter system 50, as shown in FIGS. 31-33, bracket 62 is located over the mount 8. The channels 66 can also be located over headband 20. The PPE adapter system 50 can then be removably attached to the AR device 2 through the use of the threaded fasteners 60 and threaded fastener openings 18. The PPE adapter system 50 can be securely attached to the AR device 2 by placing the channels 66 over the headband 20 and attaching the threaded fasteners 60 to the threaded fastener openings 18. Conversely, the PPE adapter system 50 can be easily and quickly removed from the AR device 2 by removing the threaded fasteners 60 from the threaded fastener openings 18 and lifting the channels 66 off of headband 20 in the direction of arrows A.

Once the PPE adapter system 50 has been attached to AR device 2, the user (such as a medical personnel) can then place the AR device 2/PPE adapter system 50 on the user's head as shown in FIGS. 36 and 38.

After the user has placed the AR device 2/PPE adapter system 50 on the user's head, the user can then don the surgical gown 100. The surgical gown 100 can then be removably attached to the hood 102 at the face shield 74, as shown in FIGS. 37 and 39.

With respect to PPE adapter system 400, attention is directed to FIGS. 40-49. In order to set up PPE adapter system 400, as shown in FIGS. 45-48, alligator jaw mounting clip 454 can be located over mounting rail 420. The alligator jaw mounting clip 454 can be operated such that alligator jaw mounting clip 454 is removably connected to mounting rail 420. Conversely, the PPE adapter system 400 can be easily and quickly removed from the light assembly 470 by operating alligator jaw mounting clip 454 so that the alligator jaw mounting clip 454 is no longer removably attached to mounting rail 420.

Once the PPE adapter system 400 has been attached to the light assembly 470, the user (such as a medical personnel) can then place the light assembly 470/PPE adapter system 400 on the user's head as shown in FIG. 49.

After the user has placed the light assembly 470/PPE adapter system 400 on the user's head, the user can then don the surgical gown 100. The surgical gown 100 can then be removably attached to the hood 102 at the face shield 74, as shown in FIG. 49.

Operation of the Various PPE Adapter Systems

Another unique aspect of the present invention is the use of the various PPE adapter systems 50, 50a, 50b, 300, and 400. With respect to PPE adapter system 300, attention is directed to FIG. 11A. As discussed above, once the PPE adapter system 300 has been attached to AR device 350, the user (such as a medical personnel) can then place the AR device 350/PPE adapter system 300 on the user's head as shown in FIG. 11A.

After the user has placed the AR device 350/PPE adapter system 300 on the user's head, the user can then don the surgical gown 100. The surgical gown 100 can then be removably attached to the hood 102 at the face shield 74, as shown in FIG. 11A.

As discussed above, another unique aspect of the present invention is the ability of the PPE adapter system 300 to be able to attach to a face shield 74 (FIGS. 8-11A). In particular, as shown in FIGS. 8-11A, a conventional face shield 74 can be attached to the PPE adapter system 300. As discussed above, it is important to understand that in many medical procedures such as surgical procedures, a face shield 74 may be required to be worn by the medical personnel performing the surgical procedure. However, the present invention allows the face shield 74 to be tilted at an angle 76 with respect to the AR device 350. In this manner, PPE adapter system 300 is designed to have a forward tilt in order to move the face shield 74 as close to the AR device 350, as possible. This is needed so the AR device 350 can calculate depth of objects without producing additional artifacts such as reflections. Furthermore, the tilt angle 76 the face shield 74 of should range between 5 and 15° with the preferable tilt angle being 10° in order to allow the face shield 74 to be in close proximity to the AR device 350. However, it is to be understood that a key aspect of the present invention is the proximity of the face shield 74 to the cameras (i.e., the AR viewing display, spatial imaging system, or light assembly) in the AR device or light device. The smaller the gap between the face shield 74 and the AR device or light assembly, the better the performance of the PPE adapter system.

A still another unique aspect of the present invention is the use of hook and loop fasteners 72 located around a periphery of wall 306. The unique aspect of use of the hook and loop fasteners 72 is that the hook and loop fasteners 72 allow the PPE adapter system 300 to be removably attached to the hood 102 of conventional surgical gown 100 (FIG. 11A). In this manner, the once the PPE adapter system 300 has been removably attached to AR device 350 and the AR device 350 has been placed on the head of the medical personnel, the surgical gown 100 can be located over the medical personnel and the hood 102 can be securely attached to the PPE adapter system 300 so that the face shield 74 and hood 102 remain in place on the medical personnel, especially during the medical procedure. As shown in FIGS. 8 and 11, the hook and loop fasteners 72 can be attached to the hood at a location along a top edge of the face shield 74.

With respect to PPE adapter system 50a, attention is directed to FIGS. 18-21. Once the PPE adapter system 50a has been attached to AR device 2a, the user (such as a medical personnel) can then place the AR device 2a/PPE adapter system 50a on the user's head as shown in FIGS. 18 and 20.

After the user has placed the AR device 2a/PPE adapter system 50a on the user's head, the user can then don the surgical gown 100. The surgical gown 100 can then be removably attached to the hood 102 at the face shield 74, as shown in FIGS. 19 and 21.

As discussed above, another unique aspect of the present invention is the ability of the PPE adapter system 50a to be able to attach to a face shield 74 (FIGS. 18-21). In particular, as shown in FIGS. 19 and 21, a conventional face shield 74 can be attached to the PPE adapter system 50a. As discussed above, it is important to understand that in many medical procedures such as surgical procedures, a face shield 74 may be required to be worn by the medical personnel performing the surgical procedure. However, the present invention allows the face shield 74 to be tilted at an angle 76 with respect to the depth camera 156. In this manner, PPE adapter system 50a is designed to have a forward tilt in order to move the face shield 74 as close to the depth camera 156, as possible. This is needed so the depth camera 156 can calculate depth of objects without producing additional artifacts such as reflections. Furthermore, the tilt angle 76 the face shield 74 of should range between 5 and 15° with the preferable tilt angle being 10° in order to allow the face shield 74 to be in close proximity to the depth camera 156.

A still another unique aspect of the present invention is the use of hook and loop fasteners 72a located around a periphery of wall 54a. Preferably, hook and loop fasteners 72a are constructed in a similar manner as hook and loop fasteners 72. The unique aspect of use of the hook and loop fasteners 72a is that the hook and loop fasteners 72a allow the PPE adapter system 50a to be removably attached to the face shield 74 (FIGS. 19 and 21). In this manner, the once the PPE adapter system 50a has been removably attached to AR device 2a and the AR device 2a has been placed on the head of the medical personnel, the surgical gown 100 can be located over the medical personnel and the hood 102 can be securely attached to the PPE adapter system 50a so that the face shield 74 and hood 102 remain in place on the medical personnel, especially during the medical procedure. As shown in FIGS. 19 and 21, the hook and loop fasteners 72a can be attached to the hood at a location along a top edge of the face shield 74.

With respect to PPE adapter system 50b, attention is directed to FIGS. 28 and 29. Once the PPE adapter system 50b has been attached to AR device 2b, the user (such as a medical personnel) can then place the AR device 2b/PPE adapter system 50b on the user's head.

After the user has placed the AR device 2b/PPE adapter system 50b on the user's head, the user can then don the surgical gown 100. The surgical gown 100 can then be removably attached to the hood 102 at the face shield 74, as shown in FIGS. 28 and 29.

As discussed above, a unique aspect of the present invention is the ability of the PPE adapter system 50b to be able to attach to a face shield 74 (FIGS. 24-27) and allow the AR device 2b to be rotated towards face shield 74. In particular, as shown in FIGS. 23-26, a conventional face shield 74 can be attached to the PPE adapter system 50b. As discussed above, it is important to understand that in many medical procedures such as surgical procedures, a face shield 74 may be required to be worn by the medical personnel performing the surgical procedure. However, the present invention allows the AR device 2b to be tilted at an angle with respect to the face shield 74. In this manner, PPE adapter system 50b is designed to rotate the AR device 2b in order to move the AR device 2b as close to the face shield 74, as possible. This is needed so the front camera 10a can calculate depth of objects without producing additional artifacts such as reflections. Furthermore, the tilt angle of the face shield 74 should range between 5 and 15° with the preferable tilt angle being 10° in order to allow the face shield 74 to be in close proximity to the front camera 10a.

Another unique aspect of the present invention is the use of sliding adapter 1300. In particular, as shown in FIGS. 24-27 the AR device 2b is rotated down for viewing and the sliding adapter 1300 is slid back towards the head band 20b so that the face shield 74 is located in close proximity to the front camera 10a (FIG. 27). In order to rotate the AR device 2b upwardly, as shown in FIG. 26, the release lever 1302 is lifted up and away from the plurality of stops 1304 and moved in the direction of arrow X. The release lever 1302 is then located within one of the desired plurality of stops 1304. The movement of the release lever 1302 causes the AR device 2b to be rotated up and away from the face shield 74 in order to allow the medical personnel to view the surgical field without the AR device 2b being in the visual field of the medical personnel (FIG. 29). Preferably, the total travel length of the release lever 302 is approximately 50 mm.

A still another unique aspect of the present invention is the use of hook and loop fasteners 72b located around a periphery of wall 54b. Preferably, hook and loop fasteners 72b are constructed in a similar manner as hook and loop fasteners 72. The unique aspect of use of the hook and loop fasteners 72b is that the hook and loop fasteners 72b allow the PPE adapter system 50b to be removably attached to the face shield 74 (FIGS. 24-26). In this manner, the once the PPE adapter system 50b has been removably attached to AR device 2b and the AR device 2b has been placed on the head of the medical personnel, the surgical gown 100 can be located over the medical personnel and the hood 102 can be securely attached to the PPE adapter system 50b so that the face shield 74 and hood 102 remain in place on the medical personnel, especially during the medical procedure. As shown in FIGS. 28 and 29, the hook and loop fasteners 72b can be attached to the hood at a location along a top edge of the face shield 74.

With respect to PPE adapter system 50, attention is directed to FIGS. 36-39. As discussed above, once the PPE adapter system 50 has been attached to AR device 2, the user (such as a medical personnel) can then place the AR device 2/PPE adapter system 50 on the user's head as shown in FIGS. 36 and 38.

After the user has placed the AR device 2/PPE adapter system 50 on the user's head (FIGS. 36 and 38), the user can then don the surgical gown 100. The surgical gown 100 can then be removably attached to the hood 102 at the face shield 74, as shown in FIGS. 37 and 39.

As discussed above, another unique aspect of the present invention is the ability of the PPE adapter system 50 to be able to attach to a face shield 74 (FIGS. 34 and 35). In particular, as shown in FIGS. 34 and 35, a conventional face shield 74 can be attached to the PPE adapter system 50. It is important to understand that in many medical procedures such as surgical procedures, a face shield 74 may be required to be worn by the medical personnel performing the surgical procedure. However, the present invention allows the face shield 74 to be tilted at an angle 76 with respect to the front camera 10. In this manner, PPE adapter system 50 is designed to have a forward tilt in order to move the face shield 74 as close to the front camera 10, as possible. This is needed so the front camera 10 can calculate depth of objects without producing additional artifacts such as reflections. Furthermore, the tilt angle 76 of the face shield 74 should range between 5 and 15° with the preferable tilt angle being 10° in order to allow the face shield 74 to be in close proximity to the front camera 10.

A still another unique aspect of the present invention is the use of hook and loop fasteners 72 located around a periphery of wall 54. Preferably, hook and loop fasteners 72 are constructed of Velcro® or any other similar hook and loop material. The unique aspect of use of the hook and loop fasteners 72 is that the hook and loop fasteners 72 allow the PPE adapter system 50 to be removably attached to the face shield 74 (FIGS. 34 and 35). In this manner, the once the PPE adapter system 50 has been removably attached to AR device 2 and the AR device 2 has been placed on the head of the medical personnel, the surgical gown 100 can be located over the medical personnel and the hood 102 can be securely attached to the PPE adapter system 50 so that the 74 and face shield hood 102 remain in place on the medical personnel, especially during the medical procedure. As shown in FIGS. 34 and 35, the hook and loop fasteners 72 can be attached to the hood at a location along a top edge of the face shield 74.

With respect to PPE adapter system 400, attention is directed to FIG. 49. As discussed above, once the PPE adapter system 400 has been attached to the light assembly 470, the user (such as a medical personnel) can then place the light assembly 470/PPE adapter system 400 on the user's head as shown in FIG. 49.

After the user has placed the light assembly 470/PPE adapter system 400 on the user's head, the user can then don the surgical gown 100. The surgical gown 100 can then be removably attached to the hood 102 at the face shield 74, as shown in FIG. 49.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

Therefore, provided herein is a new and improved PPE adapter system for use with use with AR devices and lighting devices, according to various embodiments of the present invention, offers the following advantages: ease of use; lightness in weight; the ability to use the AR device and/or lighting device in conjunction with a face shield; the ability to use the adapter system on a variety of AR and/or lighting devices; portability; ease of attachment of the adapter to the AR and/or lighting device; ease of removal of the adapter from the AR and/or lighting device; and reduced cost.

In fact, in many of the preferred embodiments, these advantages of ease of use, lightness in weight, the ability to use the AR device and/or lighting device in conjunction with a face shield, the ability to use the adapter system on a variety of AR and/or lighting devices, portability, ease of attachment of the adapter to the AR and/or lighting device, ease of removal of the adapter from the AR and/or lighting device, and reduced cost are optimized to an extent that is considerably higher than heretofore achieved in prior, known systems and methods for employing a spatial imaging system and/or a light system with PPE during a medical procedure.

What is claimed is:

1. A personal protective equipment ("PPE") adapter system for use with an augmented reality ("AR") device, comprising:
an AR device having an AR viewing display and a headband operatively connected to the AR viewing display;
a PPE adapter assembly operatively connected to the headband, wherein the PPE adapter assembly further comprises;
a wall;
a plurality of indexing posts operatively connected at one end to the wall,
a base operatively connected to another end of each of the plurality of indexing posts,
a plurality of extensions operatively connected at one end to the base, and
a snap-over mounting hook operatively connected at another end of each of the plurality of extensions, wherein the snap-over mounting hook is configured to fit over the headband; and
a PPE hood operatively connected to the PPE adapter assembly, wherein the PPE hood includes a face shield, wherein the face shield is removably connected to the PPE adapter system, wherein the PPE adapter assembly further includes a plurality of openings located adjacent to the wall, the plurality of indexing posts, and the base, wherein the plurality of openings is configured to allow for air to circulate within the PPE hood.

2. The personal protective equipment ("PPE") adapter system, according to claim 1, wherein the PPE adapter system further comprises:
a hook and loop fastener located along a portion of the wall, wherein the hook and loop fastener is removably connected to the face shield.

3. The personal protective equipment ("PPE") adapter system, according to claim 1, wherein the PPE adapter system is constructed of a durable, UV resistant, heat resistant, lightweight, high strength polymeric material.

4. The personal protective equipment ("PPE") adapter system, according to claim 1, wherein the face shield is configured to be located within close proximity to the AR viewing display.

5. A personal protective equipment ("PPE") adapter system for use with an augmented reality ("AR") device, comprising:
an AR device having a spatial imaging system and a head gear operatively connected to the spatial imaging system, wherein the AR device includes a plurality of chunnels located along an upper portion of the AR device;
a PPE adapter system operatively connected to the AR device; and
a PPE hood operatively connected to the PPE adapter system, wherein the PPE hood includes a face shield, wherein the face shield is removably connected to the PPE adapter system.

6. The personal protective equipment ("PPE") adapter system, according to claim 5, wherein the spatial imaging system further comprises:
a plurality of tracking cameras;
a red, green and blue ("RGB") camera located adjacent to the plurality of tracking cameras; and
a depth camera located adjacent to the RGB camera.

7. The personal protective equipment ("PPE") adapter system, according to claim 5, wherein the adapter system further comprises:
a wall;
a plurality of extensions operatively connected at one end to the wall;
a base operatively connected to another end of each of the plurality of extensions;
a plurality of alignment posts located along a portion of the base, wherein the plurality of alignment posts is configured to fit within each of the plurality of chunnels.

8. The personal protective equipment ("PPE") adapter system, according to claim 7, wherein the PPE adapter system further comprises:
a hook and loop fastener located along a portion of the wall, wherein the hook and loop fastener is removably connected to the face shield.

9. The personal protective equipment ("PPE") adapter system, according to claim 7, wherein the PPE adapter system further comprises:
a plurality of openings located adjacent to the wall, the plurality of extensions, and the base, wherein the plurality of openings is configured to allow for air to circulate within the PPE hood.

10. The personal protective equipment ("PPE") adapter system, according to claim 5, wherein the face shield is configured to be located within close proximity to the spatial imaging system.

11. A personal protective equipment ("PPE") adapter system for use with a light assembly, comprising:
a light assembly having a light module, wherein the light assembly further comprises;
an alligator jaw mounting clip located adjacent to the light module, and
a power cord operatively connected to the light module;
a PPE adapter system operatively connected to the light assembly; and
a PPE hood operatively connected to the PPE adapter system, wherein the PPE hood includes a face shield, wherein the face shield is removably connected to the PPE adapter system.

12. The personal protective equipment ("PPE") adapter system, according to claim 11, wherein the light assembly further comprises:
a snap-on baffle removably connected to the light module, wherein the snap-on baffle includes a baffle slot;
an actuator operatively connected at one end to the snap-on baffle;
a handle operatively connected to another end of the actuator; and
telescoping shroud extension removably connected to the snap-on baffle adjacent to the baffle slot.

13. The personal protective equipment ("PPE") adapter system, according to claim 8, wherein the adapter system further comprises:
a first wall;
a plurality of extensions operatively connected at one end to the first wall;

a second wall operatively connected at the other end of each of the plurality of extensions; and a mounting rail located along a portion of the second wall, wherein the alligator jaw mounting clip is configured to interact with the mounting rail in order to removably attach the light assembly to the adapter system.

14. The personal protective equipment ("PPE") adapter system, according to claim 13, wherein the PPE adapter system further comprises:

a plurality of openings located adjacent to the first wall, the plurality of extensions, and the second wall, wherein the plurality of openings is configured to allow for air to circulate within the PPE hood.

15. The personal protective equipment ("PPE") adapter system, according to claim 13, wherein the PPE adapter system further comprises:

a hook and loop fastener located along a portion of the second wall, wherein the hook and loop fastener is removably connected to the face shield.

16. The personal protective equipment ("PPE") adapter system, according to claim 11, wherein the face shield is configured to be located within close proximity to the light assembly.

* * * * *